United States Patent [19]

Letwin

[11] Patent Number: 5,608,901
[45] Date of Patent: Mar. 4, 1997

[54] METHOD AND SYSTEM FOR IMPROVING THE CONTIGUITY OF SECTORS OF A FILE

[75] Inventor: James G. Letwin, Kirkland, Wash.

[73] Assignee: Microsoft Corporation, Redmond, Wash.

[21] Appl. No.: 299,542

[22] Filed: Sep. 1, 1994

Related U.S. Application Data

[62] Division of Ser. No. 400,533, Aug. 29, 1989, Pat. No. 5,371,885.
[51] Int. Cl.$^6$ .............................. G06F 17/30; G06F 12/00
[52] U.S. Cl. ................................. 395/621; 364/DIG. 1; 364/DIG. 2; 395/412; 395/181
[58] Field of Search .................................. 395/425, 444, 395/427, 412, 497.01, 497.04, 181, 182.01, 600; 364/DIG. 1, DIG. 2

[56] References Cited

U.S. PATENT DOCUMENTS

| | | | |
|---|---|---|---|
| 4,435,752 | 3/1984 | Winkelman | 364/200 |
| 4,468,728 | 8/1984 | Wang | 364/200 |
| 4,825,354 | 4/1989 | Agrawal et al. | 364/200 |
| 4,945,475 | 7/1990 | Bruffey et al. | 364/200 |
| 4,953,080 | 8/1990 | Dysart et al. | 364/200 |
| 5,008,820 | 4/1991 | Christopher, Jr. | 364/200 |
| 5,034,914 | 7/1991 | Osterlund | 364/900 |
| 5,047,918 | 9/1991 | Schwartz et al. | 364/200 |
| 5,068,842 | 11/1991 | Naito | 369/32 |
| 5,398,142 | 3/1995 | Davy | 360/48 |

OTHER PUBLICATIONS

Maurice, J. Bach, "The Design of the UNIX Operating System", Prentice-Hall, London, 1986, pp. 22–24; 62; 68–81.

Matt Koehler, "GFS Revisited or How I Lived With Four Different Local File Systmes", Proceedings of the Summer 1987 Usenix Conference, Jun. 8, 1987, Phoenix, Arizona, pp. 291–305.

New York, "Directory for Disk With Write-Once Storage Medium", IBM Technical Disclosure Bulletin, vol. 30, No. 6, Nov. 1987, New York, pp. 137–138.

Primary Examiner—Tod R. Swann
Assistant Examiner—Tuan V. Thai
Attorney, Agent, or Firm—Seed and Berry LLP

[57] ABSTRACT

A method and system for storing file system state information within sectors of the file system. File system information includes pointers to top-level file system structures, such as free space bitmaps, a bad block list, a directory block band, and a root directory. The file system state information is classified into two groups: frequently-updated information and infrequently-updated information. The two groups are stored on separate sectors in order to minimize write operations performed on the infrequently-updated information and thereby reduce the risk of the infrequently-updated information being corrupted.

3 Claims, 17 Drawing Sheets

Microfiche Appendix Included
(195 Microfiche, 4 Pages)

METHOD AND SYSTEM FOR IMPROVING THE CONTIGUITY OF SECTORS OF A FILE

CROSS-REFERENCE TO RELATED APPLICATION

This application is a divisional of U.S. patent application Ser. No. 07/400,533, application serial number filed Aug. 29, 1989, now U.S. Pat. No. 5,371,885.

Included in the specification is Appendix I, which is four sheets of microfiche containing 385 frames.

FIELD OF THE INVENTION

This invention relates to the field of computer control systems and more specifically to a method and means for facilitating communication between the devices which comprise a computer system.

BACKGROUND OF THE INVENTION

Computer systems typically comprise a central processing unit, random access memory, read only memory, and a variety of peripheral devices such as data input devices, data output devices, and a variety of non-volatile data storage devices such as floppy disks and fixed or hard disks. Communication between the respective devices in a computer system is typically controlled by a computer operating system. One well known computer operating system is the MS-DOS operating system available from Microsoft.

In the MS-DOS operating system, a single file system describes and defines the organization of files stored on peripheral devices. In order for the computer system to read or write data in a format recognized by both the computer system and the respective peripheral devices, data must be organized in accordance with this file system. For example, in a conventional floppy disk peripheral device used with the MS-DOS operating system, data on a floppy disk is structured in accordance with a file system known as the FAT file system which is so named because of its use of file allocation tables. The FAT file system is one of the most widely used file systems in the world today. Other file systems may be associated with other types of data storage types of peripheral devices such as tape storage devices.

File systems facilitate communication between the operating system kernel and device dependant drivers and are responsible for converting read and write commands generated by an operating system kernel (as well as functions such as opening and closing files) into a form which may be recognized by the device driver.

When using the MS-DOS operating system, the operating system must be configured to define the relevant file systems to be used with specific peripheral devices employed by the computer system. Once the file systems are defined, file systems remain static or unchanged unless the operating system is modified. This typically requires extensive programming effort and is typically quite time-consuming. It further requires extensive knowledge of the computer operating system and individuals who do not have access to operating system details can not easily modify the file systems.

Furthermore, in prior systems, disk media which contains files of foreign file systems may not by used with the native system. For example, over the years, many computer systems have been developed by a variety of manufacturers, each of which are based on alternate file system structures. With current static file system architectures, disk media from one system typically will not function with another type of system. As computers become more popular, it is increasingly important that files may be shared among all types of computer systems. No system is known which allows disk media from virtually all known computer systems to be automatically recognized and read in a single operating environment. Further, no system is known which allows file systems to be added to a system or modified without the need for altering the computer operating system kernel.

SUMMARY OF THE INVENTION

In summary, the present invention contemplates an improved structure for organizing data in a volume or disk wherein a first disk field comprises a boot block, a second field following said first field comprises a superblock, a third field following said second field comprises a spareblock, and a plurality of bands includes a series of contiguous sectors for storing data wherein each band includes a freespace bitmap indicating sector usage. The freespace bitmap may be located at the head or tail of the bands wherein bitmaps for alternate bands are disposed ajacent to each other. The boot block includes a volume name, a volume I.D., and a disk bootstrap program. The super block includes pointers to free space bitmaps, a bad block list, a directory block band and a root directory.

In accordance with the present invention, files and directories are anchored in an Fnode structure. Wherein Fnode structure comprises a plurality of pointers which point to runs of sectors.

Accordingly, it is an object of the present invention to provide an improved file system which offers improved performance over present file systems.

It is still another object of the present invention to provide a file system structure which minimizes disk fragmentation.

It is still another object of the present invention to provide a file system structure which allows rapid and efficient location of files in a designated volume.

BRIEF DESCRIPTION OF THE DRAWINGS

These and other objects may be fully appreciated through the detailed description of the invention below and the accompanying drawings in which.

DETAILED DESCRIPTION OF THE INVENTION

Figure 1A:
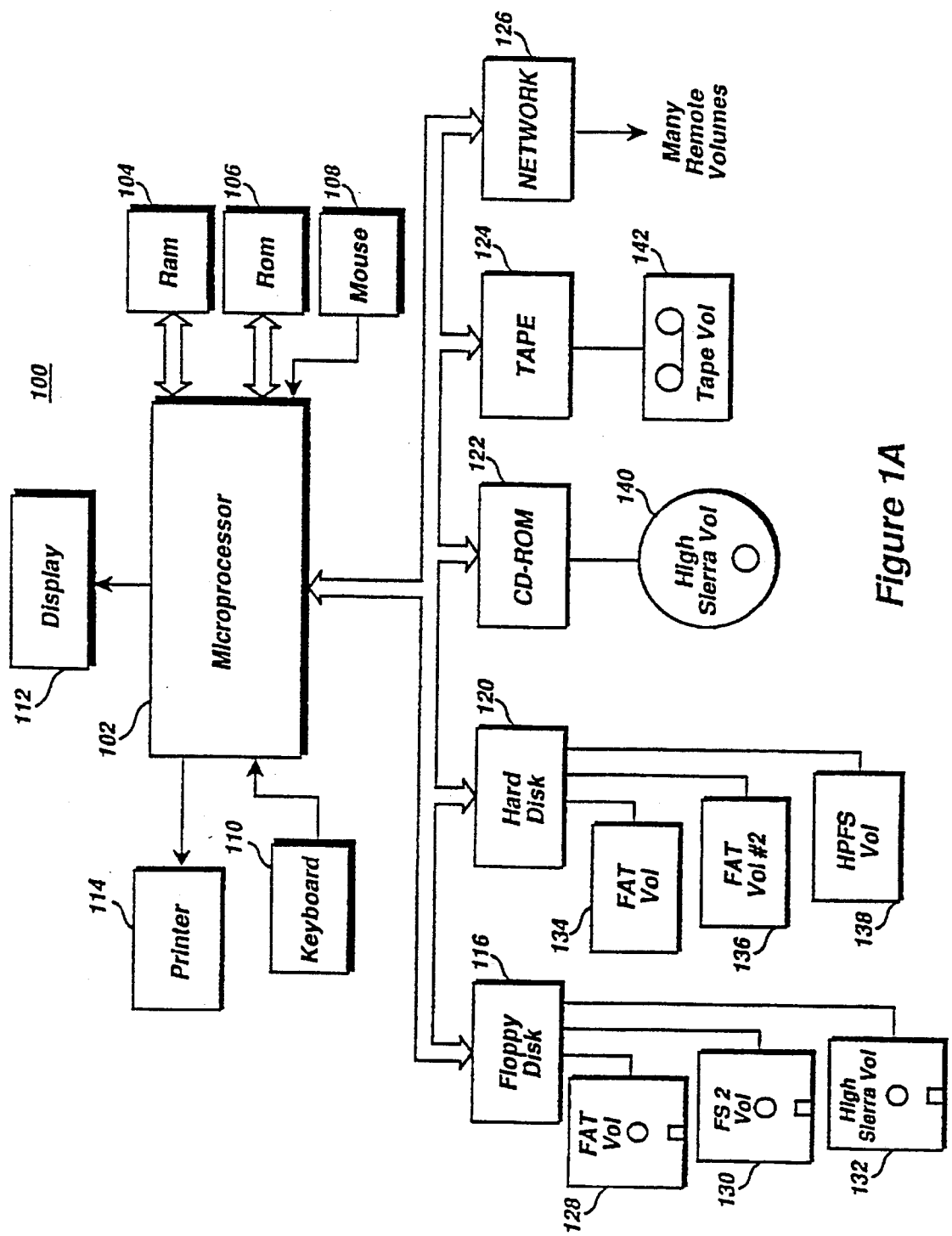
FIG. 1A is a block diagram of a computer system constructed in accordance with the principles of the present invention.

FIG. 1 shows a computer system 100 which is constructed in accordance with the principles of the present invention. The system 100 comprises a central processing unit or microprocessor 102, random access memory 104, read only memory 106, input devices such as a mouse 108 and keyboard 110, output devices such as display 112 and printer 114 and a variety of non-volatile storage devices such as floppy disk drive 116, hard disk drive 120, CD-ROM drive 122, and tape drive 124. In addition, the computer system 100 is adapted for communicating with a network 126. Non-volatile storage means that data is present when the device is powered-off.

In prior systems, an operating system is statically configured with file system drivers wherein each peripheral device is compatible with only one media type and file system driver. If media is placed in a drive which is not compatible with the designated file system driver, the media cannot be successfully accessed. The present invention provides a method and means for automatically mapping media to the file systems associated therewith independent of the peripheral device and without imposing any requirements on the format or location of data on the media, as will be further discussed below. For example, it is contemplated that the floppy drive unit 116 may be used with volumes formatted in accordance with a number of file systems wherein volume 128 is formatted in accordance with the FAT file system, volume 132 is formatted in accordance with the well known High Sierra file system and volume 130 is formatted in accordance with yet another file system. Similarly, various partitions of hard disk 120 may also be formatted in accordance with a number of files systems as indicated by volumes 134, 136 and 138. Similarly, the CD-ROM and tape system 124 may be used with volumes 140, 142, respectively, formatted with their own file systems. Further, network 126 may be coupled to any number of networks having servers which may operate in accordance with their own file systems.

Figure 1B:
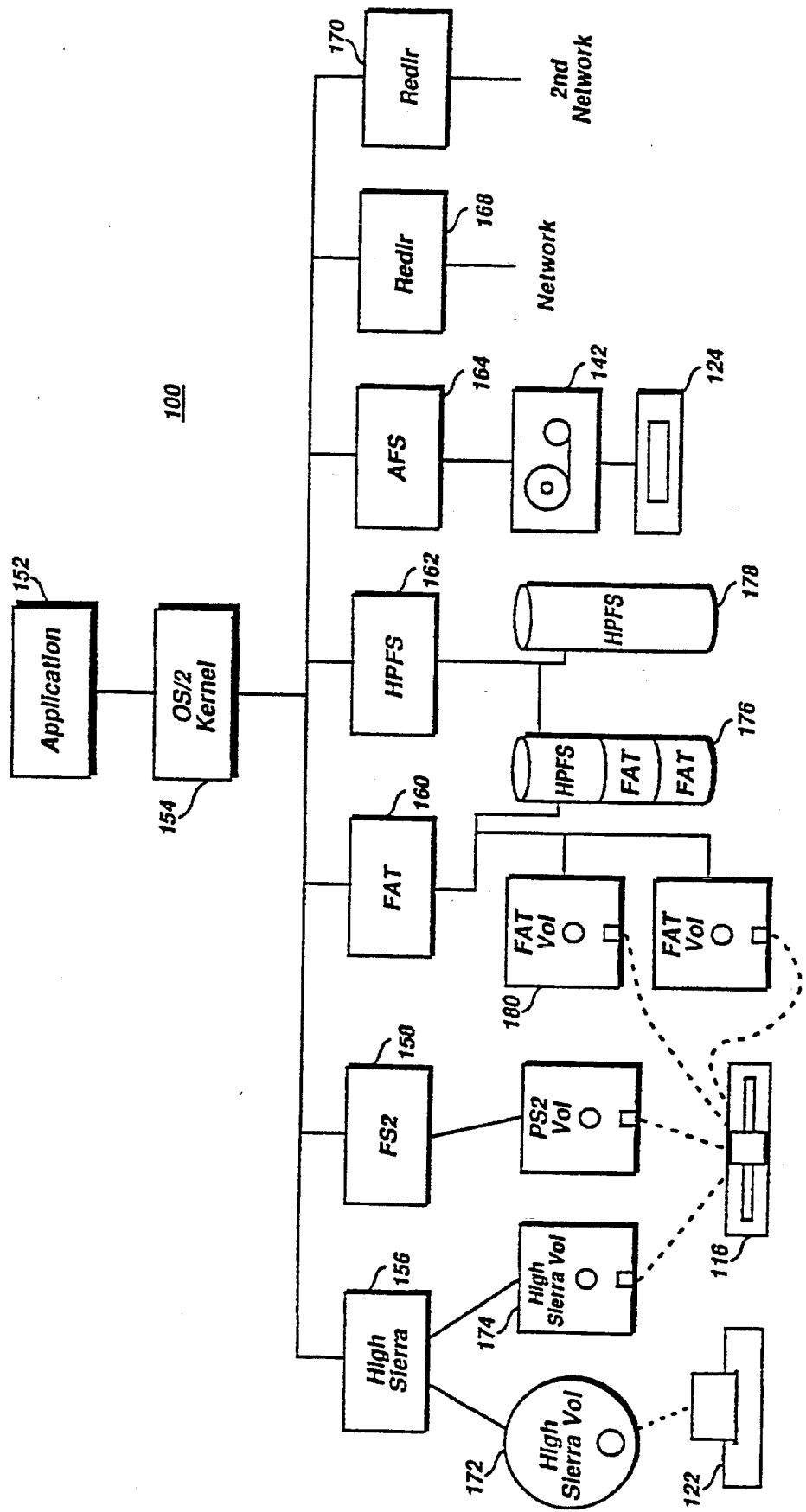
FIG. 1B is a diagram showing the operating and file system architecture the system of FIG. 1A.

The operation of the system 100 is coordinated by an operating system which may be any of a number of well known operating systems. However, the present invention is particularly adapted for use with the OS/2 operating system developed by Microsoft. The structure of the operating environment of the present invention is shown in FIG. 1B. Typically, an application 152 generates file system requests which are processed by kernel 154. The kernel then routes this request to an appropriate file system driver (FSD) 156 -170. Any file system driver may cooperate with a number of hardware devices. For example, the High Sierra file system 156 may be used with CD-ROM player 122 and disk drive 116 when preforming file system operations on volumes 172, 174, respectively. Similarly, the FAT file system and the HPFS file systems may both be used for performing file system operations on volumes 176, 178, each of which are resident on hard disk 120. Further, the FAT file system driver may be used with disk drive 116 when performing file system operations on volume 180. Accordingly, the present invention provides a method and means for automatically and dynamically mapping uncertain media to the appropriate file system, regardless of the type and format of the file system.

Figure 2A:
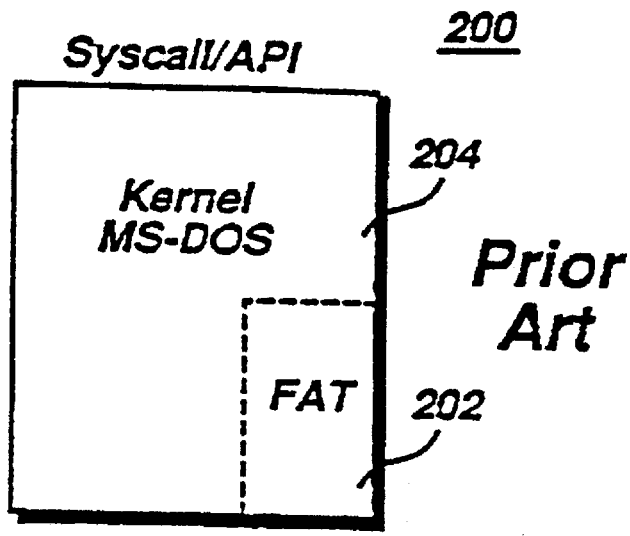
FIG. 2A is a diagram detailing the file system structure of the MS-DOS operating system.

FIG. 2A shows the file system structure of the prior art MS-DOS operating system. In the MS-DOS operating system 200, the FAT file system 202 is embedded in the operating system kernel 204. Since the FAT file system is integrated into the system kernel, it is difficult to modify. Furthermore, if additional file systems are required, the operating system kernel 204 must be rewritten to accommodate them.

Figure 2B:
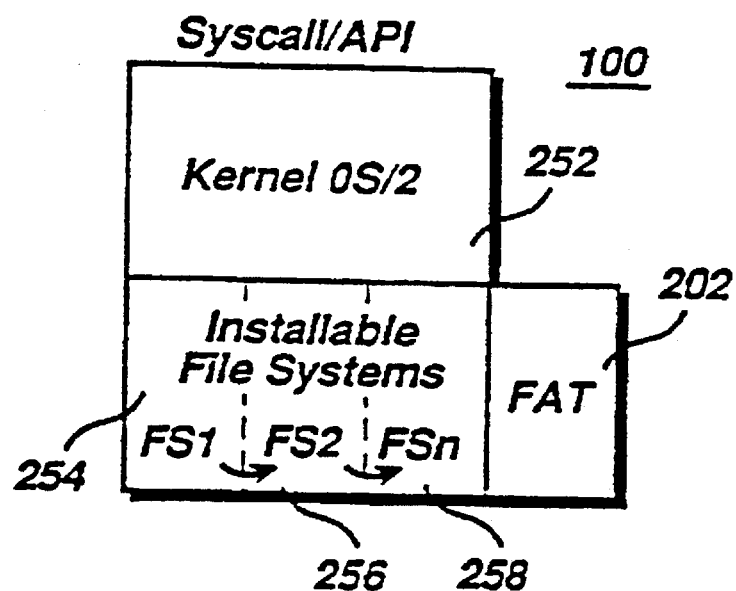
FIG. 2B is a diagram detailing the file system structure of the installable file system of the present invention.

The present invention overcomes the above mentioned problems with the system architecture shown in FIG. 2B. In the system 100, the OS/2 kernel 252 also includes the FAT file system 202 embedded therein. However, the present invention provides a method and means for dynamically attaching file system drivers 254, 256, 258 which are external to the operating system kernel 252. While the system 250 is shown with three installable file system drivers, the present invention is adapted to include a virtually unlimited number of file system drivers.

An installable file system driver (FSD) is analogous in many ways to a device driver. An FSD resides on the disk in a file that is structured like a dynamic-link library (DLL), typically with a SYS or IFS extension, and is loaded during system initialization by IFS= statements in the CONFIG.SYS file. IFS= directives are processed in the order they are encountered and are also sensitive to the order of DEVICE= statements for device drivers. This allows a user to load a device driver for a nonstandard device, load a file system driver from a volume on that device, and so on. Once an FSD is installed and initialized, the kernel communicates with it in terms of logical requests for file opens, reads, writes, seeks, closes, and so on. The FSD translates these requests using control structures and tables found on the volume itself into requests for sector reads and writes for which it can call special kernel entry points called File System Helpers (FsHlps). The kernel passes the demands for sector I/O to the appropriate device driver and returns the results to the FSD.

The procedure used by the operating system to associate volumes with FSDs is referred to as dynamic volume mounting and operates as follows. Whenever a volume is first accessed, or after it has been locked for direct access and then unlocked (for example, by a FORMAT operation), the operating system kernel presents identifying information from the volume to each of the FSDs in seriatim until an FSD recognizes the information. When an FSD claims the volume, the volume is mounted and all subsequent file I/O requests for the volume are routed to the FSD which claimed the volume.

This arrangement provides several advantages over the prior art. For example, if uncertain media is presented to the computer system, the computer system may scan the available file system drivers to locate a file system driver which recognizes the media thus providing for automatic mapping of file system driver to media. Furthermore, file system drivers may be updated without requiring a modification of the operating system kernel. In addition, as new types of peripheral devices are developed, appropriate file system drivers may be added to the operating system without disturbing existing system software.

Figure 3:
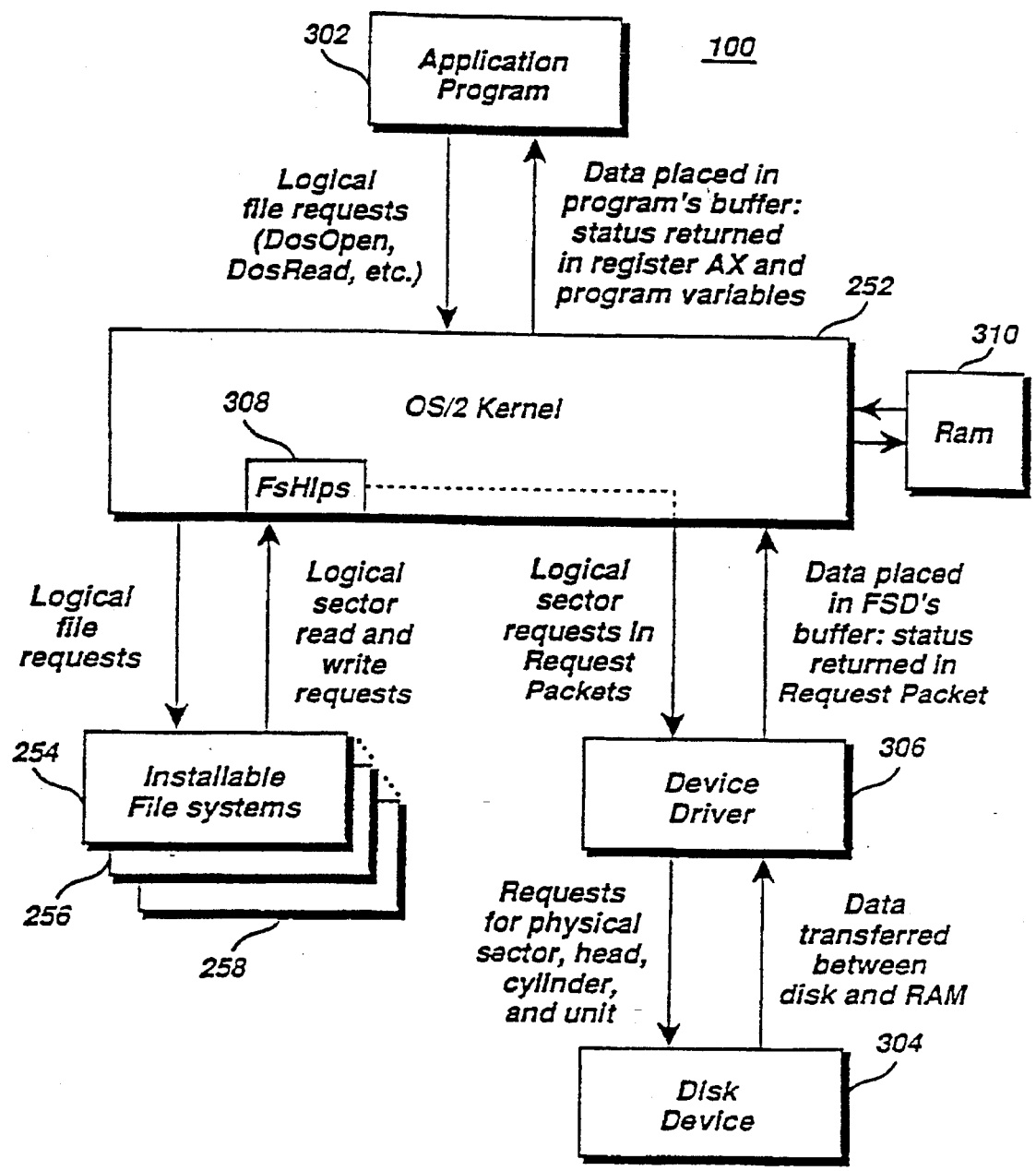
FIG. 3 is a more detailed diagram of the system of FIG. 2B.

A more detailed diagram of the system 100 is shown in FIG. 3. The system 100 includes an operating system kernel 252 which facilitates communication between an application program 302 and data storage devices such as disk device 304. The system 100 includes a device driver 306 which works in conjunction with a file system driver 254–258. While the system 100 is shown as including a single peripheral device 304, the present invention is adapted for use with any number of logical or physical peripheral devices.

In operation, the application program 302 issues logical file requests to the operating system kernel 252 by calling the entry points for the desired function. These functions may include requests to open files (DosOpen), to read files (DosRead), to write files (DosWrite), etc. The operating system kernel 252 passes these requests to the appropriate file system driver 254–258 for the particular volume holding the file. The appropriate installable file system driver then translates the logical file request into requests for reads or writes of logical sectors of the designated media and calls an operating system kernel file system helper 308 to pass these requests to the appropriate device driver 306. File system helpers are discussed in more detail below. The disk driver 306 transforms the logical sector requests from the operating system kernel into requests for specific physical units: cylinders, heads and sectors of the media, and issues commands to the disk device to transfer data between disk media and random access memory 310.

The mapping of physical devices into particular file systems is discussed in further detail below. In the MS-DOS environment, floppy disks are referred to as volumes. Fixed disks (or hard disks) may be partitioned into multiple volumes. This terminology applies to the present invention as well. Briefly, whenever the system 100 is first booted, whenever a volume is first accessed, or whenever the system determines uncertain media is present in disk device 304, the system examines the first file system driver in a linked list of file system drivers. If the file system driver recognizes the volume loaded in the disk device, the file system driver is mounted. Otherwise, the system sequentially polls the available file system drivers until a file system driver which recognizes the media is located. If no installable file system driver is found which recognizes the media of interest, a default file system driver is mounted. In the preferred practice of the present invention, the default file system is the FAT file system mentioned above.

Uncertain media may be detected in several ways. Many disk devices are provided with a mechanical latch mechanism which is exercised when a disk is ejected or installed in the disk device. The latch mechanism typically functions such that the next operation on the drive will indicate that the door has been opened. When the device driver receives this indication, ERROR_UNCERTAIN_MEDIA is returned to the operating system. In systems without mechanical latch mechanisms, it is assumed that media cannot be changed in less than a predetermined time interval. In the preferred practice of the present invention, this interval is assumed to be two seconds. Thus if a particular volume has not been accessed for more than the predetermined interval, the media is presumed to be uncertain.

Figure 4:
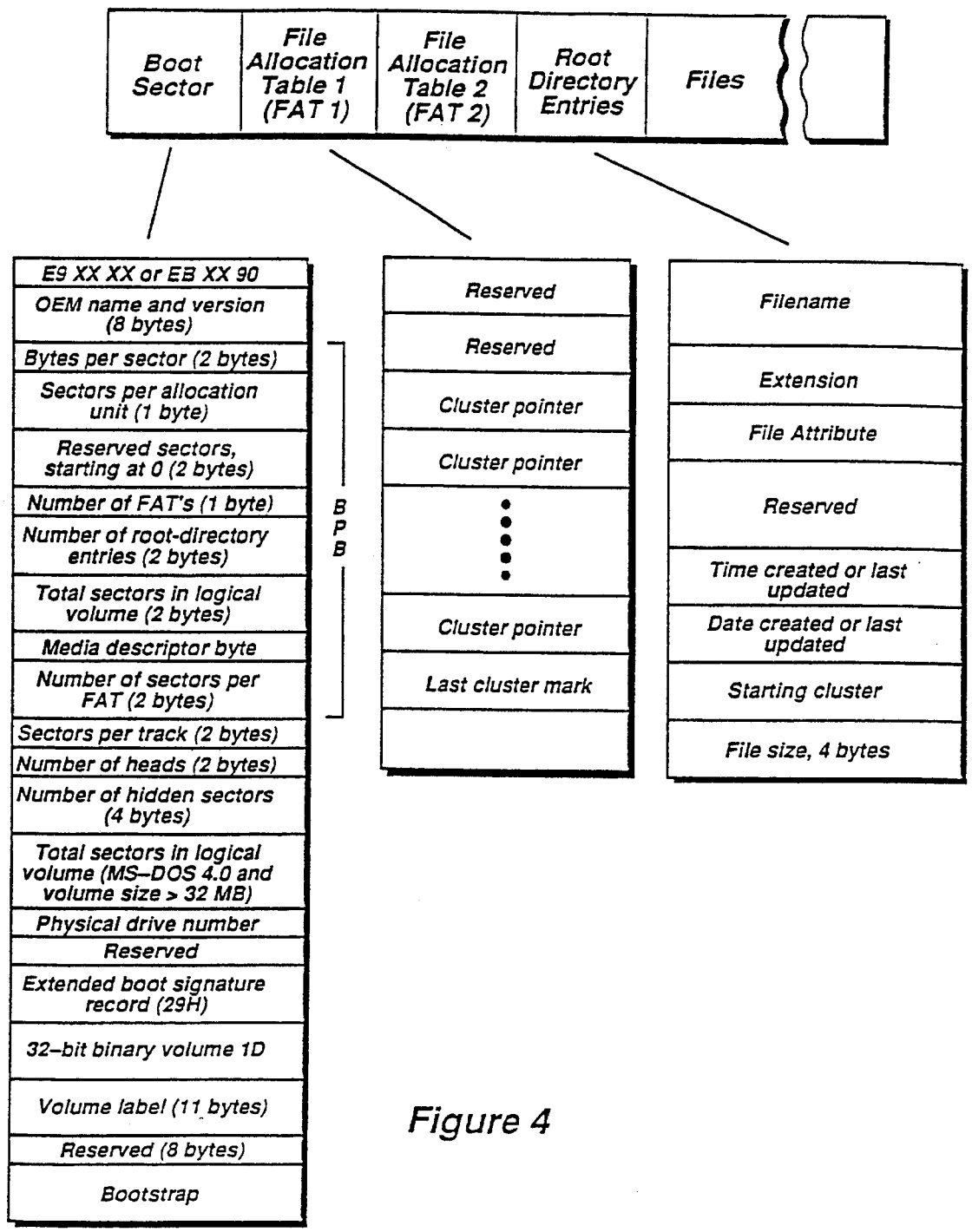
FIG. 4 is a diagram showing the disk format of the FAT file system.

FIG. 4 is a diagram of the disk format of the FAT file system. The FAT file system has been used with the MS-DOS operating system since its inception. A detailed description of the FAT file system may be found in Duncan, "Advance MS DOS Programming", Microsoft Press, 1986, 1988. A brief description of the FAT file system follows. The FAT file system revolves around the File Allocation Table. Each logical volume is associated with its own FAT, which serves two important functions: it contains the allocation information for each file on the volume in the form of linked lists of allocation units and it indicates which allocation units are free for assignment to a file that is being created or extended.

When a disk is formatted in accordance with the FAT file system, a boot sector is written in sector zero. This is followed by one or more file allocation tables. The file allocation tables are followed by a root directory. The root directory is followed by the volume files. The boot sector contains various descriptive information about the volume in an area referred to as the boot parameter block or BPB, information such as a drive number and a volume I.D. as well as a bootstrap routine.

The file allocation table is divided into fields that correspond directly to the assignable clusters on a disk (clusters are power-of-2 multiples of sectors). These fields are typically 16 bits wide. The first two fields in the FAT are reserved. The first reserved FAT entry contains a copy of a media descriptor byte which is also found in the BPB. The remaining reserved fields contain OFFH. The remaining FAT entries describe the use of their corresponding disk clusters. Each file's entry in a directory contains the number of the first cluster assigned to that file, which is used as an entry point into the FAT. From the entry point on, each FAT slot contains the number of the next cluster in the file, until a last-cluster mark is encountered. The FAT file system also provides for the option of maintaining a duplicate of the first file allocation table which may be used if access to a sector in the FAT fails due to a read error, etc.

Following the file allocation tables, is the root directory. The root directory contains 32 byte entries that describe files, other directories, and an optional volume label.

The remainder of the volume after the root directory is known as the files area which may be viewed as pools of clusters, each containing one or more logical sectors. Each cluster has a corresponding entry in the FAT that describes its current use: available, reserved, assigned to a file, or unusable.

The FAT file system provides excellent performance with volumes which are less than 1 Mb. However, as volumes increase in size over 1 Mb, the performance of the FAT file system quickly degrades. This has become an increasingly severe problem as the size of readily available hard disks is rapidly increasing.

When volumes are less than 1 Mb, the FAT is small enough to be retained in random access memory at all times, thus allowing very fast random access to any part of a file. When applied to hard disks or fixed disks, however, the FAT becomes too large to hold in memory and must be paged into memory in pieces. This results in many superfluous disk head movements, thus degrading system throughput. In addition, since information about disk free space is dispersed across many sectors of FAT, it is impractical to allocate file space contiguously, and files become fragmented, further degrading system throughput. Furthermore, the use of relatively large clusters on hard disks results in much wasted space.

Figure 5A:
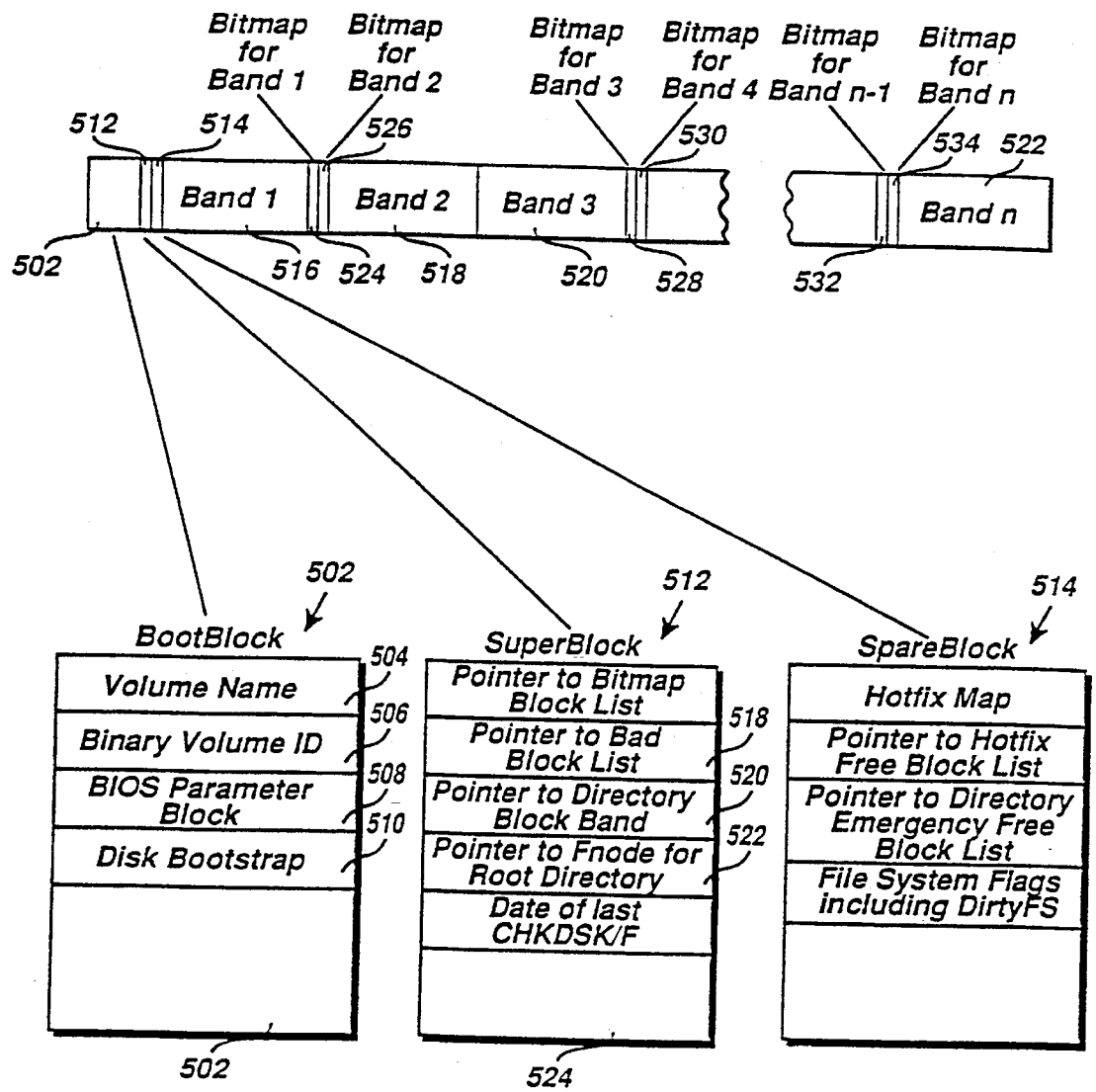
FIGS. 5A–5H are diagrams showing the disk format of the high-performance installable file system of the present invention.

FIGS. 5A–5H are a series of diagrams showing the disk format of one instance of an installable file system. This file system is referred to as the high performance file system (HPFS). The high performance file system of the present invention eliminates the above-mentioned problems with the FAT file system and provides superior performance with all types of disk media. Referring now to FIG. 5A, HPFS volumes can exist on a fixed disk along side of previously defined FAT partition types. HPFS volumes use a sector size of 512 bytes and have a maximum size of 2199 Gb ($2^{32}$ sectors). While primarily designed for use with fixed disks, HPFS is compatible with virtually any type of disk media.

An HPFS volume is required to have very few fixed structures. Sectors 0–15 of a volume (8 Kb) are allocated to the BootBlock 502 and contain a volume name field 504, a 32-bit volume ID field, a BIOS parameter block 508, and a disk bootstrap program 510. The disk bootstrap program 510 can be used in a restricted mode to locate and read operating system files wherever they may be found.

The BootBlock 502 is followed by a SuperBlock 512 and a SpareBlock 514. The SuperBlock 514 is only modified by disk maintenance utilities. It contains pointers 516 which point to free space bitmaps, a bad block list 518, a pointer 520 which points to a directory block band, and a pointer 522 which points to the root directory. It also contains a date field 524 which includes the date the volume was last checked and repaired with CHKDSK. CHKDSK is a well known OS/2 disk utility for detecting and cataloging bad portions of a disk.

The SpareBlock 514 contains various flags and pointers which will be further discussed below. It is modified as the system executes.

The remainder of the volume is divided into 8 Mb bands, e.g. bands 516–522 which are used for storing files. While FIG. 5A shows four 8 Mb bands, HPFS provides for a very large number of bands. Each band is provided with its own free space bitmap, see e.g. bitmaps 524–534. Each bit in the freespace bitmaps represents a sector. A bit is 0 if the sector is in use and 1 of the sector is available. The bitmaps are located at the head or tail of a band so that two bitmaps are adjacent between alternate bands. This allows the maximum contiguous free space that can be allocated to a file to be 16 Mb although the bitmap bandsize may be modified to accommodate files of virtually any size. One band, located at or towards the seek center of the disk, is called the directory block band and receives special treatment as will be further discussed below.

Figure 5B:
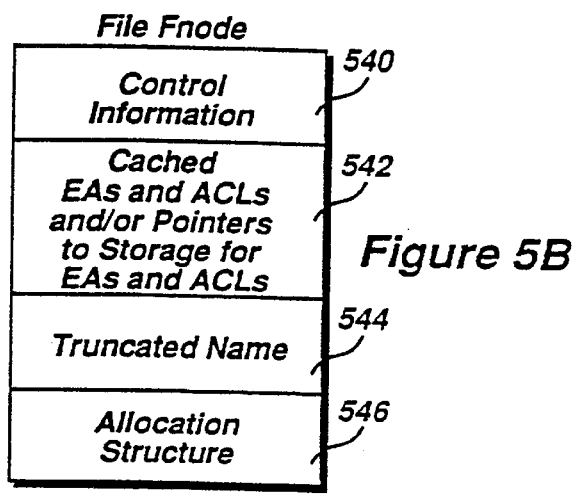
Figure 5C:
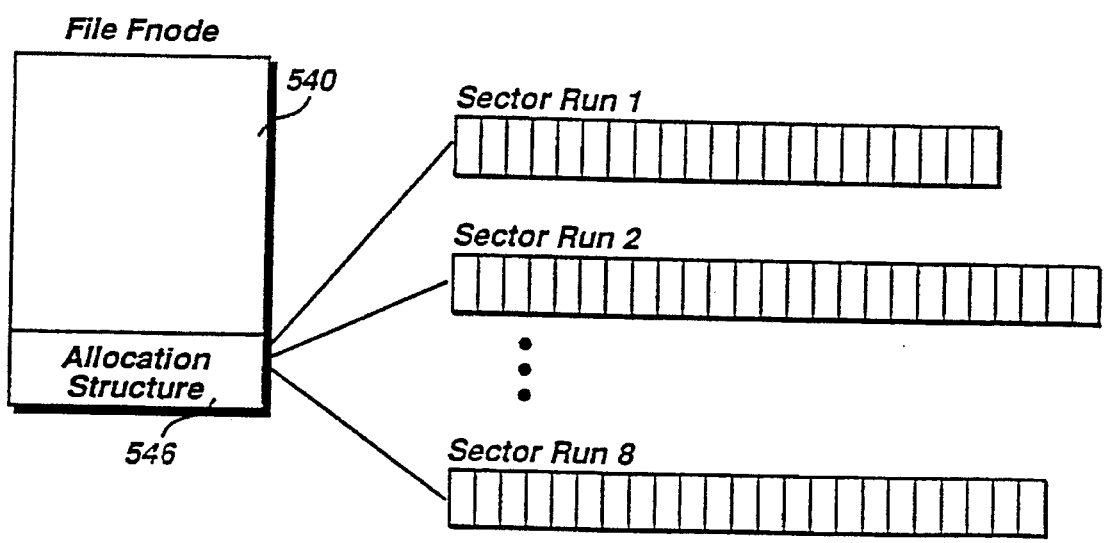

Every file or directory on an HPFS volume is anchored on a fundamental file system object called an Fnode which is shown in FIGS. 5B–5C. The Fnode 530 is the first sector allocated to a file or directory, and is pointed to by field 522 in the Superblock 512. Each Fnode occupies a single sector and contains control and access information field 540 used internally by the file system, an area 542 for storing extended attributes (EA) and access control lists (ACLs), a field 544 indicating the length and the first 15 characters of the name of the associated file or directory, and an allocation structure 546 as shown in FIG. 5B. An Fnode is always stored near the file or directory that it represents.

The allocation structure 546 shown in FIG. 5C takes several forms, depending on the size and degree of continuity of the file or directory. The HPFS of the present invention views a file as a collection of one or more runs or extents of one or more contiguous sectors. Each run is symbolized by a pair of double-words: a 32-bit starting sector number and a 32-bit length in sectors (this is referred to as run length encoding). From an application programs point of view, the extents are invisible; the file appears as a seamless stream of bytes.

The space reserved for allocation information in an Fnode can hold pointers to as many as eight runs of sectors of up to 16 Mb each. Reasonably small files of highly contiguous size can, therefore, be completely described within the Fnode.

Figure 5D:
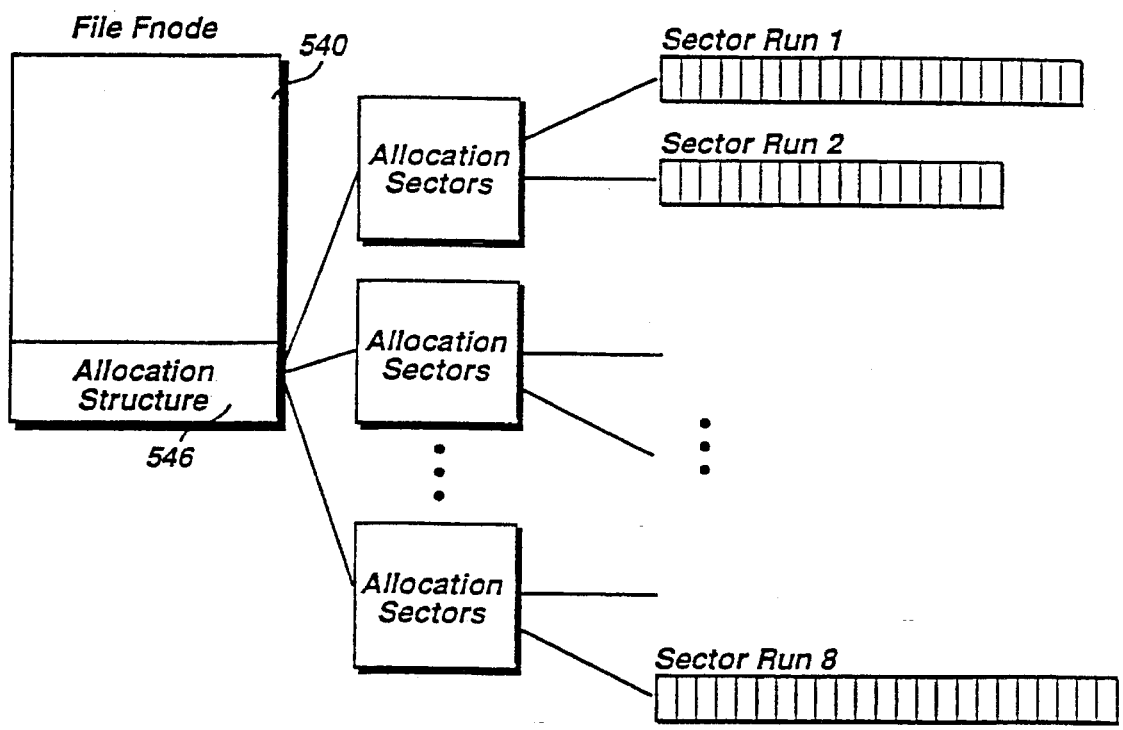

The HPFS employs a new method to represent the location of files that are too large or too fragmented for the Fnode and consist of more than eight runs. The Fnode's allocation becomes the root for a B+ tree of allocation sectors, which in turn contain the actual pointers to the file's sector runs as shown in FIG. 5D. The concept of B+ trees and B– trees is discussed in detail below. The Fnode's root has room for 12 elements. Each allocation sector can contain, in addition to various control information, as many as 40 pointers to sector runs. Therefore, a two level allocation B+ Tree can describe a file of 480(12*40) sector runs, with a theoretical maximum size of 7.68 Gb (12,40,16 Mb) in the preferred practice of the present invention.

In the unlikely event that a two-level B+ Tree is not sufficient to describe a highly fragmented file, the HPFS file system introduces additional levels in the tree as required. Allocation sectors in the intermediate levels can hold as many as 60 internal (nonterminal) B+ tree nodes, which means that the descriptive ability of this structure rapidly grows to numbers that are extremely large. For example, a three-level allocation B+ Tree can describe as many as 28,800 (12*60*40) sector runs.

Run-length encoding and B+ Trees of allocation sectors are a memory efficient way to specify a file's size and location and offer several significant advantages over the prior art. Translating a logical file offset into a sector number is extremely fast: the file system merely traverses the list (or B+ Tree of lists) of run pointers, summing up run sizes until the correct range is found. It can then identify the sector within the run with a simple calculation. Run-length encoding also makes it trivial to extend the file logically if the newly assigned sector is contiguous with the file's previous last sector; the file system merely increments the size double-word of the file's last run pointer and clears the sector's bit in the appropriate freespace bitmap.

Figure 5E:
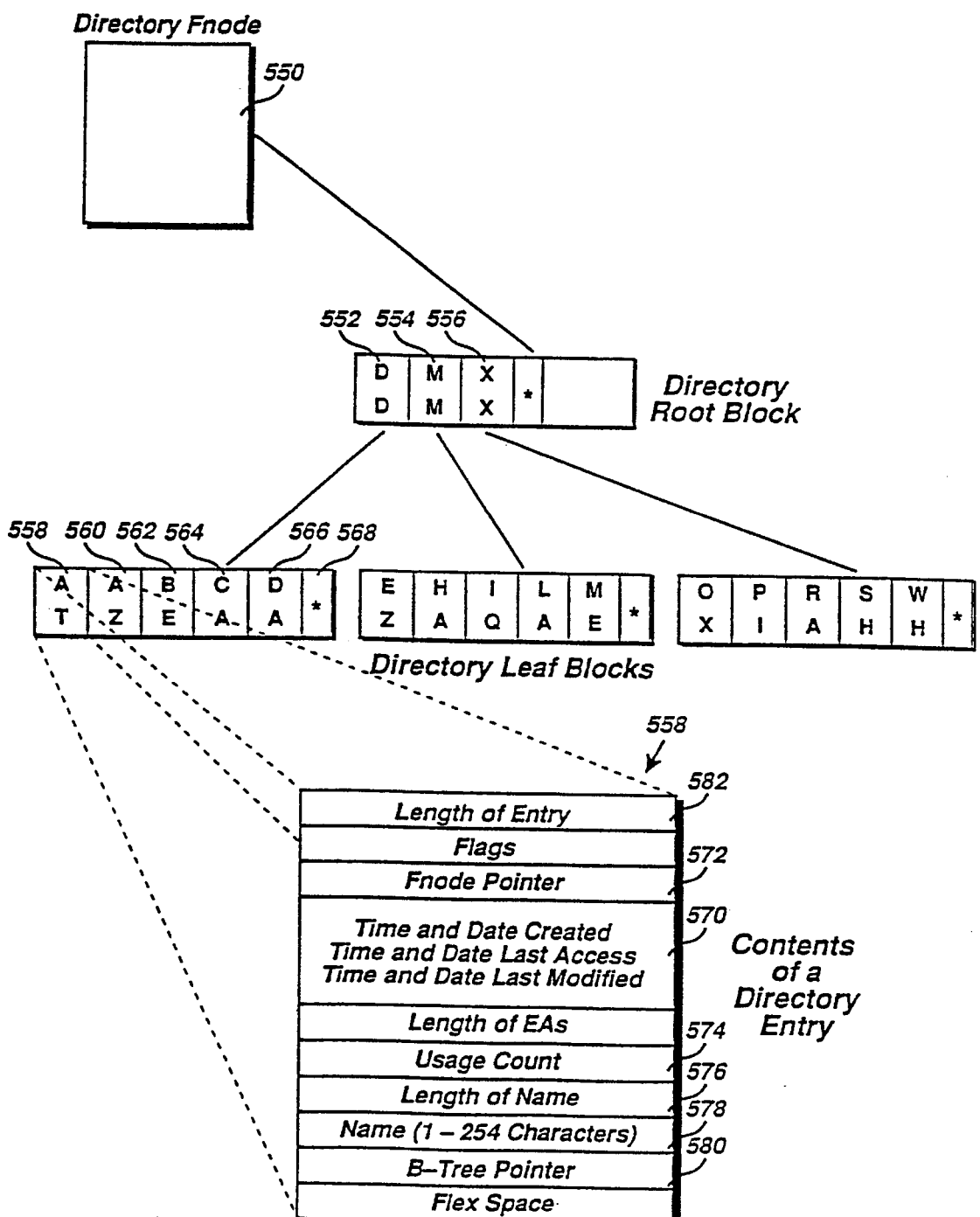

Directories, like files, are anchored on Fnodes. A pointer 522 to the Fnode for the root directory is found in the SuperBlock 512. FIG. 5E shows the directory structure of the present invention wherein a directory Fnode 550 is shown. The Fnodes for directories other than the root are reached through subdirectory entries in their parent directories.

Directories are built up from 2 Kb directory blocks, which are allocated as four consecutive sectors on the disk and can grow to any size. See e.g. directory blocks 552, 554, 556. The file system attempts to allocate directory blocks in the directory band, which is located at or near the seek center of the disk. Once the directory band is full, the directory blocks are allocated wherever space is available.

Each 2 Kb directory block may contain from one to many directory entries. See e.g. entries 558–568. A directory entry contains several fields, including a field 570 for time and date stamps, a field 572 which contains an Fnode pointer, a usage count field 574 for use by disk maintenance programs (which are well known), a field 576 which contains the length of the file or directory name, a field 578 for the name itself, and a field 580 which contains B– Tree pointer, as shown in FIG. 5E. Each directory entry begins with a word 582 that contains the length of the entry. This provides for a variable amount of flex space at the end of each entry, which can be used by special versions of the file system and allows the directory block to be traversed very quickly.

The number of entries in a directory block varies with the length of names. If the average filename length is 13 characters, an average directory block will hold approximately 40 entries. The entries in a directory block are sorted by the binary lexical order of their name fields. The last entry is a dummy record that marks the end of the block.

When a directory gets too large to be stored in one block, it increases in size by the addition of 2 Kb blocks that are organized as a B– Tree. When searching for a specific name, the file system traverses a directory block until it either finds a match or finds a name that is lexically greater than the target. In the latter case, the file system extracts the B– Tree pointer from the entry. If this pointer points to nowhere, the search failed; otherwise, the file system follows the pointer to the next pointer to the next directory block in the tree and continues the search.

Assuming 40 entries per block, a two-level tree of directory blocks can hold 1640 directory entries and a three level tree can hold 65,640 entries. In other words, a particular file can be found (or shown not to exist) in a typical directory of 65,640 files with a maximum of three disk accesses. The actual number of disks accesses depends on cache contents and the location of the file's name in the directory block B– Tree. This presents a vast improvement over the FAT file system where in a worst case, 4,000 sectors would have to be read to establish whether a file was present in a directory containing the same number of files.

The B- Tree directory structure of the HPFS has interesting implications beyond its effect on open and find operations. A file creation, renaming, or deletion may result in a cascade of complex operations, as directory blocks are added or freed or names are moved from one block to the other to keep the tree balanced. In fact, a rename operation could fail for lack of disk space even though the file itself is not growing. In order to avoid this problem, the HPFS reserves a small pool of free blocks that can be drawn from in a directory emergency; a pointer to this pool is preferably stored in the SpareBlock.

File attributes are information about a file that is maintained by the operating system outside the file's overt storage area.

The HPFS of the present invention supports Extended Attributes (EAs) taking the form name=value except that the value portion can be either a null-terminated (ASCIIZ) string or binary data. In the preferred practice of the present invention, each file or directory can have a maximum of 64 Kb of EAs attached to it although this limit may be readily modified.

The storage method for EAs can vary. If the EAs associated with a given file or directory are small enough, they will be stored in the Fnode. If the total size of the EAs is too large, they are stored outside the Fnode in sector runs, and a B+ Tree of allocation sectors is created to describe the runs. If a single EA gets too large, it may be pushed outside the Fnode into a B+ Tree of its own.

The present invention provides an improvement to the OS/2 kernel API functions DOSQFileInfo and DosSetFileInfo that allow application programs to manipulate extended attributes for files. The present invention further provides two new functions DOSQPathInfo and DosSetPathInfo which may be used to read or write the EAs associated with arbitrary pathnames. An application program may either request the value of a specific EA (supplying a name to be matched) or can obtain all of the EAs for the file or directory at once. The support of EAs facilitates the use of object oriented application programming. Information of almost any type can be stored in EAs, ranging from the name of the application that owns the file, names of dependent files, icons, and executable code.

The HPFS attacks potential bottlenecks in disk throughput at multiple levels. It uses advanced data structures, contiguous sector allocation, intelligent caching, read-ahead, and deferred writes in order to boost performance. First, the HPFS matches its data structures to the task at hand: sophisticated data structures (B- Trees and B+ Trees) for fast random access to filenames, directory names, and lists of sectors allocated to files or directories, and simple compact data structures (bitmaps) for locating chunks of free space of the appropriate size. The routines that manipulate these data structures are preferably written in assembly language.

The main objective of the HPFS is to assign consecutive sectors to files whenever possible. The time required to move the disk's read/write head from one track to another far outweighs the other possible delays, so the HPFS avoids or minimizes such head movements by allocating file space contiguously and by keeping control structures such as Fnodes and freespace bitmaps near the things they control. Highly contiguous files also help the file system make fewer requests of the disk driver for more sectors at a time, allow the disk driver to exploit the multisector transfer capabilities of the disk controller, and reduce the number of disk completion interrupts that must be serviced.

Keeping files from becoming fragmented in a multitasking operating system in which many files are being updated concurrently is a feature not found in the prior art. One strategy the HPFS uses is to scatter newly created files across the disk in separate bands, if possible, so that the sectors allocated to the files as they are extended will not be interleaved. Another strategy is to preallocate 4 Kb of contiguous space to the file each time it must be extended return any excess when the file is closed.

If an application knows the ultimate size of a new file in advance, it may assist the HPFS by specifying an initial file allocation when it creates a file. The system then searches all the free space bitmaps to find a run of consecutive sectors large enough to hold the file. That failing, it searches for two rounds that are half the size of the file, and so on.

The HPFS relies on several different kinds of caching to minimize the number of physical disk transfers it requests. It caches sectors, as did the FAT file system. But unlike the FAT file system, the HPFS manages very large caches efficiently and adjusts sector caching on a per-handle basis to the manner in which a file is used. The HPFS also caches pathnames and directories, transforming disk directory entries in to an even more compact and efficient in memory representation.

Another technique that the HPFS uses to improve performance is to preread data it believes the program is likely to need. For example, when a file is opened, the file system will preread and cache the Fnode and the first few sectors of the file's contents. If the file is an executable program or the history information in the file's Fnode shows that an open operation has typically been followed by an immediate sequential read of the entire file, the file system will preread and cache much more of the file's contents. When a program issues relatively small read requests, the file system always fetches data from the file in 2 Kb chunks and caches the excess, allowing most read operations to be satisfied from the cache.

The HPFS of the present invention relies heavily on lazy writes based on OS/2 multitasking capabilities (sometimes called deferred writes or write behind) to improve performance. For example, when a program requests a disk write, the data is placed in the cache and the cache buffer is flagged as dirty (that is, inconsistent with the state of the data on disk). When the disk becomes idle or the cache becomes saturated with dirty buffers, the file system uses a captive thread from a daemon process to write the buffers to disk, starting with the oldest data. Captive threads and daemon processes are described in a series of texts: Hastings, et al. "Microsoft OS/2 Programmers Reference", Microsoft Press, 1989.

In general, lazy writes mean that programs run faster because their read requests will typically not be stalled waiting for a write request to complete. For programs that repeatedly read, modify, and write a small working set of records, it also means that many unnecessary or redundant physical disk writes may be avoided. Lazy writes have their certain dangers, and therefore, the present invention provides that a program can defeat them on a per-handle basis by setting the write-through flag in the OpenMode parameter for DosOPen, or it can commit data to disk on a per-handle basis with the DosBufReset function. Both DosOpen and DosBufReset functions are available in current versions of OS/2.

The extensive use of lazy writes makes it imperative for the HPFS to be able to recover gracefully from write errors under any but the most dire circumstances. For example, by the time a write is known to have failed, the application has long since gone on its way under the illusion that it has safely shipped the data into disk storage. The errors may be detected by hardware (such as a "sector not found" error returned by the disk adapter), or they may be detected by the disk driver in spite of the hardware during a read-after-write verification of the data.

The primary mechanism for handling write errors is referred to as a hotfix. When an error is detected, the file system takes a free block out of a reserved hotfix pool, writes the data to that block, and updates the hotfix map. (The hotfix map is simply a series of pairs of doublewords, with each pair containing the number of a bad sector associated with the number of its hotfix replacement.) A copy of the hotfix map is then written to the SpareBlock, and a warning message is displayed to let the user know that there is a problem with the disk device.

Each time the file system requests a sector read or write from the disk driver, it scans the hotfix map and replaces any bad sector numbers with the corresponding good sector holding the actual data.

One of CHKDSK's duties is to empty the hotfix map. For each replacement block on the hotfix map, it allocates a new sector that is in a favorable location for the file that owns the data, moves the data from the hotfix block to the newly allocated sector, and updates the file's allocation information (which may involve rebalancing allocation trees and other elaborate operations). It then adds the bad sector to the bad block list, releases the replacement sector back to the hotfix pool, deletes the hotfix entry from the hotfix map, and writes the updated hotfix map to the SpareBlock.

The HPFS maintains a Dirty FS flag in the SpareBlock of each HPFS volume. The flag is cleared when all files on the volume have been closed and all dirty buffers in the cache have been written out or, in the case of the boot volume, when Shutdown has been selected and has completed its work.

During the OS/2 boot sequence, the file system inspects the DirtyFS flag on each HPFS volume and, if the flag is set, will not allow further access to that volume until CHKDSK has been run. If the DirtyFS flag is set on the boot volume, the system will run CHKDSK automatically.

In the event of a truly major catastrophe, such as loss of the SuperBlock or the root directory, the HPFS is designed to give data recovery the best possible chance of success. Nearly every type of crucial file object, including Fnodes, allocations sectors, and directory blocks, is doubly linked to both its parent and its children and contains a unique 32-bit signature. Fnodes also contain the initial portion of the name of their file or directory. Consequently, SHODS can rebuild an entire volume by methodically scanning the disk for Fnodes, allocations sectors, and directory blocks, using them to reconstruct the files and directories and finally regenerating the freespace bitmaps.

As mentioned above, the present invention employs B+ trees and B− trees (binary trees) for logically ordering files and directories. Binary trees are a technique for imposing a logical ordering on a collection of data items by means of pointers, without regard to the physical order of the data.

Figure 5F:
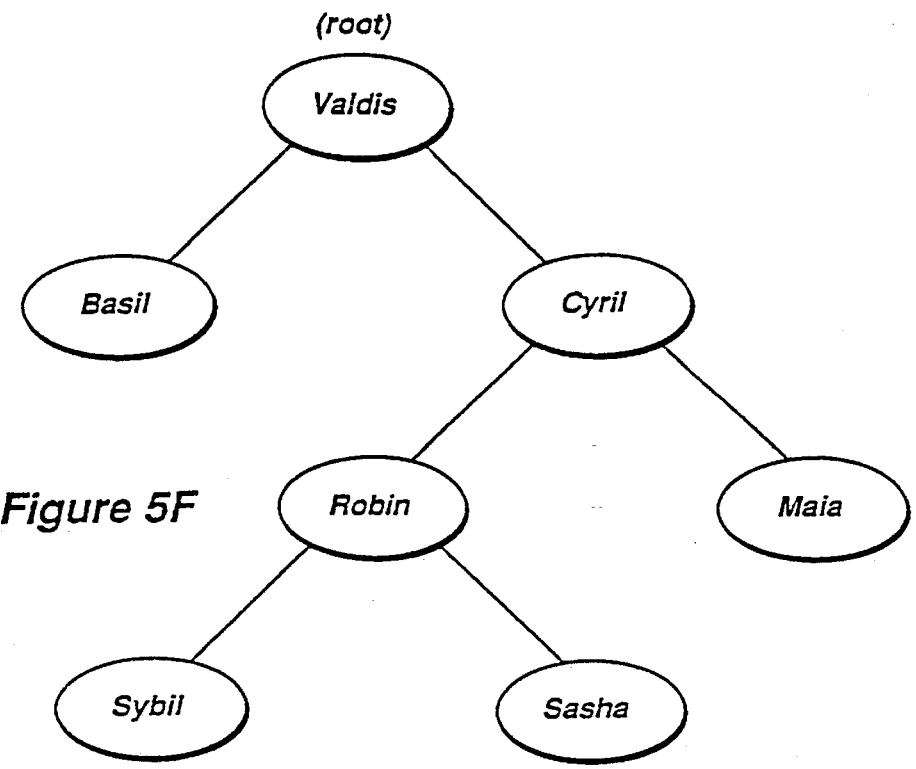

Referring now to FIGS. 5F, in a simple binary tree, each node contains some data, including a key value that determines the node's logical position in the tree, as well as pointers to the node's left and right subtrees. The node that begins the tree is known as the root; the nodes that sit at the ends of the tree's branches are sometime called the leaves.

To find a particular piece of data, the binary tree is traversed from the root. At each node, the desired key is compared with the node's key; if they don't match, one branch of the node's subtree or another is selected based on whether the desired key is less than or grater than the node's key. This process continues until a match is found or an empty subtree is encountered as shown in FIG. 5F.

Such simple binary trees, although easy to understand and implement, have disadvantages in practice. If keys are not well distributed or are added to the tree in a non-random fashion, the tree can become quite asymmetric, leading to wide variations in tree traversal time.

In order to make access times uniform, many programmers prefer a particular type of balanced tree known as a B− Tree as shown in FIG. 5. The important points about a B− Tree are that the data is stored in all nodes, more than one data item might be stored in a node, and all of the branches of the tree are of identical length.

The worst-case behavior of a B− Tree is predictable and much better than that of a simple binary tree, but the maintenance of a B− Tree is correspondingly more complex. Adding a new data item, changing a key value, or deleting a data item may result in the he splitting or merging of a node, which in turn forces a cascade of other operations on the tree to rebalance it.

Figure 5G:
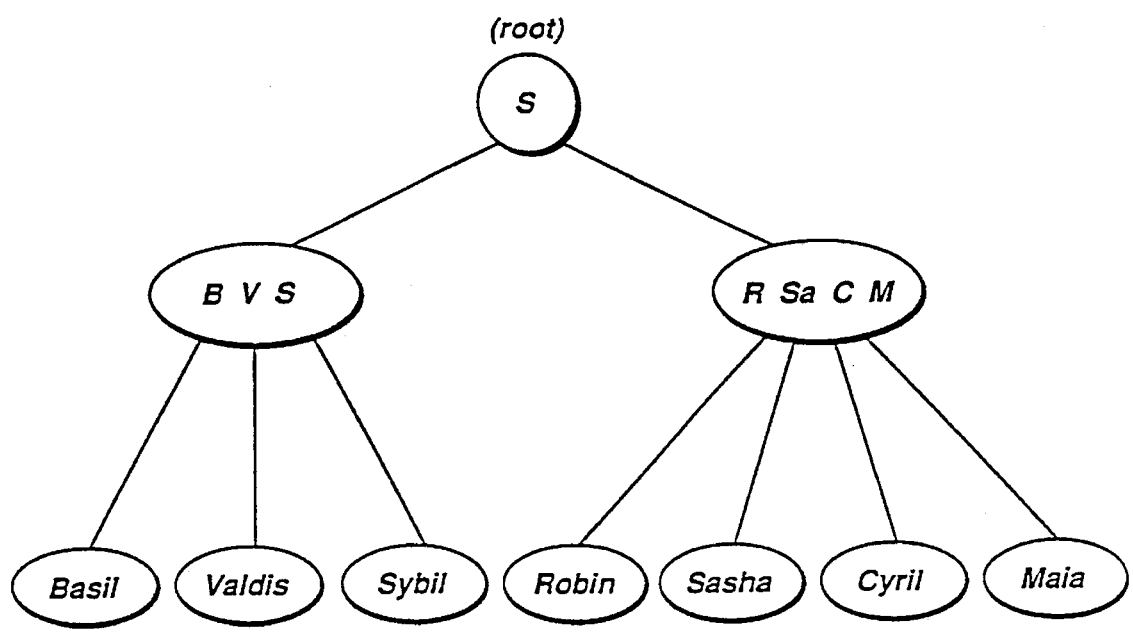
Figure 5H:
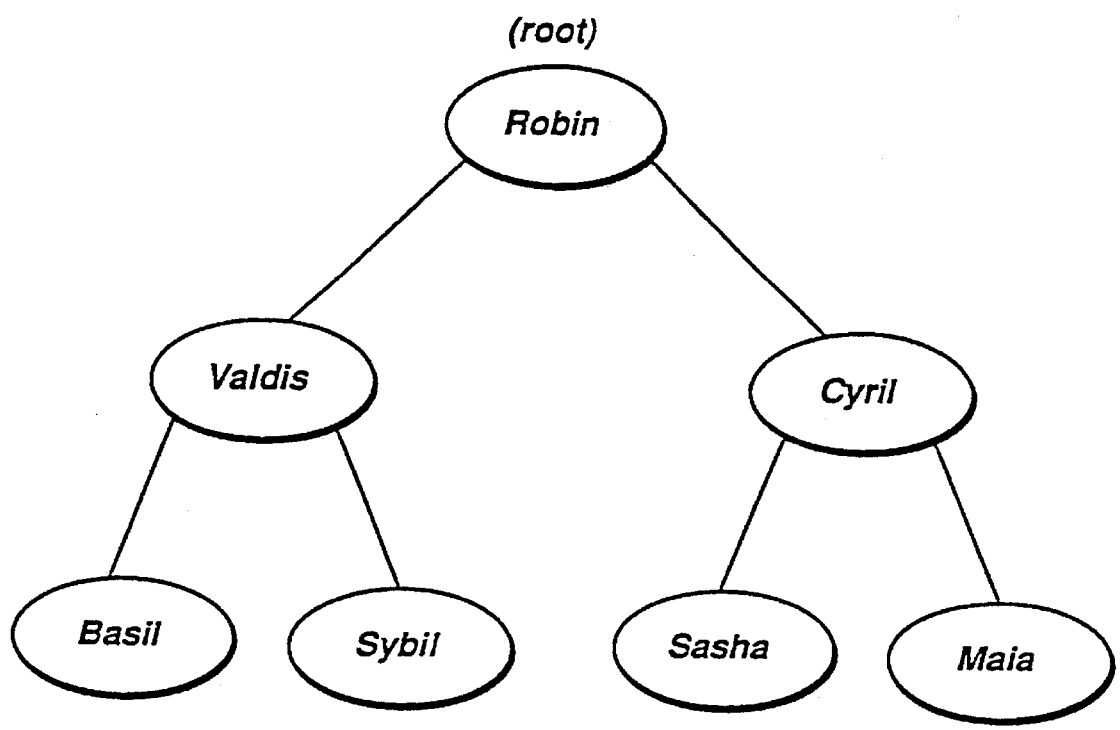

As shown in FIG. 5G, a B+ Tree is a specialized form of B− Tree that has two types of nodes: internal, which only point to other nodes, and external, which contain the actual data.

The advantage of a B+ Tree over a B− Tree is that the internal nodes of the B+ Tree can hold many more decision values than the intermediate-level nodes of a B− Tree, so the fan out of the tree is faster and the average length of a branch is shorter. This compensates for the fact that a B+ Tree branch must be followed to its end to find the necessary data, whereas in a B− Tree the data may be discovered at an intermediate node or even at the root.

The present invention comprises an improvement to the OS/2 operating system and may be implemented with many of the utilities and subroutines available in current versions of OS/2. While primarily intended for use with the OS/2 operating system, the principles of the present invention may be applied to virtually any computer operating system. With the exception of the new utilities and subroutines described herein, all other utilities and subroutines are currently available and well known. For a detailed description of the OS/2 operating system refer to the OS/2 Programmer's Reference texts described above. Volume Management in the improved OS/2 operating system of the present invention is responsible for the same duties it performed in previous versions of OS/2 such as detecting when the wrong volume is inserted in the drive, detecting when a volume has been removed, generating new information on new media that has been placed in the drive via the Volume Parameter Block (VPB), communicating with the appropriate device drivers, providing the system with device information needed to access new inserted media, interfacing with the Buffer and CDS mechanisms, and informing the system of changes to a specific volume.

In previous versions of OS/2, there was only one file system. The present invention provides for multiple file systems in a unified environment. The volume manager determines which file system should have access to a particular volume, provides mechanisms that will allow file system drivers (FSDs) to manage their resources for a particular volume, and provides the same support for all FSDs provided in the past for managing volumes. The present invention relies on existing wellknown OS/2 calls as well as several new functions described herein. A complete description of the installable file system of the present invention is set forth in Appendix I which is attached hereto in the form of microfiche and is herein incorporated by reference.

The present invention contemplates the use of MOUNT and UNMOUNT processes to facilitate the identification and loading of the correct file system driver for individual volumes.

The MOUNT Process gets initiated by several different events:

1. The first access to a volume.

2. Whenever the volume in a drive becomes uncertain. (This usually means the user put a new medium in the drive.)

3 Whenever access to a volume that is not in the drive is requested.

Input to the MOUNT process is a pointer to a drive parameter block (DPB) which is used to do I/O to the device driver and to store the handle to the VPB for the volume currently believed to be in the drive. A mount operation updates this. A local VPB is allocated on a stack and initialized with the DPB pointer.

Figure 6:
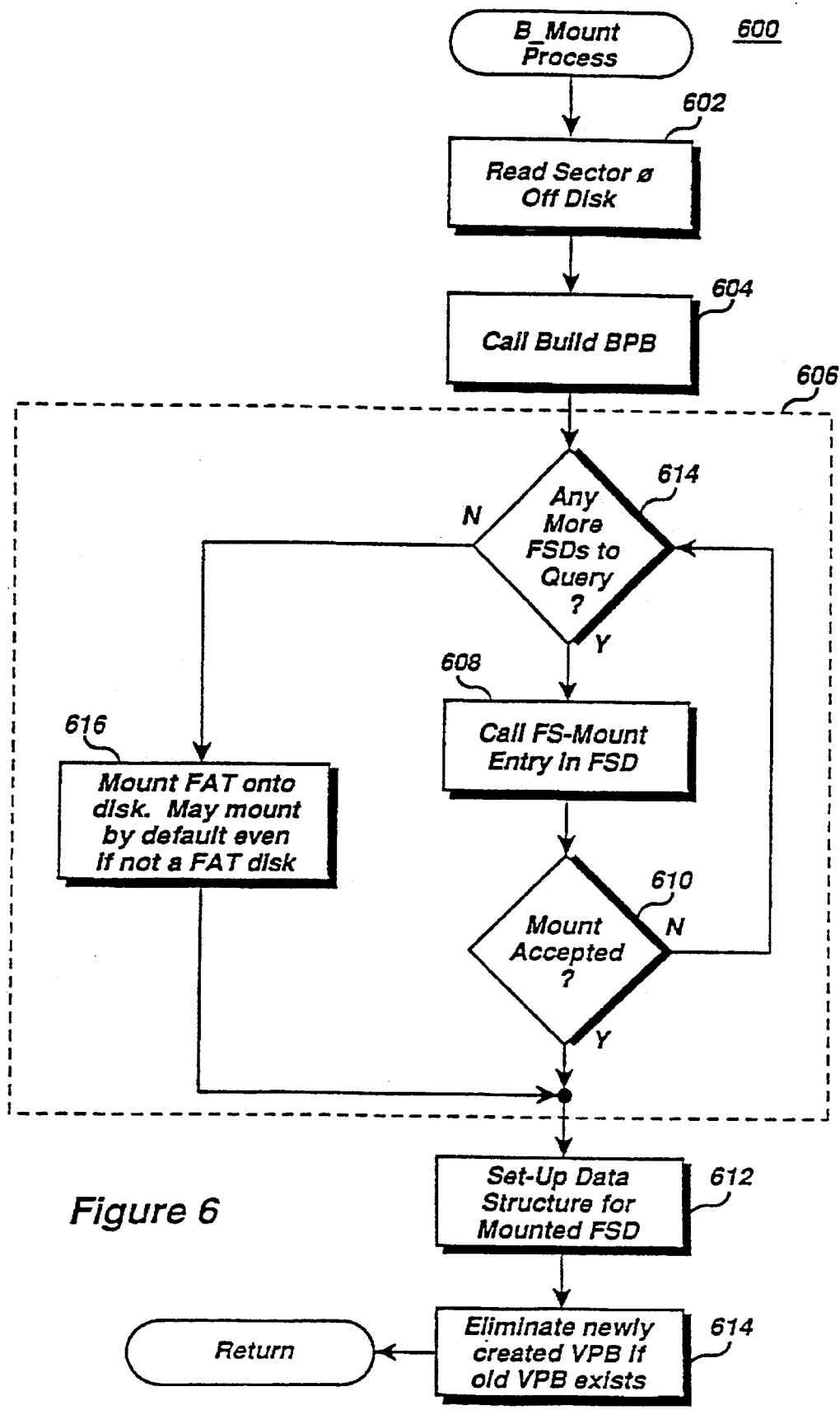
FIG. 6 is a flow diagram detailing the overall operation of the mount process of the present invention.

Referring now to FIG. 6, the MOUNT process 600 begins by reading logical sector 0 of the media as indicated by item 602. Any errors encountered from the device driver are ignored because it is possible that different types of media (i.e Optical Disk or CD-ROM) may have track 0 unreadable. Before reading logical sector 0 the temporary mount buffer is initialized to zeros. The Volume label text field is initialized to "UNLABELED". Sector 0 is checked to determine whether the format is recognized by comparing signature byte for a special value (41). If the format is not recognized, the information pertinent to the VPB is filled in on the stack (i.e 32 Bit Volume Serial Number).

A BUILDBPB call is then issued by item 604 to the device driver specified in the DPB. BUILDBPB is a procedure exported by a device driver. A detailed description of the BUILDBPB procedure is set forth in Appendix I. BUILDBPB is called to learn the physical parameters of the device (bytes per sector, sectors per track, and the like.) The device driver is passed a pointer to the buffer that contains information it can use to determine the physical parameters of the volume. For most drivers this is sector 0, for some very old ones it is the first sector of the FAT. If the device is not able to interpret the data read from Sector 0 (for example, the floppy in question is not FAT, so the FAT ID byte is meaningless) the device returns a minimal BPB, adequate to allow the kernel and FSDs to do necessary I/O to completely identify the volume.

The relevant fields from the previously created BPB are copied into the Local VPB on the stack (i.e Sectors/track, NumberofHeads, Total Sectors, Sector Size). A new VPB is allocated and information from the Local VPB is copied into it. The present invention then enters loop 606 to poll each FSD by calling the FS_MOUNT (flag=0) entry point with the handle of newly created VPB, a pointer to logical sector 0, and pointers to VPB file system independent and dependent areas of the VPB as indicated by item 608. The FSD may call FSH_DoVolIO to read other sectors from the volume (It must allocate its own buffer). If the FSD returns ERROR_UNCERTAIN_MEDIA, the error is returned and the process is restarted as indicated by decision 610. If the FSD supports boot sectors, it may check the file system name field in the boot sector to determine whether it recognizes it. If the FSD does not support boot sectors I/O to the device is performed to determine if the FSD recognizes the volume. Once an FSD has recognized the volume it updates the relevant fields in the VPB file system independent and dependent areas as indicated by item 612. The VPB file system independent and dependent areas are discussed in more detail in conjunction with FIG. 7. At this time the FSD invokes a FS Helper (FSH) function to determine whether the new volume is the same as any of the other volumes that the present invention manages. This FS Helper returns pointers to the file system independent and dependent areas. The FSD then copies information from the newly created VPB to old VPB as indicated by item 614. The newly created VPB is destroyed after the MOUNT call. The FSD then performs any cleanup work on the old VPB such as invalidating any buffers since the volume may have been removed from the drive.

Once an FSD has recognized the volume, the present invention eliminates the new VPB if a match is found in the list. Otherwise, the VPB is linked into a list of mounted FSDs. If no FSDs are recognized, the VPB is freed and the FAT file system is mounted as indicated by decision 614 and item 616.

When a new volume is inserted into a drive and the old volume has no more kernel references to the old volume the present invention issues a FS_MOUNT (flag=2) to the FSD so that resources allocated to that volume may be de-allocated.

When the present invention detects that a newly inserted volume is different than the last volume in the drive a FS_MOUNT (flag=1) call is issued to the FSD so that any cleanup type work such as buffer invalidation on the removed volume may be performed. If there are no more kernel references to the volume, a FS_MOUNT (flag=2, UNMOUNT) will follow. If the newly inserted volume is the same as the last seen volume in the drive, this call is not issued.

The present invention contemplates the use of an efficient mechanism to utilize existing kernel resources for functions required by an FSD. Specifically, if an FSD requires a function existing within the kernel, the FSD issues a file system helper (FSH) call which invokes the file system helper. The called FSH then returns the requested information. A brief summary of file system helpers is set forth below. While the summary set forth below lists several important file system helpers, it is contemplated that additional file system helpers will be provided as required. File system helpers are discussed in detail in Appendix I.

File System Helpers:

FSH_GETVOLPARM—On many FS calls, the handle to the VPB is passed to the FSD and it is often necessary for the FSD to access the file system independent and dependent areas of the VPB. This helper provides that service.

FSH_DOVOLIO—When an FSD needs to perform I/O to a specified volume it uses this helper to insure that the requested volume is indeed in the drive, to call the appropriate device driver and to handle hard errors. This helper may be used at all times within the FSD. When called within the scope of a FS_MOUNT call, it applies to the volume in the drive. However, since volume recognition is not complete until the FSD returns to the FS_MOUNT call, the FSD must take care when an ERROR_UNCERTAIN_MEDIA is returned. This indicates that the media has gone uncertain while trying to identify the media in the drive. This may indicate that the volume that the FSD was trying to recognize was removed. In this case, the FSD releases any resources attached to the hVPB passed in the FS_MOUNT call and ERROR_UNCERTAIN_MEDIA is returned to the FS_MOUNT call. This directs the volume tracking logic to restart the mount process.

FSH_DUPLICATEVPB—During a FS_MOUNT call the input VPB may be the same volume as one of the other volumes being managed. It is the responsibility of the FSD generate up-to-date information on the new volume and copy that information to the older duplicate VPB. This helper determines if an older duplicate VPB exists and if it does, pointers to the file system independent and dependent areas of the older duplicate VPB will be returned so that these areas can be updated by the FSD. The FSD then performs any cleanup work on the old volume since the volume may have been removed.

As mentioned above, the present invention contemplates the use of pre-existing OS/2 resources whenever possible. The listing below is a summary of the hierarchy of functions invoked during the operation of the present invention.

TABLE 1

| | |
|---|---|
| 1 | DoVolIO |
| 1.1 | WhatVolume |
| 1.1.1 | ProbeChange |

TABLE 1-continued

| | |
|---|---|
| 1.1.2 | ResetMedia |
| 1.1.3 | GenhVPB |
| 1.1.3.1 | LockVBuf |
| 1.1.3.2 | ReadBoot |
| 1.1.3.3 | BuildBPB |
| 1.1.3.4 | FSMountVolume |
| 1.1.3.4.1 | Bmp_Get |
| 1.1.3.4.2 | VPBCopy |
| 1.1.3.4.3 | VPBLink |
| 1.1.3.4.4 | VPBFind |
| 1.1.3.4.5 | VPBFree |
| 1.1.3.5 | SetVPB |
| 1.1.3.6 | FindVID |
| 1.1.3.7 | DiskIO |
| 1.1.3.8 | CRC |
| 1.1.3.9 | VPBFIND |
| 1.1.3.10 | Bmp_Get |
| 1.1.3.11 | VPBCopy |
| 1.1.3.12 | VPBLink |
| 1.1.3.13 | UnlockVBuf |
| 1.1.3.14 | BufInvalidate (Redetermine Media) |
| 1.1.3.15 | FlushBuf (Redetermine Media) |
| 1.1.4 | IncVPBRef |
| 1.1.5 | DecVPBRef |
| 1.1.5.1 | VPBFree |
| 1.1.6 | ResetCurrency |
| 1.1.6.1 | NextCDS |
| 1.1.6.2 | PointComp |
| 1.1.6.3 | BufInvalidate |

The present invention is invoked whenever media becomes uncertain or whenever media is first accessed. The volume management function of the present invention is represented by line 1. The initial process is to determine what volume has been presented to the system as indicated by line 1.1. In line 1.1.1, ProbeChange is called to access the device driver to determine if the device driver detected a change in media. If a change in media was detected, ResetMedia is invoked in line 1.1.2 to instruct the device driver to allow I/O to the media. GenhVPB is then invoked in line 1.1.3 to generate a volume parameter block. This process begins with line 1.1.3.1 where LockVBuf is called to clear and serialize a buffer in the operating system kernel. In line 1.1.3.2, the data in the media boot sector is read into the operating system buffer. The system proceeds to line 1.1.3.3 wherein BuildBPB is invoked to call the disk driver and build a boot parameter block. FS_Mount is then invoked in line 1.1.3.4. The first step in FS_Mount invokes Bmp_Get in line 1.1.3.4.1 which is a memory management utility in the kernel which is called to set-up a buffer for the BPB. In line 1.1.3.4, when FSMountVolume is called, it iterates through the list of FSDs, calling each FSD's FS_Mount procedure until one returns success or the end of the list is reached. If an FSD returns success, in line 1.1.3.4.2, VPBCopy is called to create a temporary buffer for a copy of the BPB. VPBLink is then called in line 1.1.3.4.3 to link the VPB into a chain and set-up the BPB to point to the next VPB in the chain and to initialize the current VPB to the beginning of the list. VPBFind is invoked in line 1.1.3.4.4 to examine the chain of VPBs to find a VPB which possesses the same volume identifier as the VPB being processed. If a duplicate VPB identifier is found, VPBfree is called in line 1.1.3.4.5 to free the VPB under examination from the BPB if a duplicate VPB is found in the list of VPBs. Once FSMountVolume is complete, SetVPB is invoked in line 1.1.3.5 which sets up the appropriate fields in the VPB. In line 1.1.3.6, FindVID is called to find the volume identifier. DiskIO is invoked in line 1.1.3.7 if no boot block is found in sector 0 of the media to locate the BPB for the volume. If no FSD's FS_Mount routine returned success, then inline code which is logically equivalent to the FS_Mount procedure for the (resident) FAT file system is called. In line 1.1.3.8 CRC is called to checksum the first directory of old FAT volumes, to generate a unique volume serial number for volume that do not have a serial number in their boot sectors. The functions listed in lines 1.1.3.9–1.1.3.13 are then invoked to generate a new volume identifier and free the volume identifier buffer. In line 1.1.2.14, BufInvalidate is invoked to invalidate all data in the buffer if the media has changed since the process began. If so, FlushBuf is called in line 1.1.3.15 to flush the buffers for the new media.

If a preexisting VPB for the volume was not found, IncVPBRef in line 1.1.4 is invoked to increment a reference counter for the current VPB which is used to record whether the volume of interest is still open to the operating system kernel. In line 1.1.5, DecVPBRef is invoked to decrement the reference counter for a previous VPB. If the reference counter is decremented to zero, VPBFree is invoked in line 1.1.5.1 to free the VPB. ResetCurrency is called in line 1.1.6 to mark position data in current directory structures as invalid. NextCDS (1.1.6.1) and PointComp (1.1.6.2) are internal routines used to enumerate current directory structures (CDSs). In line 1.1.6.3 BufInvalidate is called to remove (now stale) VPB references from a file system buffer pool.

As mentioned above, a VPB is used by the system to store information about a particular volume that is in use in the system. A volume is defined as a medium in a block device and the information on the medium differentiates it from every other volume.

The structures used by the functions of Table I are set forth below.

Figure 7:
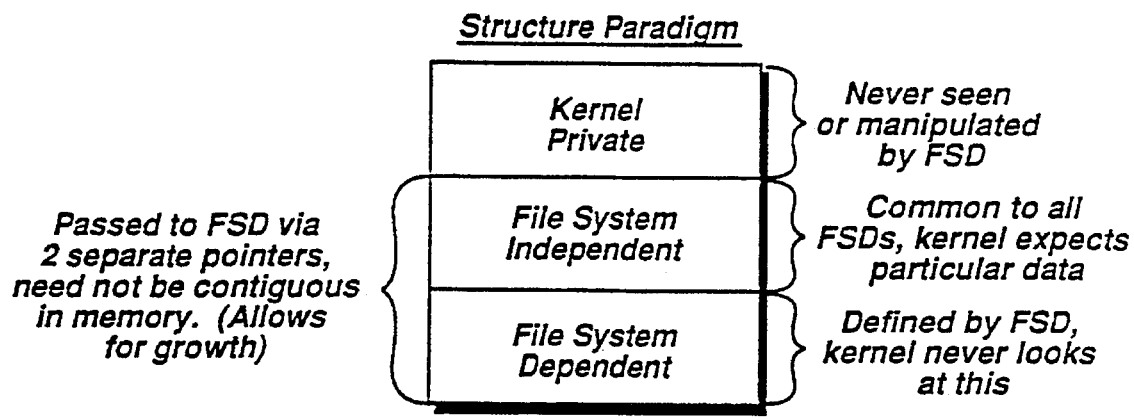
FIG. 7 is a diagram of the structure of the installable file system of the present invention.

A VPB is divided into three parts:
1. the kernel private part, used to keep information the kernel needs to manage the VPB (reference counts, for example). This is private to the kernel, meaning that FSDs never access or modify it.
2. the file system independent part, used by all file systems and independent of any particular file system. This is passed to an installable file system (IFS) for certain file system (FS) calls, and
3. a part that is specific to the file system that is using the VPB. This is set out as a "work area" that the file system can use as required. This is passed to the IFS for certain FS calls. The layout of the VPB is shown in FIG. 7.

The following structure defines the file system independent part of the VPB. This structure is used by all file systems irrespective of the type of file system.

```
vpbfsi       STRUC
vpi_ID       DD    ?    ;32 bit unique ID of file
vpi_pDPB     DD    ?    ;Drive volume is in
vpi_cbSector DW    ?    ;Size of physical sector in bytes
vpi_totsec   DD    ?    ;Total number of sectors on medium
vpi_trksec   DW    ?    ;Sectors per track on medium
vpi_nhead    DW    ?    ;Number of heads in device
vpi_text     DB    VPBTEXTLEN DUP (?) ;printable ID for users
vpbfsi   ENDS
```

The following structure defines the file system dependent part of the VPB.
This structure is used by file systems as they see fit.

```
vpbfsd     STRUC
vpd_work       DB       VPDWORKAREASIZE DUB (?)
vpbfsd     ENDS
```

The following structure defines the structure of the volume parameter block (VPB).

```
vpb                STRUC
Fields used by kernel for all file systems
vpb_flink          DW      ?       ;handle of forward link
vpb_blink          DW      ?       ;handle of back link
vpb_IDsector       DD      ?       ;sector number of ID
vpb_ref_count      DW      ?       ;count of objects that point to VPB
vpb_search_count   DW      ?       ;count of searches that point to VPB
vpb_first_access   DB      ?       ;This is initialized to -1 to force a media
vpb_signature      DW      ?       ;Signature which specifies VPB validity
vpb_flags          DB      ?       ;flags
vpb_FSC            DD      ?       ;Pointer to the file system control block (FSC).
```

The following fields are used for file system dependent work.

```
vpb_fsd                    DB      SIZE vpbfsd DUB (?)
```

The following fields are used for file system independent work.

```
vpb_fsi                    DB      SIZE vpbfsi DUB (?)
vpb                        ENDS
```

The following structure is used by FSH_GETVOLPARM - which is used to get VPB data from VPB handle.

```
;
ENTRY          push         word hVPB                         (1 word)
               push         dword ptr to file system ind.     (2 word)
               push         dword ptr to file system dep.     (2 word)
               call         FSHGETVOLPARM EXIT   (ax) = return code
       0 - success
```

The following structure is used by FSH_DOVOLIO - which is used for volume-based sector-oriented transfers.

```
ENTRY          push         word Operation                    (1 word)
               push         word hVPB                         (1 word)
               push         dword ptr to user transfer area   (2 word)
               push         dword ptr to sector count         (2 word)
               push         dword starting sector number      (2 word)
               call         FSHDOVOLIO EXIT   (ax) = return code
       0 - success
```

The following structure is used by FSH_DUPLICATEVPB - which is used to get VPB data to a duplicate (old) VPB.

```
ENTRY          push         word hVPB                         (1 word)
               push         dword ptr to file system ind.     (2 word)
               push         dword ptr to file system dep.     (2 word)
               call         FSHGETVOLPARM
;
EXIT   (ax) = return code
       0 - success
```

RedetermineMedia has a special set of entry parameters, as shown, below.

```
        ENTRY (DS;SI) point to dpb
        EXIT          Carry clear = >
                      (DS;SI).hVPB is filled in with the "correct" volume
                      Carry Set = >
                      (Ax) = I/O packet status; operation was failed
```

| USES | AX, BX, DX, DI, ES, Flags |

The following calls are used for volume management intra-component interfaces.

GenhVPB is used to determine the internal VPB in a particular drive. Any errors returned are sent to the user.

| Inputs; | ds;si point to DPB of interest. It and whatever volume was in it last are locked. |
|---|---|
| Outputs; | Carry clear => ax is handle to VPB for dirve |
| | Carry set => operation generated an error |
| | zero clear => operation was failed |
| | zero set => nested uncertain media occurred |

;
All registers may be modified

BuildBPB is called to generate a valid BPB for an old disk; one that does not have a recognized boot sector. The newer disks have a KNOWN and VALID BPB in the boot sector. The buffer to the device driver is part of the BuildBPB call.

| Inputs; | ds;si point to DPB of interest |
|---|---|
| | pVPBBuf is locked |
| Outputs; | cary clear => |
| | ds;di points to a BPB |
| | carry set => |
| | (AX) = status word from device |
| | zero set => nested uncertain media error |
| | zero reset => operation was failed |

All registers modified all except BP

FSMountVolume checks to determine whether an IFS Driver recognizes the Volume of interest.

FSMountVolume Loops through the FSD chain calling each FS Driver FS_Mount entry point to determine whether the IFS recognizes the volume of interest. The loop terminates when the first IFS recognizes the volume or when the loop counter for the number of FS Drivers installed in the system decrements to 0.

;
| Inputs; | ds;bx point to pVPBBuf boot sector |
|---|---|
| | di offset of LocalVPB on Stack |
| Outputs; | di = offset to FSC If an IFS recognized the volume. |
| | di = −1 If no IFS driver recognized the volume |
| | ax = vpb handle |

Registers modified; ax,bp,bx,di,es,si,ds

VPBFree removes the VPB from the link list and Frees its block from the segment.

| ENTRY | (BP) = handle to VPB |
|---|---|
| EXIT | VPB unlinked and Freed |
| USES | bx,bp,cx,di,ds,es |

VPBLink inserts the new VPB at the beginning of the list and adjusts the forward and backlink fields of new VPB and the old first VPB.

| ENTRY | ES;DI = New VPB |
|---|---|
| EXIT | VPB Linked into list. |
| USES | DS,SI |

VPBFind scans the internal list looking for a VPB with the same Vol. ID as the input VPB.

| ENTRY | DS;SI = Pointer to input VPB Vol. ID |
|---|---|
| EXIT | AX = hVPB if found |
| | AX = 0 if not found |
| USES | AX,BX,CX,DI,DS,ES |

VPBCopy copies a VPB from the local area to the BMP managed area and stamps VPB as valid.

| ENTRY | SI = Offset of LocalVPB on Stack |
|---|---|
| | ES;DI -> New VPB |
| EXIT | None |
| USES | AX,CX,DS,SI |

Volume management, i.e., detecting when the wrong volume is mounted and notifying the operator to take corrective action, is handled directly through the operating system kernel and the appropriate device driver. According to the principles of the present invention, each file system driver (FSD) generates a volume label and 32-bit volume serial number for each volume used with the system. Preferably, these are stored in a reserved location in logical sector zero when a volume is formatted. No particular format is required to store this information. The operating system kernel calls the FSD to perform operations that might involve it. The FSD updates the volume parameter block (VPB) whenever the volume label or serial number is changed.

When the FSD passes an I/O request to an FS helper routine, the device driver is passed the 32-bit volume serial number and the volume label (via the VPB). When the I/O is performed on a volume, The operating system kernel compares the requested volume serial number with the current volume serial number it maintains for the device. This is an in-storage test (no I/O required) performed by checking the Drive Parameter Block's (DPB) VPB of volume mounted in the drive. If unequal, The operating system kernel signals the critical error handler to prompt the user to insert the volume having the serial number and label specified.

When a media change is detected a drive, or the first time a drive is accessed on behalf of an application program interface (API) function call, the present invention determines the FSD (file system driver) that will be responsible for managing I/O to that volume. The present invention then allocates a VPB (volume parameter block) and polls the installed FSDs an FSD indicates that it does recognize the media. The FSDs are polled as described above.

The FAT FSD is the last in the list of FSDs and, by recognizing all media, will act as the default FSD when no other FSD recognition takes place.

According to the principles of the present invention, there are two classes of file system drivers:
1. an FSD which uses a block device driver to do I/O to a local or remote (virtual disk) device. (This is referred to as a local file system), and
2. an FSD which accesses a remote system without a block device driver This is called a remote file system.

The connection between a drive letter and a remote file system is achieved through a programmatic interface. The DosFSAttach system call is used to create a binding between an object in the system name space (e.g. A drive) and an FSD.

The connection between a pseudo-character device and a remote file system is also achieved through the DosFsAttach interface. The DosFsAttach interfaces comprises the DosFsAttach and DosQFsAttach calls which are described in detail in Appendix I.

When a local volume is first referenced, the present invention sequentially asks each local FSD in the FSD chain to accept the media, via a call to each FSD's FS_MOUNT entry point. If no FSD accepts the media then it is assigned to the default FAT file system. Any further attempt made to access an unrecognized media other than by FORMAT, results in an 'INVALID_MEDIA_FORMAT' error message.

Once a volume has been recognized, the relationship between drive, FSD, volume serial number, and volume label is stored. The volume serial number and label are stored in the volume parameter block, (VPB). The VPB is maintained by the operating system for open files (file-handle based I/O), searches, and buffer references.

Subsequent requests for a removed volume require polling the installed FSDs for volume recognition by calling FS_MOUNT. The volume serial number and volume label of the VPB returned by the recognizing FSD and the existing VPB are compared. If the test succeeds, the FSD is given access to the volume. If the test fails, the operating system signals the critical error handler to prompt the user for the correct volume.

The connection between media and VPB is saved until all open files on the volume are closed, search references and cache buffer references are removed. Only volume changes cause a re-determination of the media at the time of next access.

Access to an operating system partition on a bootable, logically partitioned media is through the full operating system function set such as the function set available with the OS/2 operating system. A detailed description of disk partitioning design is available in the OS/2 Programmer's Reference texts described above.

The present invention provides the DosQFsAttach function to identify remote devices which communicate with the operating system through a network. The purpose of DosQFsAttach is to query information about an attached remote file system, a local file system, about a character device, or about pseudo-character device name attached to a local or remote FSD.

The sequence for calling DosQFsAttach is as follows:

```
EXTRN DosQFsAttach:FAR

PUSH ASCIIZ      DeviceName        ;Device name or 'd:'
PUSH WORD        Ordinal           ;Ordinal of entry in name list
PUSH WORD        FSAInfoLevel      ;Type of attached FSD data required
PUSH OTHER       DataBuffer        ;Returned data buffer
PUSH WORD        DataBufferLen     ;Buffer length
PUSH DWORD       0                 ;Reserved (must be zero)
CALL DosQFsAttach
```

Where:

DeviceName points to the drive letter followed by a colon, or points to a character or pseudo-character device name, or is ignored for some values of FSAInfoLevel. If DeviceName is a drive, it is an ASCIIZ string having the form of drive letter followed by a colon. If DeviceName is a character of pseudo-character device name, its format is that of an ASCIIZ string in the format of a filename in a subdirectory called which is preferably designated \DEV\.

Ordinal is an index into the list of character or pseudo-character devices, or the set of drives. Ordinal always starts at 1. The Ordinal position of an item in a list has no significance, Ordinal is used strictly to step through the list. The mapping from Ordinal to item is volatile, and may change from one call to DosQFsAttach to the next.

FSAInfoLevel is the level of information required, and determines which item the data in DataBuffer refers to.

Level 0x0001 returns data for the specific drive or device name referred to by DeviceName. The Ordinal field is ignored.

Level 0x0002 returns data for the entry in the list of character or pseudo-character devices selected by Ordinal. The DeviceName field is ignored.

Level 0x0003 returns data for the entry in the list of drives selected by Ordinal. The DeviceName field is ignored.

DataBuffer is the return information buffer, it is in the following format:

```
struct {
        unsigned short iType;
        unsigned short cbName;
        unsigned char szName[];
        unsigned short cbFSDName;
        unsigned char szFSDName[];
        unsigned short cbFSAData;
        unsigned char rgFSAData[];
};
``` iType    type of item

1 = Resident character device
2 = Pseudo-character device
3 = Local drive
4 = Remote drive attached to FSD cbName    Length of item name, not counting null.
szName    Item name, ASCIIZ string.
cbFSDName    Length of FSD name, not counting null.
szFSDName    Name of FSD item is attached to, ASCIIZ string.
cbFSAData    Length of FSD Attach data returned by FSD.
rgFSAData    FSD Attach data returned by FSD.

szFSDName is the FSD name exported by the FSD, which is not necessarily the same as the FSD name in the boot sector.

For local character devices (iType = 1), cbFSDName = 0 and szFSDName will contain only a terminating NULL byte, and cbFSAData = 0.

For local drives (iType = 3), szFSDName will contain the name of the FSD attached to the drive at the time of the call. This information changes dynamically. If the drive is attached to the operating system kernel's resident file system, szFSDName will contain "FAT" or "UNKNOWN". Since the resident file system gets attached to any disk that other FSDs refuse to MOUNT, it is possible to have a disk that does not contain a recognizable file system, but yet gets attached to the resident file system. In this case, it is possible to detect the difference, and this information helps programs in not destroying data on a disk that was not properly recognized.

DataBufferLen is the byte length of the return buffer. Upon return, it is the length of the data returned in DataBuffer by the FSD.

Returns:    IF ERROR (AX not = 0)

AX = Error Code:

Error_INVALID_DRIVE - the drive specified is invalid
ERROR_BUFFER_OVERFLOW - the specified buffer is too short for the returned data.
ERROR_NO_MORE_ITEMS - the Ordinal specified refers to an item not in the list.
ERROR_INVALID_LEVEL - invalid info level Information about all block devices and all character and pseudo-character devices is returned by DosQFsAttach. The information returned by this call is highly volatile.

The set of error codes for errors general to all FSDs is 0xEE00–0xEEFF. The following errors have been defined although others may be added as needed:

ERROR_VOLUME_NOT_MOUNTED = 0xEE00 - The FSD did not recognize the volume.
The set error codes which are defined by each FSD ane 0xEF00 - 0xFEFF.

Preferably, calling programs should be aware that the returned information may have already changed by the time it's returned to them. The information returned for disks that are attached to the kernel's resident file system can be used to determine if the kernel definitely recognized the disk as one with its file system on it, or if the kernel just attached its file system to it because no other FSDs mounted the disk.

Disk media and file system layout are described by the following structures. The data which are provided to the file system may depend on the level of file system support provided by the device driver attached to the block device. These structures are relevant only for local file systems.

```
/* file system independent - volume params */
struct vpfsi {
                unsigned long   vpi_vid;        /* 32 bit volume ID */
                unsigned long   vpi_hDEV;       /* handle to device driver */
                unsigned short  vpi_bsize;      /* sector size in bytes */
                unsigned long   vpi_totsec;     /* total number of sectors */
                unsigned short  vpi_trksec;     /* sector / track */
                unsigned short  vpi_nhead;      /* number of heads */
                char            vpi_text[12];   /* asciiz volume name */
};              /* vpfsi */

/* file system dependent - volume params */
                struct vpfsd {
                    char vpd_work[36];  /* work area */
};                  /* vpfsd */
```

As mentioned above, the FS_MOUNT function is called to mount and unmount volumes and its purpose is to examine volumes to determine whether an FSD it recognizes the file system format. The sequence for calling FS-Mount is as follows:

The contents of the vpfsd are as follows:

FLAG = 0

```
                int far pascal FS_MOUNT (flag, pvpfsi, pvpfsd, hVPB, pBoot)
                unsigned short  flag;
                struct vpfsi far * pvpfsi;
                struct vpfsd far * pvpfsd;
                unsigned short  hVPB;
                char far *      pBoot;
```

Where:
        flag indicates operation requested.

flag = 0 indicates that the FSD is requested to mount or accept a volume.

flag = 1 indicates that the FSD is being advised that the specified volume has been removed.

flag = 2 indicated that the FSD is requested to release all internal storage assigned to that volume as it has been removed from its drive and the last kernel-managed reference to that volume has been removed.

flag = 3 indicates that the FSD is requested to accept the volume regardless of recognition in preparation for formatting for use with the FSD.

All other values are reserved. The value passed to the FSD will be valid.

pvpfsi - A pointer to file-system-independent portion of VPB. If the media contains an operating system-recognizable boot sector, then the vpi_vid field contains the 32-bit identifier for that volume. If the media does not contain such a boot sector, the FSD generates a unique label for the media and places it into the vpi_vid field.

pvpfsd - pointer to file-system-dependent portion of VPB. The FSD may store information as necessary into this area.

hVPB - handle to volume.

pBoot - pointer to sector 0 read from the media. This pointer is ONLY valid when flag = = 0. The buffer the pointer refers to MUST NOT BE MODIFIED. The pointer is always valid and does not need to be verified when flag = = 0; if a read error occurred, the buffer will contain zeroes.

The FSD examines the volume presented and determines whether it recognizes the file system. If so, it returns zero after having filled in appropriate parts of vpfsi and vpfsd. The vpi_vid and vpi_text fields are filled in by the FSD. If the FSD has an operating system format boot sector, it converts the label from the media into asciiz form. The vpi_hDev field is filled in by the operating system. If the volume is unrecognized, the driver returns non-zero.

The vpi_text and vpi_vid are updated by the FSD each time these values change.

The FSD issues an FSD_FINDDUPHVPB to determine whether a duplicate VPB exists. If one exists the VPB fs dependent area of the new VPB is invalid and the new VPB is unmounted after the FSD returns from the FS_MOUNT call. The FSD updates the fs dependent area of the old duplicate VPB.

If no duplicate VPB exists the FSD initializes the fs dependent area.

| |
|---|
| FLAG = 1 |
| VPB fs dependent part is same as when FSD last modified it. |
| FLAG = 2 |
| VPB fs dependent part is same as when FSD last modified it. |

After media the recognition process, the volume parameters may be examined using the FSH_GETVOLPARM call. The volume parameters should not be changed after the media recognition process.

During a mount request, the FSD may examine other sectors on the media by using FSH_DOVOLIO to perform the I/O. If an uncertain-media return is detected, the FSD is "cleans up" and returns ERROR_UNCERTAIN_MEDIA to allow the volume mount logic to restart on the newly-inserted media. The FSD provides the buffer to use for additional I/O.

The operating system kernel manages the VPB via the refcount counter mentioned above. All volume-specific objects are labelled with the appropriate volume handle and represent references to the VPB. When all kernel references to a volume disappear, FS_MOUNT is called with flag=2, indicating a dismount request.

When the kernel detects that a volume has been removed from its drive, but there are still outstanding references to the volume, FS_MOUNT is called with flag=1 to allow the FSD to store clean (or other regenerable) data for the volume. Data which is dirty and cannot be regenerated is retained so that the data may be written to the volume when it is remounted in the drive. For the purposes of the present invention, clean data is data which is unchanged and dirty data is data which has been modified.

When a volume is to be formatted for use with an FSD, the operating system kernel calls the FSD's FS_MOUNT entry with flag=3 to allow the FSD to prepare for a format operation. The FSD accepts the volume even if it is not a volume of the type that FSD recognizes, since format changes the file system on the volume. The operation may be failed if formatting cannot be completed. (For example, an FSD which supports only CD-ROM.)

Since most computer system hardware does not allow for kernel-mediated removal of media, it is certain that the unmount request is issued when a volume is not present in any drive.

FSH_DOVOLIO performs I/O to a specified volume. FSH_DOVOLIO formats a device driver request packet for the requested I/O, locks the data transfer region, calls the device driver, and reports any errors to the hard error daemon before returning to the FSD. Any retries indicated by the hard error daemon or actions indicated by DOSERROR are done within the call to FSH_DOVOLIO.

The following describes the calling format for FSH_DOVOLIO.

```
int far pascal FSH_DOVOLIO (operation, hVPB, pData, pcSec, iSec)
unsigned short      operation;
unsigned short      hVPB;
char far * pData;
unsigned short far * pcSec;
unsigned long       iSec;
```

Where:

The operation bit mask indicates read/read-bypass/write/write-bypass/verify-after-write/write-through and no-cache operation to be performed.

Bit 0x0001 off indicates read.
Bit 0x0001 on indicates write.
Bit 0x0002 off indicates no bypass.
Bit 0x0002 on indicates cache bypass.
Bit 0x0004 off indicates no verify-after-write operation.
Bit 0x0004 on indicates verify-after-write
Bit 0x0008 off indicates errors signalled to hard error daemon.
Bit 0x0008 on indicates hard errors will be returned directly.
Bit 0x0010 off indicates I/O is not "write-through".
Bit 0x0010 on indicates I/O is "write-through".
Bit 0x0020 off indicates data for this I/O should be cached.
Bit 0x0020 on indicates data for this I/O should not be cached.

All other bits are reserved are zero.

The difference between the "cache bypass" and the "no cache" bits is in the type of request packet that the device driver will is passed. With "cache bypass", it will get a packet with command code 24, 25, or 26. With "no cache", the system gets the extended packets for command codes 4, 8, or 9.

|  |  |  |
|---|---|---|
| hVPB | volume handle for source of I/O | |
| pData | long address of user transfer area | |
| pcSec | pointer to number of sectors to be transferred. On return this is the | | number of sectors successfully transferred.

iSec sector number of the first sector of transfer

Returns Error code if operation failed, 0 otherwise.

ERROR_PROTECTION_VIOLATION - the supplied address/length is not valid.

ERROR_UNCERTAIN_MEDIA - the device driver can no longer reliably tell if the media has been changed. This occurs only within the context of an FS_MOUNT call.

ERROR_TRANSFER_TOO_LONG - transfer is too long for device

FSH_DOVOLIO may be used at all times within an FSD. When called within the scope of a FS_MOUNT call, it applies to the volume in the drive without regard to which volume it may be. However, since volume recognition is not complete until the FSD returns to the FS_MOUNT call, the FSD must take special precautions when an ERROR_UNCERTAIN_MEDIA is returned. This indicates that the media has gone uncertain trying to identify the media in a drive. This may indicate that the volume that the FSD was trying to recognize was removed. In this case, an FSD releases any resources attached to the hVPB passed in the FS_MOUNT call and returns ERROR_UNCERTAIN_MEDIA to the FS_MOUNT call. This will direct the volume tracking logic to restart the mount process.

FSDs call FSH_DOVOLIO2 to control device driver operation independently from I/O operations. This routine supports volume management for IOCTL operations. Any errors are reported to the hard error daemon before returning to the FSD. Any retries indicated by the hard error daemon or actions indicated by DOSERROR are done within the call to FSH_DOVOLIO2.

The ERROR_INVALID_FUNCTION is invoked when a function supplied is incompatible with the system of the present mention. It allocates a new VPB whenever the media becomes uncertain (the device driver recognizes that it can no longer be certain that the media is unchanged). This VPB cannot be collapsed with a previously allocated VPB (due to a reinsertion of media) until the FS_MOUNT call returns. However, the previous VPB may have some cached data that must be updated from the media (the media may have been written while it was removed). FSH_FINDDUPHVPB allows the FSD to find this previous occurrence of the volume in order to update the cached information for the old VPB. The newly created VPB is unmounted if there is another, older VPB for that volume.

The calling format for FSH_FINDDUPHVPB is as follows.

```
int far pascal FSH_DOVOLIO2 (hDev, sfn, cat, func, pParm, cbParm, pData, cbData)
unsigned long hDev;
unsigned short sfn;
unsigned short cat;
unsigned short func;
char far * pParm;
unsigned short cbParm;
char far * pData;
unsigned short cb Data;
```

Where:

| | | |
|---|---|---|
| | hDev | device handle obtained from VPB |
| | sfn | system file number from open instance that caused the FSH_DEVIOCTL call. This field should be passed unchanged from the sfi_selfsfn field. If no open instance corresponds to this call, this field is set to 0xFFFF. |
| | cat | category of IOCTL to perform |
| | func | function within category of IOCTL |
| | pParm | long address to parameter area |
| | cbParm | length of parameter area |
| | pData | long address to data area |
| | cbData | length of data area |

Returns Error code if error detected, 0 otherwise.

```
int far pascal FSH_FINDDUPHVPB (hVPB, phVPB)
unsigned short hVPB;
```

```
unsigned short far * phVPB;

Where:
    hVPB      handle to the volume to be found
    phVPB     pointer to where handle of matching volume will be stored.

Returns Error code if no matching VPB found. 0 otherwise.
           ERROR_NO_ITEMS - there is no matching hVPB.
```

FSH_GETVOLPARM allows an FSD to retrieve file-system-independent and -dependent data from a VPB. Since the FS router passes in a VPB handle, individual FSDs map the handle into pointers to the relevant portions. The calling sequence for FSH_GETVOLPARM is as follows:

```
void far pascal FSH_GETVOLPARM (hVPB, ppVPBfsi, ppVPBfsd)
unsigned short hVPB;
struct vpfsi far * far * ppVPBfsi;
struct vpfsd far * far * ppVPBfsd;

Where:
    hVPB       volume handle of interest
    ppVPBfsi   location of where pointer to file-system-independent data is
               stored
    ppVPBfsd   location of where pointer to file-system- dependent data is
               stored Returns: Nothing
```

Because FSD-Volume mapping is dynamic, and FSD-DD connections are achieved through the operating system kernel in an FSD and DD independent way, any FSD may access any volume, including volumes whose DDs where loaded from that FSD. Since a volume maps to a particular piece of removeable media or to any partition on any partitionable media, it is contemplated that multiple FSDs may have access to a particular hard disk or other media.

Volume file operations are divided into two categories: Named-based operations and handle-based operations. Name-based operations are typically initiated by a user wherein a user instructs the system 100 to perform a named operation on a file. Handle-based operations are typically initiated during the background operation of the system. Handle-based operations are usually preceded by a name-based operation.

Figure 8:
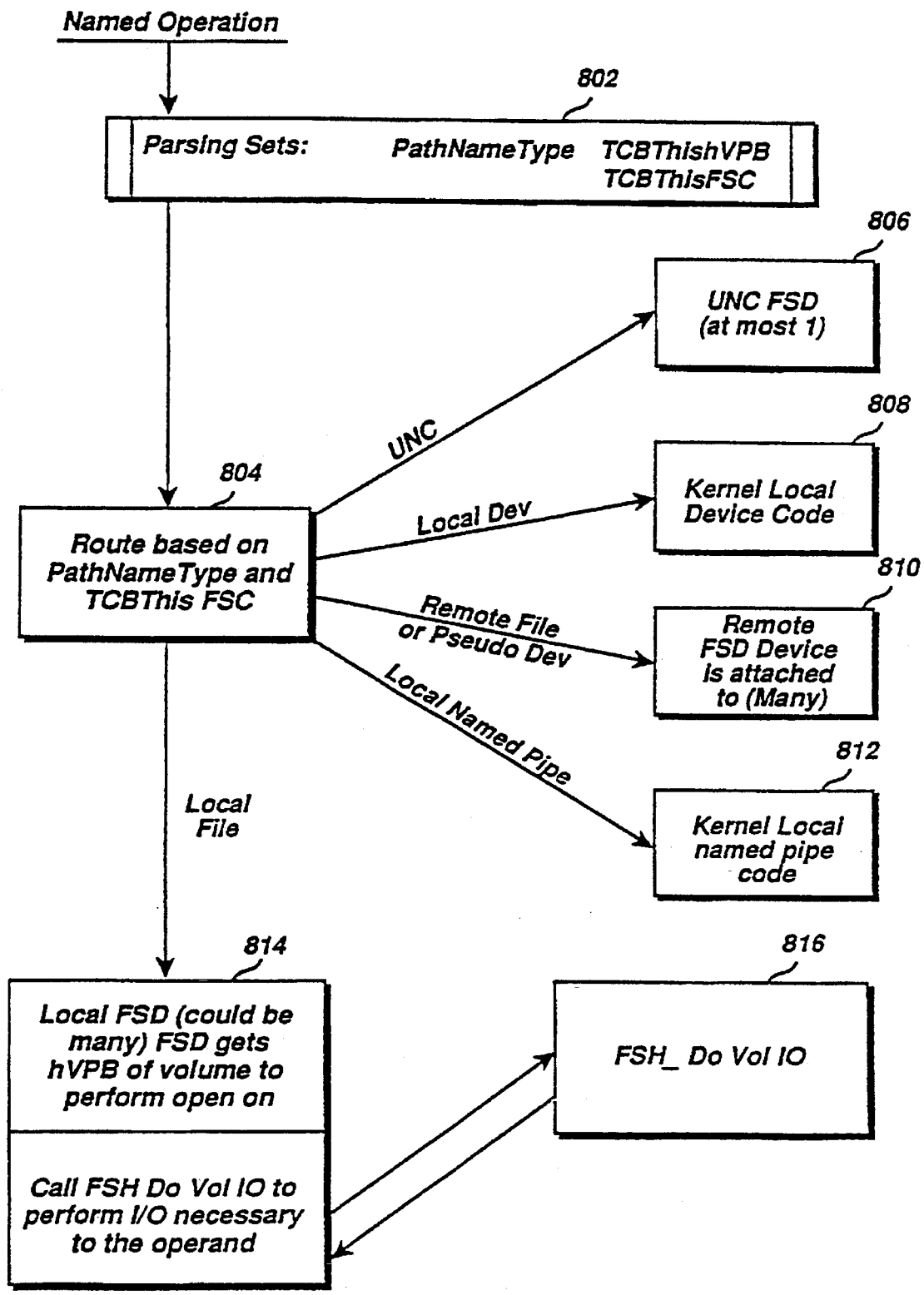
FIG. 8 is a flow diagram detailing the execution of name-based operations in accordance with the principles of the present invention.

Referring now to FIG. 8, the routine is invoked when the system 100 performs named-based operations. A named operation is an operation which is directed by a character name, i.e. the operation is specified with the name of a file or directory. "Open file 'xxx'" is one example of a name-based operation. Process 802 is invoked to parse the name and return three variables: PathNameType; TCBThishVPB and TCBThisFSC. Process 802 is discussed in detail in conjunction with FIG. 9. (Note: h denotes a handle and TCB refers to a thread control block wherein TCHThishVPB is handle to the VPB currently of interest and TCBThisFCH is the pointer to the file system of interest). Item 804 then routes control to the appropriate function based on the variables PathType, TchThishVPB and TCBThisFCH returned by process 802. Control is passed item 806 if the path began with "\\" indicating a Universal Naming Convention (UNC) global network name in which the UNC FSD is invoked. If a local device is indicated, control passes to item 808 to process the request within the kernel. If a pseudodevice or remote file is indicated, control passes to item 810 to route the request to the remote FSD to which the pseudodevice or remote file is attached. If a named pipe is detected, control passes to item 812 to call the local named pipe code within the kernel. If a local file is indicated, control passes to item 814 which is the FSD worker in the FSD which performs reads and writes to the volume by calling FSHDOVOLIO in item 16. FSHDOVOLIO is discussed further in conjunction with FIG. 11.

Figure 9:
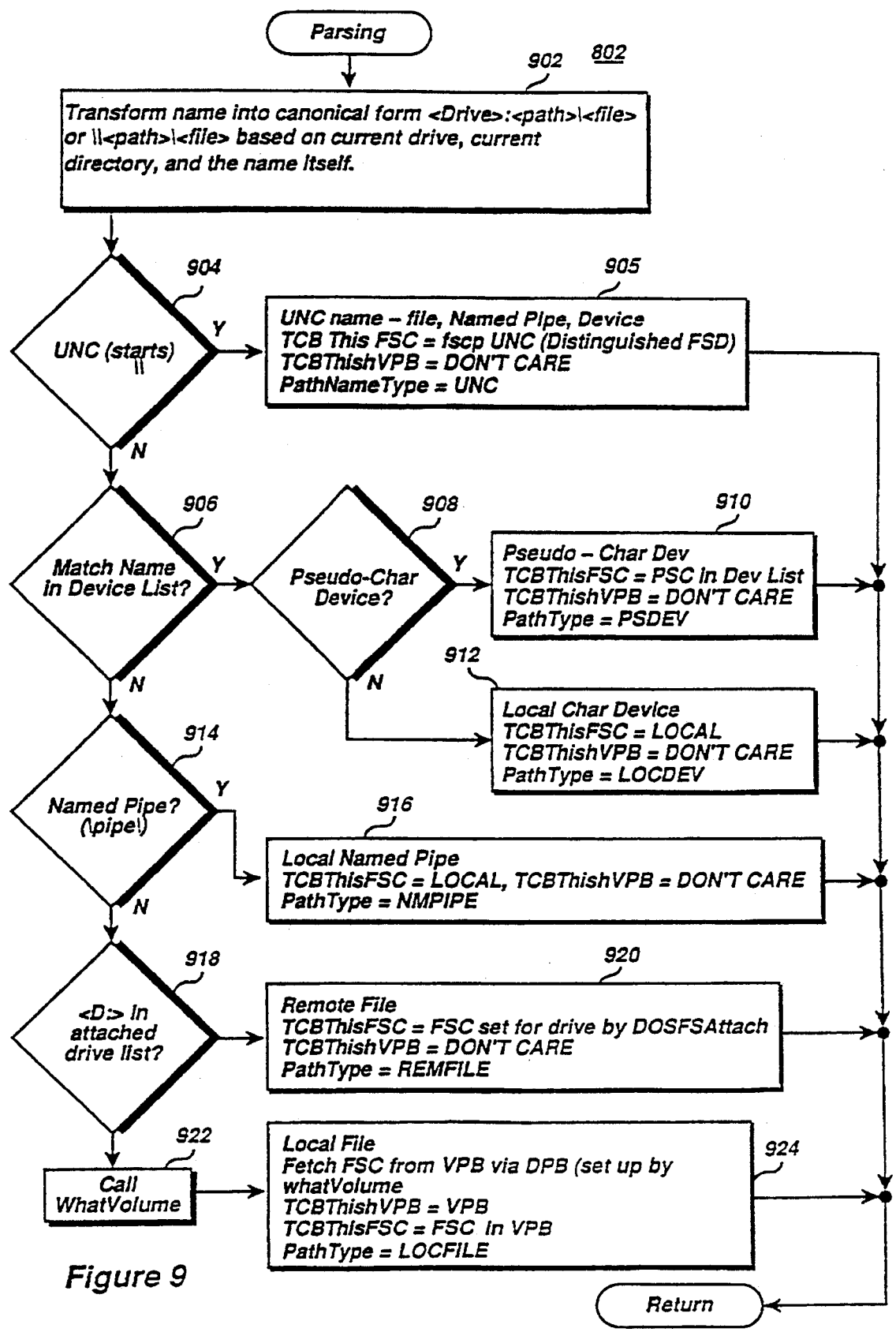
FIG. 9 is a flow diagram of the parsing process invoked by the named-based operations process.

Referring now to FIG. 9, the parsing process 802 is described. When invoked, item 902 transforms the name of interest to a canonical form based on current drive, current directory and the name itself. The variables TCBTHISFSC and TCHThisVPB and pathnametype are then determined as follows. Decision 904 determines whether the user name begins with "\\" to determine whether a UNC name is indicated. If so, control passes to item 905, wherein the values of the variables PathType, TchThishVPB and TCBThisFCH are initialized to route the user name to the appropriate location. If not, decision 906 determines whether the name of interest is a name in the device name list maintained by the kernel. If so, decision 908 determines whether it is a pseudo-character device. If so, item 910 sets the variables as indicated. If not, control passes to item 912 which sets the variables as indicated.

Decision 914 determines whether the name represents a named pipe by looking for "\pipe\" at the beginning of the name. If so, item 916 set the variables as indicated. If not, decision 918 determines whether the name indicates a pathname on a local or remote drive. If a remote drive is indicated, control passes to item 920 which sets the variables PathType, TchThishVPB and TCBThisFCH as indicated. Otherwise, control passes to item 922 which calls what volume to read the appropriate data from the volume. When WhatVolume returns, control passes to item 924 which sets the variables PathType, TchThishVPB and TCBThisFCH as indicated.

Figure 10:
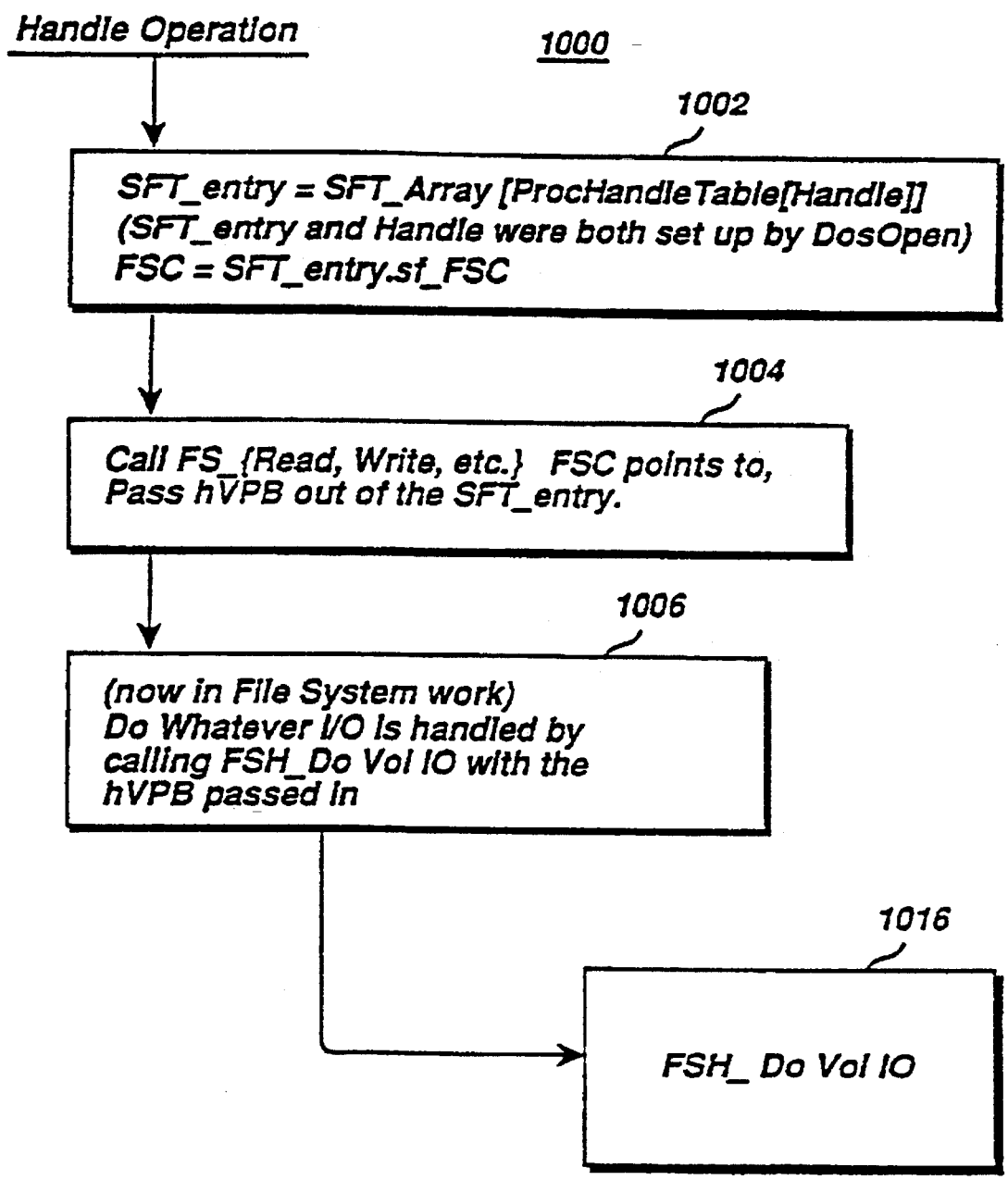
FIG. 10 is a flow diagram of the execution of handle-based operations in accordance with the principles of the present invention.

Referring now to FIG. 10, the process 1000 is invoked for handle-based operations. When invoked, item 1002 retrieves an SFT entry. The SFT entry and the handle are both set up by DosOpen. TCBThisFSC is then set as indicated. Item 1004 then calls the relevant FSD worker for the file system that FSC points to. The hVPB is passed along from the SFT entry. Item 1006 then calls item 1016 to perform any I/O requested by the caller by calling item 1016 as required.

Figure 11:
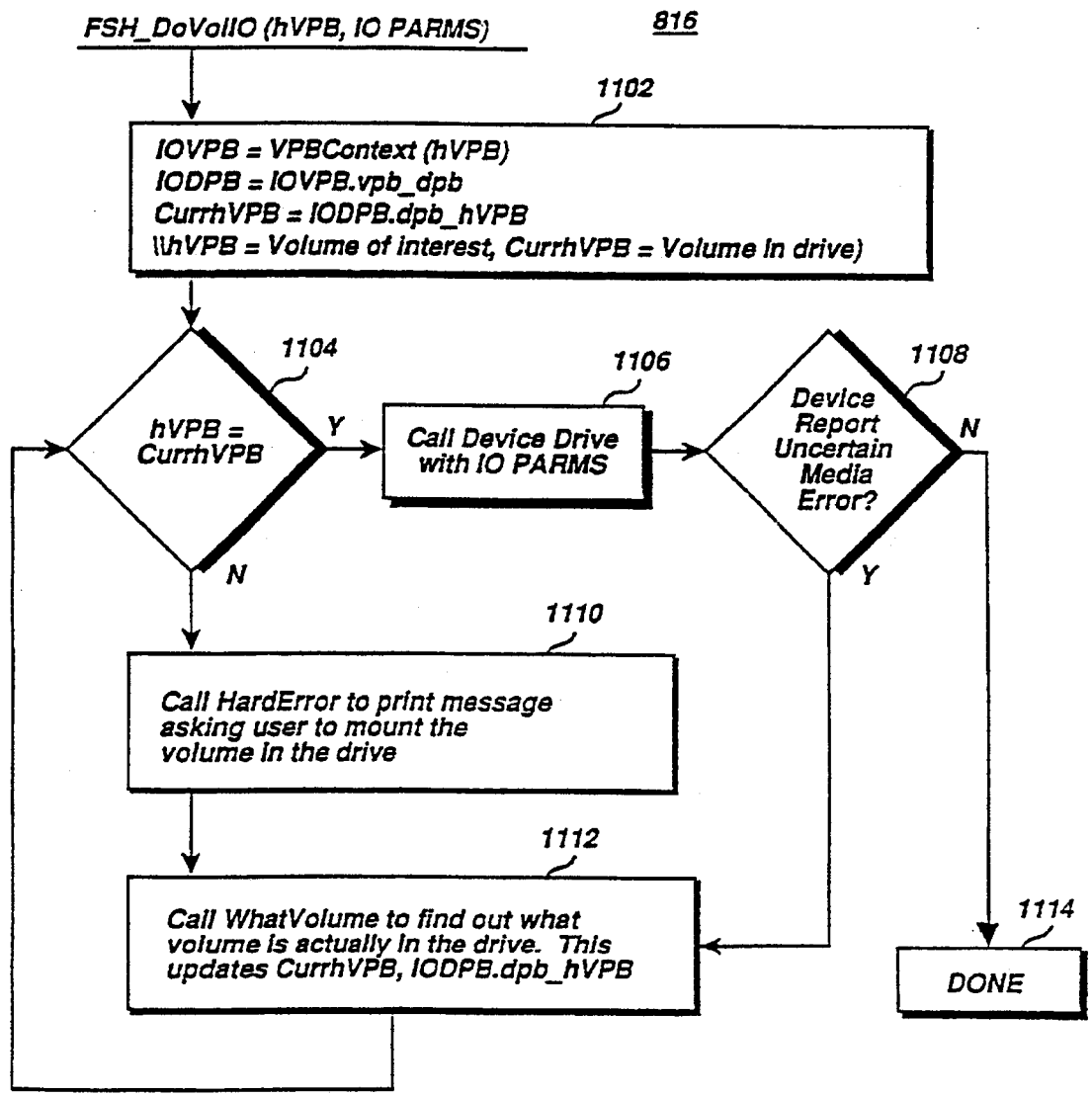
FIG. 11 is a flow diagram of the FSH_DoVolIo process invoked by the processes described in conjunction with FIGS. 8 and 10.

Referring now to FIG. 11, FSH_Do Vol IO is shown. When invoked in item 1102 the hVPB is used to determine what volume is in the drive as well as the volume of interest. Decision 1104 then determines whether the volume in the drive is the volume of interest. If so, 1106 is invoked to call the device driver and to perform I/O with the parameters specified. Decision 1108 then determines whether the media went uncertain during the operation. If not, the process returns in item 1114. If decision 1108 determines the media is not uncertain, control passes to item 1112 where WhatVolume is invoked to make the media certain. Control then returns to decision 1104. If the volume in the drive does not match the volume of interest, item 1110 is invoked to call HardError to instruct the user to place the correct volume in the drive. Control then passes to item 1112 described above.

Appendices II–VI are included herewith as an example of an installable file system source where:

Appendix II is a listing of exported interfaces a file system is expected to support in accordance with the teachings of the present invention.

Appendix III is a listing of interfaces exported by a kernel which a file system may use.

Appendix IV is the source code of an example of an installable file system constructed in accordance with the present invention.

Appendix V is a listing of a definitions file used by the OS/2 linker to build the FSD of Appendix IV.

Appendix VI is a header file that defines structures and parameters used by the IFS of Appendix IV.

Appendix VII is a detailed listing of the disk structures used to implement the high performance file system of the present invention.

In summary, an improved high performance file system for organizing data in a volume has been described. According to the principles of the present invention, data may be organized on a disk in a series of fields wherein a first disk field comprises a boot block, a second field following said first field comprises a superblock, a third field following said second field comprises a spareblock, and a plurality of bands includes a series of contiguous sectors for storing data wherein each band includes a freespace bitmap indicating sector usage. The freespace bitmap may be located at the head or tail of the bands wherein bitmaps for alternate bands are disposed ajacent to each other. The boot block includes a volume name, a volume I.D., and a disk bootstrap program. The super block includes pointers to free space bitmaps, a bad block list, a directory block band and a root directory.

In accordance with the present invention, files and directories are anchored in an Fnode structure. wherein Fnode structure comprises a plurality of pointers which point to runs of sectors.

Accordingly, other uses and modifications will be apparent to persons of ordinary skill in the art. All such uses and modifications are intended to fall within the spirit and scope of the appended claims.

APPENDIX II

```
/*static char *SCCSID = "@(#)fsd.h    1.31 89/08/03 ";*/
/* fsd.h  - File system driver entry point declarations */

/* FS_ATTRIBUTE bit field values */ define FSA_REMOTE  0x00000001    /* Set if REMOTE FSD                  */
define FSA_UNC     0x00000002    /* Set if FSD implements UNC support */
define FSA_LOCK    0x00000004    /* Set if FSD needs lock notification*/ define CDDWORKAREASIZE 8
define SFDWORKAREASIZE 30
#define VPDWORKAREASIZE 36

/* Volume Parameter structures */ define VPBTEXTLEN 12 struct           vpfsi {
    unsigned long  vpi_vid;              /* 32 bit volume ID */
    unsigned long  vpi_hDEV;             /* handle to device driver */
    unsigned short vpi_bsize;            /* sector size in bytes */
    unsigned long  vpi_totsec;           /* total number of sectors */
    unsigned short vpi_trksec;           /* sectors / track */
    unsigned short vpi_nhead;            /* number of heads */
    char           vpi_text[VPBTEXTLEN]; /* volume name */
}; /* vpfsi */

/*
 * Predefined volume IDs: [note - keep this list in sync with list in
 * dos/dosinc/vpb.inc!]
 */
/* Unique ID for vpb_ID field for unreadable media. */
#define UNREAD_ID  0x534E4A52L           /* Stored as (bytes) 0x52,4A,4E,53. */

/*
 * Unique ID for vpb_ID field for damaged volume (recognized by IFS but cannot
 * be normally mounted).
 */
#define DAMAGED_ID 0x0L                  /* Stored as (bytes) 0,0,0,0. */

/* file system dependent - volume params */
struct           vpfsd {
    char  vpd_work[VPDWORKAREASIZE];     /* work area */
}; /* vpfsd */

/* Current Directory structures */ struct cdfsi {
    unsigned short cdi_hVPB;             /* VPB handle for associated device */
    unsigned short cdi_end;              /* end of root portion of curdir */
    char           cdi_flags;            /* flags indicating state of cdfsd */
```

2

```
        char        cdi_curdir[CCHMAXPATH]; /* text of current directory */
    }; /* cdfsi */

/* bit values for cdi_flags (state of cdfsd structure */
5
    #define CDI_ISVALID  0x80          /* format is known */
    #define CDI_ISROOT   0x40          /* cur dir == root */
    #define CDI_ISCURRENT      0x20

10  struct          cdfsd {
        char    cdd_work[CDDWORKAREASIZE];         /* work area */
    }; /* cdfsd */

15  /* Per open-instance (System File) structures */ struct        sffsi {
        unsigned long   sfi_mode;      /* access/sharing mode */
        unsigned short  sfi_hVPB;      /* volume info. */
20      unsigned short  sfi_ctime;     /* file creation time */
        unsigned short  sfi_cdate;     /* file creation date */
        unsigned short  sfi_atime;     /* file access time */
        unsigned short  sfi_adate;     /* file access date */
        unsigned short  sfi_mtime;     /* file modification time */
25      unsigned short  sfi_mdate;     /* file modification date */
        unsigned long   sfi_size;      /* size of file */
        unsigned long   sfi_position;  /* read/write pointer */
    /* the following may be of use in sharing checks */
        unsigned short  sfi_UID;       /* user ID of initial opener */
30      unsigned short  sfi_PID;       /* process ID of initial opener */
        unsigned short  sfi_PDB;       /* PDB (in 3.x box) of initial opener */
        unsigned short  sfi_selfsfn;   /* system file number of file instance */
        unsigned char   sfi_tstamp;    /* update/propagate time stamp flags */
                                       /* use with ST_Sxxx and ST_Pxxx */
35      unsigned short  sfi_type;      /* use with STYPE_ */
    }; /* sffsi */

/* sfi_tstamps flags */
    #define ST_SCREAT  1  /* stamp creation time */
40  #define ST_PCREAT  2  /* propagate creation time */
    #define ST_SWRITE  4  /* stamp last write time */
    #define ST_PWRITE  8  /* propagate last write time */
    #define ST_SREAD  16  /* stamp last read time */
    #define ST_PREAD  32  /* propagate last read time */
45
    /* sfi_type flags */
    #define STYPE_FILE    0       /* file */
    #define STYPE_DEVICE 1        /* device */
    #define STYPE_NMPIPE        2       /* named pipe */
50  #define STYPE_FCB    4        /* fcb sft */

/* file system dependent - file instance */
    struct          sffsd {
        char   sfd_work[SFDWORKAREASIZE];          /* work area */
55  }; /* sffsd */
```

3

```
    /* file system independent - file search parameters */
    struct fsfsi {
                unsigned short  fsi_hVPB;      /* volume info. */
 5  }; /* fsfsi */

/* file system dependent - file search parameters */
    #define FSFSD_WORK_SIZE      24
    struct fsfsd {
10              char            fsd_work[FSFSD_WORK_SIZE]; /* work area */
    }; /* fsfsd */

/* file system dependent - device Information */
    struct devfsd {
15              unsigned long   FSDRef; /* Reference obtained from FSD during ATTACH
    */
    }; /* devfsd */

/*****
20   *
     * union and structures for FS_FSCTL
     */
    /* pArgType == 1, FileHandle directed case */
    struct SF {
25              struct sffsi far * psffsi;
                struct sffsd far * psffsd;
    }; /* SF */

/* pArgType == 2, PathName directed case */
30  struct CD {
                struct cdfsi far * pcdfsi;
                struct cdfsd far * pcdfsd;
                char far *         pPath;
                unsigned short     iCurDirEnd;
35  }; /* CD */ union argdat {
        /* pArgType == 1, FileHandle directed case */
        struct SF sf;
40
        /* pArgType == 2, PathName directed case */
        struct CD cd;

/* pArgType == 3, FSD Name directed case */
45      /* nothing */
    }; /* argdat */

/*****
50   *
     * Union and structures for FS_NMPIPE
     *
     */

55      /* Get/SetPHandState parameter block */
        struct      phs_param {
```

4

```
                short   phs_len;
                short   phs_dlen;
                short   phs_pmode;     /* pipe mode set or returned */
        };

/* DosQNmPipeInfo parameter block,
         * data is info. buffer addr */
        struct          npi_param {
                short   npi_len;
                short   npi_dlen;
                short   npi_level;     /* information level desired */
        };

/* DosRawReadNmPipe parameters,
         * data is buffer addr */
        struct          npr_param {
                short   npr_len;
                short   npr_dlen;
                short   npr_nbyt;      /* number of bytes read */
        };

/* DosRawWriteNmPipe parameters,
         * data is buffer addr */
        struct          npw_param {
                short   npw_len;
                short   npw_dlen;
                short   npw_nbyt;      /* number of bytes written */
        };

/* NPipeWait parameters */
        struct          npq_param {
                short   npq_len;
                short   npq_dlen;
                long    npq_timeo;     /* timeout in milliseconds */
                short   npq_prio;      /* priority of caller */
        };

/* DosCallNmPipe parameters,
         * data is in-buffer addr */
        struct          npx_param {
                short           npx_len;
                unsigned short  npx_ilen;   /* length of in-buffer */
                char far *npx_obuf;  /* pointer to out-buffer */
                unsigned short  npx_olen;   /* length of out-buffer */
                unsigned short  npx_nbyt;   /* number of bytes read */
                long            npx_timeo;  /* timeout in milliseconds */
        };

/* PeekPipe parameters, data is buffer addr */
        struct          npp_param {
                short           npp_len;
                unsigned short  npp_dlen;
                unsigned short  npp_nbyt;   /* number of bytes read */
                unsigned short  npp_avl0;   /* bytes left in pipe */
```

```
                        unsigned short  npp_avlt;   /* bytes left in current msg */
                        unsigned short  npp_state;  /* pipe state */
            };

5       /* DosTransactNmPipe parameters,
         * data is in-buffer addr */
            struct      npt_param {
                        short           npt_len;
                        unsigned short  npt_ilen;   /* length of in-buffer */
10                      char far *npt_obuf;  /* pointer to out-buffer */
                        unsigned short  npt_olen;   /* length of out-buffer */
                        unsigned short  npt_nbyt;   /* number of bytes read */
            };

15      /* QNmpipeSemState parameter block,
         * data is user data buffer */
            struct      qnps_param {
                        unsigned short  qnps_len;   /* length of parameter block */
                        unsigned short  qnps_dlen;  /* length of supplied data block */
20                      long            qnps_semh;  /* system semaphore handle */
                        unsigned short  qnps_nbyt;  /* number of bytes returned */
            };

/* ConnectPipe parameter block, no data block */
25          struct      npc_param {
                        unsigned short  npc_len;    /* length of parameter block */
                        unsigned short  npc_dlen;   /* length of data block */
            };

30      /* DisconnectPipe parameter block, no data block */
            struct      npd_param {
                        unsigned short  npd_len;    /* length of parameter block */
                        unsigned short  npd_dlen;   /* length of data block */
            };
35
        union npoper {
                        struct phs_param    phs;
                        struct npi_param    npi;
                        struct npr_param    npr;
40                      struct npw_param    npw;
                        struct npq_param    npq;
                        struct npx_param    npx;
                        struct npp_param    npp;
                        struct npt_param    npt;
45                      struct qnps_param   qnps;
                        struct npc_param    npc;
                        struct npd_param    npd;
            };          /* npoper */

50
        /*****
         *
         * Declarations for the FSD entry points.
         *
55       */
```

6

```
     /* bit values for the IOflag parameter in various FS_ entry points */
     #define IOFL_WRITETHRU      0x10  /* Write through bit   */
     #define IOFL_NOCACHE        0x20  /* No Cache bit        */

5
     int far pascal
     FS_ATTACH(
         unsigned short,          /* flag      */
         char far *,              /* pDev      */
10       void far *,              /* if remote drive
                                        struct vpfsd far *
                                     else If remote device
                                        null ptr (0L)   */
         void far *,              /* if remote drive
15                                      struct cdfsd far *
                                     else
                                        struct devfsd far * */
         char far *,              /* pParm     */
         unsigned short far *     /* pLen      */
20   );

/* values for flag in FS_ATTACH */
     #define FSA_ATTACH          0x00
     #define FSA_DETACH          0x01
25   #define FSA_ATTACH_INFO     0x02 int far pascal
     FS_CHDIR(
         unsigned short,          /* flag        */
30       struct cdfsi far *,      /* pcdfsi      */
         struct cdfsd far *,      /* pcdfsd      */
         char far *,              /* pDir        */
         unsigned short           /* iCurDirEnd  */
     );
35
     /* values for flag in FS_CHDIR */
     #define CD_EXPLICIT         0x00
     #define CD_VERIFY           0x01
     #define CD_FREE             0x02
40
     int far pascal
     FS_CHGFILEPTR(
         struct sffsi far *,      /* psffsi*/
         struct sffsd far *,      /* psffsd      */
45       long,                    /* offset      */
         unsigned short,          /* type        */
         unsigned short           /* IOflag      */
     );

50   /* values for type in FS_CHGFILEPTR */
     #define CFP_RELBEGIN        0x00
     #define CFP_RELCUR          0x01
     #define CFP_RELEND          0x02

55   int far pascal
     FS_CLOSE(
```

```
            unsigned short,           /* close type  */
            unsigned short,           /* IOflag      */
            struct sffsi far *,       /* psffsi*/
            struct sffsd far *        /* psffsd      */
5       );
        #define FS_CL_ORDINARY    0
                                  /* ordinary close of file */
        #define FS_CL_FORPROC     1
                                  /* final close of file for the process */
10      #define FS_CL_FORSYS      2
                                  /* final close of file for the system (for all processes) */ int far pascal
        FS_COMMIT(
15          unsigned short,           /* commit type */
            unsigned short,           /* IOflag      */
            struct sffsi far *,       /* psffsi*/
            struct sffsd far *        /* psffsd      */
        );
20      /* values for commit type */
        #define FS_COMMIT_ONE     1
                        /* commit for a single file */
        #define FS_COMMIT_ALL     2
                        /* commit due to buf reset - for all files */
25
        int far pascal
        FS_COPY(
            unsigned short,           /* copy mode   */
            struct cdfsi far *,       /* pcdfsi      */
30          struct cdfsd far *,       /* pcdfsd      */
            char far *,               /* source name */
            unsigned short,           /* iSrcCurrDirEnd    */
            char far *,               /* pDst        */
            unsigned short,           /* iDstCurrDirEnd    */
35          unsigned short            /* nameType (flags)  */
        );

int far pascal
        FS_DELETE(
40          struct cdfsi far *,       /* pcdfsi      */
            struct cdfsd far *,       /* pcdfsd      */
            char far *,               /* pFile */
            unsigned short            /* iCurDirEnd  */
        );
45
        void far pascal
        FS_EXIT(
            unsigned short,           /* uid         */
            unsigned short,           /* pid         */
50          unsigned short            /* pdb         */
        );

int far pascal
        FS_FILEATTRIBUTE(
55          unsigned short,           /* flag        */
            struct cdfsi far *,       /* pcdfsi      */
```

8

```
            struct cdfsd far *,        /* pcdfsd     */
            char far *,                /* pName      */
            unsigned short,            /* iCurDirEnd */
            unsigned short far *   /* pAttr */
 5      );

/* values for flag in FS_FILEATTRIBUTE */
        #define FA_RETRIEVE        0x00
        #define FA_SET                     0x01
10
        int far pascal
        FS_FILEINFO(
            unsigned short,            /* flag       */
            struct sffsi far *,        /* psffsi*/
15          struct sffsd far *,        /* psffsd     */
            unsigned short,            /* level */
            char far *,                /* pData      */
            unsigned short,            /* cbData     */
            unsigned short             /* IOflag     */
20      );

/* values for flag in FS_FILEINFO */
        #define FI_RETRIEVE        0x00
        #define FI_SET             0x01
25
        int far pascal
        FS_FILEIO(
            struct sffsi far *,        /* psffsi*/
            struct sffsd far *,        /* psffsd     */
30          char far *,                /* cbCmdList  */
            unsigned short,            /* pCmdLen    */
            unsigned short far *,  /* poError       */
            unsigned short             /* IOflag     */
        );
35
        int far pascal
        FS_FINDCLOSE(
            struct fsfsi far *,        /* pfsfsi*/
            struct fsfsd far *         /* pfsfsd     */
40      );

/* values for flag in FS_FindFirst, FS_FindFromName, FS_FindNext */
        #define         FF_NOPOS       0x00
        #define         FF_GETPOS      0X01
45
        int far pascal
        FS_FINDFIRST(
            struct cdfsi far *,        /* pcdfsi     */
50          struct cdfsd far *,        /* pcdfsd     */
            char far *,                /* pName      */
            unsigned short,            /* iCurDirEnd */
            unsigned short,            /* attr       */
            struct fsfsi far *,        /* pfsfsi*/
55          struct fsfsd far *,        /* pfsfsd     */
            char far *,                /* pData      */
```

9

```
            unsigned short,        /* cbData       */
            unsigned short far *,  /* pcMatch   */
            unsigned short,        /* level */
            unsigned short         /* flags */
 5      );

int far pascal
        FS_FINDFROMNAME(
            struct fsfsi far *,    /* pfsfsi*/
10          struct fsfsd far *,    /* pfsfsd       */
            char far *,            /* pData        */
            unsigned short,        /* cbData       */
            unsigned short far *,  /* pcMatch   */
            unsigned short,        /* level */
15          unsigned long,         /* position     */
            char far *,            /* pName     */
            unsigned short         /* flags */
        );

20      int far pascal
        FS_FINDNEXT(
            struct fsfsi far *,    /* pfsfsi*/
            struct fsfsd far *,    /* pfsfsd       */
            char far *,            /* pData        */
25          unsigned short,        /* cbData       */
            unsigned short far *,  /* pcMatch   */
            unsigned short,        /* level */
            unsigned short         /* flag         */
        );
30
        int far pascal
        FS_FINDNOTIFYCLOSE(
            unsigned short         /* handle       */
        );
35
        int far pascal
        FS_FINDNOTIFYFIRST(
            struct cdfsi far *,    /* pcdfsi       */
            struct cdfsd far *,    /* pcdfsd       */
40          char far *,            /* pName        */
            unsigned short,        /* iCurDirEnd   */
            unsigned short,        /* attr         */
            unsigned short far *,  /* pHandle   */
            char far *,            /* pData        */
45          unsigned short,        /* cbData       */
            unsigned short far *,  /* pcMatch   */
            unsigned short,        /* level */
            unsigned long          /* timeout      */
        );
50
        int far pascal
        FS_FINDNOTIFYNEXT(
            unsigned short,        /* handle       */
            char far *,            /* pData        */
55          unsigned short,        /* cbData       */
            unsigned short far *,  /* pcMatch   */
```

```
                          10
        unsigned short,          /* infolevel   */
        unsigned long            /* timeout     */
        );

5      int far pascal
        FS_FLUSHBUF(
           unsigned short,       /* hVPB            */
           unsigned short        /* flag        */
        );
10
        /* values for flag in FS_FLUSH */
        #define FLUSH_RETAIN           0x00
        #define FLUSH_DISCARD          0x01

15      int far pascal
        FS_FSCTL(
           union argdat far *,   /* pArgdat     */
           unsigned short,       /* iArgType    */
           unsigned short,       /* func        */
20         char far *,           /* pParm       */
           unsigned short,       /* lenParm     */
           unsigned short far *, /* plenParmOut*/
           char far *,           /* pData       */
           unsigned short,       /* lenData     */
25         unsigned short far *  /* plenDataOut */
        );

/* values for iArgType in FS_FSCTL */
        #define FSCTL_ARG_FILEINSTANCE   0x01
30      #define FSCTL_ARG_CURDIR   0x02
        #define FSCTL_ARG_NULL           0x03

/* values for func in FS_FSCTL */
        #define FSCTL_FUNC_NONE          0x00
35      #define FSCTL_FUNC_NEW_INFO      0x01
        #define FSCTL_FUNC_EASIZE  0x02 int far pascal
        FS_FSINFO(
40         unsigned short,       /* flag        */
           unsigned short,       /* hVPB            */
           char far *,           /* pData       */
           unsigned short,       /* cbData      */
           unsigned short        /* level */
45      );

/* values for flag in FS_FSINFO */
        #define INFO_RETREIVE          0x00
        #define INFO_SET         0x01
50
        int far pascal
        FS_INIT(
           char far *,           /* szParm      */
           unsigned long,        /* pDevHlp     */
55         unsigned long far *   /* pMiniFSD    */
        );
```

11

```
        int far pascal
        FS_IOCTL(
            struct sffsi far *,         /* psffsi*/
 5          struct sffsd far *,         /* psffsd      */
            unsigned short,             /* cat         */
            unsigned short,             /* func        */
            char far *,                 /* pParm       */
            unsigned short,             /* lenParm     */
10          char far *,                 /* pData       */
            unsigned short              /* lenData     */
        );

int far pascal
15      FS_MKDIR(
            struct cdfsi far *,         /* pcdfsi      */
            struct cdfsd far *,         /* pcdfsd      */
            char far *,                 /* pName       */
            unsigned short,             /* iCurDirEnd  */
20          char far *,        /* pEABuf      */
            unsigned short              /* flags */
        );

int far pascal
25      FS_MOUNT(
            unsigned short,             /* flag        */
            struct vpfsi far *,         /* pvpfsi      */
            struct vpfsd far *,         /* pvpfsd      */
            unsigned short,             /* hVPB             */
30          char far *                  /* pBoot       */
        );

/* values for flag in FS_MOUNT */
        #define MOUNT_MOUNT              0x00
35      #define MOUNT_VOL_REMOVED        0x01
        #define MOUNT_RELEASE            0x02
        #define MOUNT_ACCEPT             0x03 int far pascal
40      FS_MOVE(
            struct cdfsi far *,         /* pcdfsi      */
            struct cdfsd far *,         /* pcdfsd      */
            char far *,                 /* pSrc        */
            unsigned short,             /* iSrcCurDirEnd*/
45          char far *,                 /* pDst        */
            unsigned short,             /* iDstCurDirEnd*/
            unsigned short              /* flags */
        );

50      int far pascal
        FS_NEWSIZE(
            struct sffsi far *,         /* psffsi*/
            struct sffsd far *,         /* psffsd      */
            unsigned long,              /* len         */
55          unsigned short              /* IOflag      */
        );
```

12

```
       int far pascal
       FS_NMPIPE(
 5        struct sffsi far *,         /* psffsi*/
          struct sffsd far *,         /* psffsd      */
          unsigned short,             /* OpType      */
          union npoper far *,         /* pOpRec      */
          char far *,                 /* pData       */
10        char far *                  /* pName       */
       );

/* Values for OpType in FS_NMPIPE */

15     #define       NMP_GetPHandState     0x21
       #define       NMP_SetPHandState     0x01
       #define       NMP_PipeQInfo         0x22
       #define       NMP_PeekPipe          0x23
       #define       NMP_ConnectPipe       0x24
20     #define       NMP_DisconnectPipe    0x25
       #define       NMP_TransactPipe      0x26
       #define       NMP_READRAW                        0x11
       #define       NMP_WRITERAW          0x31
       #define       NMP_WAITPIPE          0x53
25     #define       NMP_CALLPIPE          0x54
       #define       NMP_QNmPipeSemState                0x58 int far pascal
30     FS_OPENCREATE(
          struct cdfsi far *,         /* pcdfsi          */
          void far *,                 /* if remote device
                                              struct devfsd far *
                                         else
35                                           struct cdfsd far * */
          char far *,                 /* pName       */
          unsigned short,             /* iCurDirEnd  */
          struct sffsi far *,         /* psffsi*/
          struct sffsd far *,         /* psffsd      */
40        unsigned short,             /* fhandflag   */
          unsigned short,             /* openflag    */
          unsigned short far *,       /* pAction     */
          unsigned short,             /* attr        */
          char far *,                 /* pEABuf      */
45        unsigned short far *        /* pfgenFlag   */
       );

#define FOC_NEEDEAS     0x1     /*there are need eas for this file */

50     int far pascal
       FS_PATHINFO(
          unsigned short,             /* flag        */
          struct cdfsi far *,         /* pcdfsi      */
          struct cdfsd far *,         /* pcdfsd      */
55        char far *,                 /* pName       */
          unsigned short,             /* iCurDirEnd  */
```

13

```
            unsigned short,         /* level  */
            char far *,             /* pData       */
            unsigned short          /* cbData      */
        );
 5
        /* values for flag in FS_PATHINFO */
        #define PI_RETRIEVE          0x00
        #define PI_SET               0x01

10      int far pascal
        FS_PROCESSNAME(
            char far *              /* pNameBuf   */
        );

15      int far pascal
        FS_READ(
            struct sffsi far *,     /* psffsi*/
            struct sffsd far *,     /* psffsd      */
            char far *,             /* pData       */
20          unsigned short far *,  /* pLen        */
            unsigned short          /* IOflag      */
        );

int far pascal
25      FS_RMDIR(
            struct cdfsi far *,     /* pcdfsi      */
            struct cdfsd far *,     /* pcdfsd      */
            char far *,             /* pName       */
            unsigned short          /* iCurDirEnd  */
30      );

int far pascal
        FS_SETSWAP(
            struct sffsi far *,     /* psffsi*/
35          struct sffsd far *      /* psffsd      */
        );

int far pascal
        FS_SHUTDOWN(
40          unsigned short,         /* usType     */
            unsigned long           /* ulReserved */
        );

/* values for usType in FS_SHUTDOWN */
45      #define SD_BEGIN             0x00
        #define SD_COMPLETE          0x01 int far pascal
        FS_WRITE(
50          struct sffsi far *,     /* psffsi*/
            struct sffsd far *,     /* psffsd      */
            char far *,             /* pData       */
            unsigned short far *,  /* pLen        */
            unsigned short          /* IOflag      */
55      );
```

14

```
    int far pascal
    MFS_CHGFILEPTR(
        unsigned long,         /* offset       */
        unsigned short         /* type         */
5   );

int far pascal
    MFS_CLOSE(
        void
10  );

int far pascal
    MFS_INIT(
15      void far *,            /* bootdata     */
        char far *,            /* number io    */
        long far *,            /* vectorripl   */
        void far *,            /* bpb          */
        unsigned long far *,   /* pMiniFSD     */
20      unsigned long far *    /* dump address */
    );

int far pascal
    MFS_OPEN(
25      char far *,            /* name         */
        unsigned long far *    /* size         */
    );

int far pascal
30  MFS_READ(
        char far *,            /* data         */
        unsigned short far *   /* length       */
    );

35  int far pascal
    MFS_TERM(
        void
    );
```

APPENDIX III

```
     /*static char *SCCSID = "@(#)fsh.h    1.16 89/04/18";*/
 5   /* fsh.h  - FSH_ = fshelper interface declarations */

/*
      * FSH_DOVOLIO2 omits flag definition
      *                  (
10    * Since we are using C5.1, the function prototypes should be made to
      * conform with true ANSI standards. I have converted FSH_ADDSHARE
      * as an example.
      *
      */
15
     #if 1
     int far pascal
     FSH_ADDSHARE(
         char far *,              /* pName      */
20       unsigned short,          /* mode       */
         unsigned short,          /* hVPB       */
         unsigned long far *      /* phShare    */
     );
     #else
25   USHORT far pascal
     FSH_ADDSHARE(
         PSZ             pName,
         USHORT  mode,
         SHANDLE hVPB,
30       LHANDLE phShare
     );
     #endif int far pascal
35   FSH_BUFSTATE(
         char far *,              /* pBuf       */
         unsigned short,          /* flag       */
         unsigned short far *     /* pState     */
     );
40
     int far pascal
     FSH_CANONICALIZE(
         char far *,              /* pPathName  */
         unsigned short,          /* cbPathBuf  */
45       char far *               /* pPathBuf   */
     );

int far pascal
     FSH_CHECKEANAME(
50       unsigned short,          /* level */
         unsigned long,           /* len of name */
         char far *               /* pEAName    */
     );

55   int far pascal
     FSH_CRITERROR(
```

2

```
            int,                    /* cbMessage */
            char far *,             /* pMessage  */
            int,                    /* nSubs     */
            char far *,             /* pSubs     */
5           unsigned short          /* fAllowed  */
        );

/* Flags for fAllowed
        */
10      #define CE_ALLFAIL   0x0001       /* FAIL allowed     */
        #define CE_ALLABORT  0x0002       /* ABORT allowed    */
        #define CE_ALLRETRY  0x0004       /* RETRY allowed    */
        #define CE_ALLIGNORE       0x0008      /* IGNORE allowed    */
        #define CE_ALLACK    0x0010       /* ACK allowed      */
15
        /* Return values from FSH_CRITERR
        */
        #define CE_RETIGNORE       0x0000      /* User said IGNORE  */
        #define CE_RETRETRY  0x0001       /* User said RETRY  */
20      #define CE_RETFAIL   0x0003       /* User said FAIL/ABORT */
        #define CE_RETACK    0x0004       /* User said continue */ int far pascal
        FSH_DEVIOCTL(
25          unsigned short,         /* FSDRaisedFlag */
            unsigned long,          /* hDev    */
            unsigned short,         /* sfn     */
            unsigned short,         /* cat     */
            unsigned short,         /* func    */
30          char far *,             /* pParm   */
            unsigned short,         /* cbParm  */
            char far *,             /* pData   */
            unsigned short          /* cbData  */
        );
35
        int far pascal
        FSH_DOVOLIO(
            unsigned short,         /* operation */
            unsigned short,         /* fAllowed  */
40          unsigned short,         /* hVPB      */
            char far *,             /* pData     */
            unsigned short far *,   /* pcSec     */
            unsigned long           /* iSec      */
        );
45
        /* Flags for operation
        */
        #define DVIO_OPREAD 0x0000        /* no bit on => readi     */
        #define DVIO_OPWRITE    0x0001    /* ON => write else read  */
50      #define DVIO_OPBYPASS   0x0002    /* ON => cache bypass else no bypass
        */
        #define DVIO_OPVERIFY   0x0004    /* ON => verify after write */
        #define DVIO_OPHARDERR  0x0008    /* ON => return hard errors directly */
        #define DVIO_OPWRTHRU   0x0010    /* ON => write thru       */
55      #define DVIO_OPNCACHE   0x0020    /* ON => don't cache data */
```

```
        /* Flags for fAllowed
        */
        #define DVIO_ALLFAIL  0x0001          /* FAIL allowed          */
        #define DVIO_ALLABORT    0x0002       /* ABORT allowed         */
 5      #define DVIO_ALLRETRY    0x0004       /* RETRY allowed         */
        #define DVIO_ALLIGNORE   0x0008       /* IGNORE allowed        */
        #define DVIO_ALLACK  0x0010           /* ACK allowed           */ int far pascal
10      FSH_DOVOLIO2(
            unsigned long,        /* hDev      */
            unsigned short,       /* sfn       */
            unsigned short,       /* cat       */
            unsigned short,       /* func      */
15          char far *,           /* pParm     */
            unsigned short,       /* cbParm    */
            char far *,           /* pData     */
            unsigned short        /* cbData    */
        );
20
        int far pascal
        FSH_FINDCHAR(
            unsigned short,       /* nChars    */
            char far *,           /* pChars    */
25          char far * far *      /* ppStr     */
        );

int far pascal
        FSH_FINDDUPHVPB(
30          unsigned short,       /* hVPB      */
            unsigned short far *  /* pHVPB     */
        );

int far pascal
35      FSH_FLUSHBUF(
            unsigned short,       /* hVPB      */
            unsigned short        /* fDiscard  */
        );

40      /* fDiscard values
        */
        #define FB_DISCNONE 0x0000            /* Do not discard buffers   */
        #define FB_DISCCLEAN    0x0001        /* Discard clean buffers    */

45      int far pascal
        FSH_FORCENOSWAP(
            unsigned short        /* sel       */
        );

50      int far pascal
        FSH_GETBUF(
            unsigned long,        /* iSec      */
            unsigned short,       /* fPreRead  */
            unsigned short,       /* hVPB      */
55          char far * far *      /* ppBuf     */
        );
```

```
/* Flags for fPreRead
 */
define GB_PRNOREAD       0x0001        /* ON => no preread occurs   */ int far pascal
FSH_GETOVERLAPBUF(
    unsigned short,           /* hVPB         */
    unsigned long,            /* iSec         */
    unsigned long,            /* iSec         */
    unsigned long far *,      /* pisecBuf     */
    char far * far *          /* ppBuf        */
);

int far pascal
FSH_GETVOLPARM(
    unsigned short,                    /* hVPB       */
    struct vpfsi far * far *,          /* ppVPBfsi   */
    struct vpfsd far * far *           /* ppVPBfsd   */
);

int far pascal
FSH_INTERR(
    char far *,               /* pMsg         */
    unsigned short            /* cbMsg        */
);

int far pascal
FSH_ISCURDIRPREFIX(
    char far *                /* pName        */
);

void far pascal
FSH_LOADCHAR(
    char far * far *,         /* ppStr        */
    unsigned short far *      /* pChar        */
);

void far pascal
FSH_PREVCHAR(
    char far *,               /* pBeg         */
    char far * far *          /* ppStr        */
);

int far pascal
FSH_PROBEBUF(
    unsigned short,           /* operation    */
    char far *,               /* pData        */
    unsigned short            /* cbData       */
);

/* Values for operation
 */
#define PB_OPREAD    0x0000    /* Check for read access    */
#define PB_OPWRITE   0x0001    /* Check for write access   */
```

5

```
        int far pascal
        FSH_QSYSINFO(
            unsigned short,        /* index      */
            char far *,            /* pData      */
  5         unsigned short         /* cbData     */
        );

/* Values for index
         */
 10     #define QSI_SECSIZE   1        /* index to query max sector size */
        #define QSI_PROCID    2        /* index to query PID,UserID and Currentpdb */
        #define QSI_THREADNO  3        /* index to query abs.thread no */
        #define QSI_VERIFY    4        /* index to query per-process verify */

15     int far pascal
        FSH_NAMEFROMSFN(
            unsigned short,        /* sfn        */
            char far *,            /* pName      */
            unsigned short far *   /* pcbName    */
 20     );

int far pascal
        FSH_RELEASEBUF(void);

25     int far pascal
        FSH_REMOVESHARE(
            unsigned long          /* hShare     */
        );

30     int far pascal
        FSH_SEGALLOC(
            unsigned short,        /* flags */
            unsigned long,         /* cbSeg      */
            unsigned short far *   /* pSel       */
 35     );

/* Fields for flags
         */
        #define SA_FLDT        0x0001    /* ON => alloc LDT else GDT   */
 40     #define SA_FSWAP       0x0002    /* ON => swappable memory     */ define SA_FRINGMASK   0x6000    /* mask for isolating ring    */
        #define SA_FRING0      0x0000    /* ring 0                     */
        #define SA_FRING1      0x2000    /* ring 1                     */
 45     #define SA_FRING2      0x4000    /* ring 2                     */
        #define SA_FRING3      0x6000    /* ring 3                     */ int far pascal
 50     FSH_SEGFREE(
            unsigned short         /* sel        */
        );

int far pascal
 55     FSH_SEGREALLOC(
            unsigned short,        /* sel        */
```

```
                                                      6 unsigned long          /* cbSeg     */
        );

5   /* Timeout equates for all semaphore operations
     */
     #define TO_INFINITE   0xFFFFFFFFL
     #define TO_NOWAIT     0x00000000L 10   int far pascal
     FSH_SEMCLEAR(
         void far *              /* pSem       */
     );

15   int far pascal
     FSH_SEMREQUEST(
         void far *,             /* pSem       */
         unsigned long           /* cmsTimeout */
     );
20
     int far pascal
     FSH_SEMSET(
         void far *              /* pSem       */
     );
25
     int far pascal
     FSH_SEMSETWAIT(
         void far *,             /* pSem       */
         unsigned long           /* cmsTimeout */
30   );

int far pascal
     FSH_SEMWAIT(
         void far *,             /* pSem       */
35       unsigned long           /* cmsTimeout */
     );

int far pascal
     FSH_STORECHAR(
40       unsigned short,         /* chDBCS     */
         char far * far *        /* ppStr      */
     );

int far pascal
45   FSH_UPPERCASE(
         char far *,             /* pName      */
         unsigned short,         /* cbPathBuf  */
         char far *              /* pPathBuf   */
     );
50
     int far pascal
     FSH_WILDMATCH(
         char far *,             /* pPat       */
         char far *              /* pStr       */
55   );
```

7

```
        int far pascal
        FSH_YIELD(void);

int far pascal
   5    MFSH_DOVOLIO(
            char far *,
            unsigned short far *,   /* cSec    /* Data    */
            unsigned long                      /* iSec    */
        );
  10
        int far pascal
        MFSH_INTERR(
            char far *,                        /* Msg     */
            unsigned short                     /* cbMsg   */
  15    );

int far pascal
        MFSH_SEGALLOC(
            unsigned short,                    /* Flag    */
  20        unsigned long,                     /* cbSeg   */
            unsigned short far *   /* Sel      */
        );

int far pascal
  25    MFSH_SEGFREE(
            unsigned short                     /* Sel     */
        );

int far pascal
  30    MFSH_SEGREALLOC(
            unsigned short,                    /* Sel     */
            unsigned long                      /* cbSeg   */
        );

35    int far pascal
        MFSH_CALLRM(
            unsigned long far *                /* Proc    */
        );

40    int far pascal
        MFSH_LOCK(
            unsigned short,                    /* Sel     */
            unsigned long far *                /* Handle  */
        );
  45
        int far pascal
        MFSH_PHYSTOVIRT(
            unsigned long,                     /* Addr    */
            unsigned short,                    /* Len     */
  50        unsigned short far *   /* Sel      */
        );

int far pascal
        MFSH_UNLOCK(
  55        unsigned long                      /* Handle  */
        );
```

APPENDIX IV

```
/*** BASEFSD.C
 *
 *   IFS component test FSD
 *   Copyright 1988, Microsoft Corp.
 *   Sue Adams
 *
 * Description:
 *           Each entry point in this FSD checks its own tid table to see whether
 *           or not to save its parameters on behalf of the currently executing
 *   thread.
 *
 * Use:
 *   The makefile should define a different symbol for each FSD created
 *   from this source file, so that different FSNAME'S may be used.
 *
 * Special Information:
 * ======================
 * A table is kept for each thread to place a data buffer (GDT) selector, if
 * needed.
 * Since the thread number is an absolute system thread number, no semaphore
 * is needed on the selector, since a thread can only be executing this code
 * in one place at a time. Each thread is limited to one GDT, and when
 * finished with it, is expected to free it with the FS_FSCTL entry.
 *
 * This implementation keeps one table per/FS_ entry for enabling/disabling
 * the saving of incoming parameters on behalf of a thread.
 *
 * See TABLE.C for table management routines.
 *
 * Warning
 * =======
 * The FSD will be in an inconsistent state if the system is shutdown via
 * DOSSHUTDOWN. The system must be rebooted if other tests are to be run
 * using this FSD after the shutdown test. Reason: The flag which allows
 * the FSD to distinguish the shutdown test from other tests cannot be reset
 * after shutdown. There is no way to communicate with the FSD via FS_FSCTL
 * once a DOSSHUTDOWN call is made. This is per 1.2 dcr 259, and as of yet
 * has not been decided if FS_FSCTL access will be allowed or not. If it
 * becomes the case that FSCTL is accessible, then the 'pSDdata' as well as
 * 'Is_Shutdown_Test' flag can be reset to 0 after the shutdown test. If it
 * is decided that shutdown will be reversible, then SD_Status must be reset
 * as well.
 *
 * Enforced conventions:
 * ======================
 * The application must enable the appropriate FS_ entry point using
 * DOSFSCTL before each FS api call. The entry points will take
 * care of disabling themselves each time they are called.
 *
 * After an application makes an API call
 * that will enter this fsd, if the entry point puts a GDT selector into the
 * selector table on behalf of the thread, a subsequent call to DOSFSCTL
 * must be made to free the selector and table entry.
 *
```

2

```
 * Modification History:
 *   89.07.10 -- took out ifdefs for DCR509 -- changes enabled in kernel
 *           version 12.102 (new flags parameter to some entry pts.)
 *   89.06.23 -- added ifdefs for DCR509
 *   89.06.20 -- added global OpenAction for FS_OPENCREATE to use
 *   89.05.17 -- added support for 1.2 DCR 508: pfgenflag param to
 *           FS_OPENCREATE
 *   89.04.07 -- integrated basefsd.c and base2fsd.c into one source
 *   89.03.27 -- added define for CCHMAXPATH
 *   89.02.02 -- added parameter-save-enable capabilities
 *   89.01.09 -- initial version
 */ include <doscalls.h>
define CCHMAXPATH MAXPATHLEN   /* so dont have to include bsedos.h */
#include <fsd.h>
#include <fsh.h>
#include <error.h>
#include "boot.h"
#include "basefsd.h"
#include "table.h"

/*
 * Global Definitions
 * ==================
 */
#define NULLFEACBLIST       (sizeof( ((struct FEAList *)0)->feal_cbList ))
#define MAXFEACBLIST        2520    /* 2520 x 26 (drive letters) fits in 1 seg */
#define CalcFEAoff(d)       ((unsigned)((char)d - 'A') * (unsigned)MAXFEACBLIST)
#define NUMDRIVES   26
/*
 * Forward Declarations
 * ====================
 */
int Init_FEA_Tab();
int DelFEAList(char);
char ToUpper(char);
int CopyFEAList(char,struct EAOP far *);
unsigned Init_SHUTDOWN_Data(char far *,char far *);
void Log_SD_Stats(struct SD_FS_stats far * );
int Getvpfsd(unsigned short hVPB);
int SaveFlags(unsigned short flags);

extern void int3();
extern void far memcop(char far * src, char far * dst, unsigned short count);

void PopupMsg(char far * Msg);

/*
 * Global Data
 * ===========
 */ int _acrtused = 0;          /* Get rid of the runtime */ char FS_NAME[] = FSDNAME;
```

3

```
            char Version[] = VERSION;
            char SignOnMsg[] = SIGNONMSG;

/* FEAsel is only initialized if some test which uses EA's is run */
        5   unsigned short FEAsel;   /* PUT A SEMAPHORE ON THIS LATER */
            unsigned EAtype = NICE_EAS;/* returned by FS_OPENCREATE for pfgenflag param */

/* OpenAction is returned as the action parameter from FS_OPENCREATE */
            unsigned OpenAction = FILE_CREATED;          /* default action */
       10

/* pSDdata is only initialized for fsd234.exe -- testing FS_SHUTDOWN */
            struct SD_stats far * pSDdata = LNULL;
            unsigned Is_Shutdown_Test = INVALID; /* BEWARE! Still set after shutdown */
            unsigned SD_Status = BEFORE_SD;
       15
            char Ddevfsd[sizeof(long)] = DEVFSD_MSG;
            char BadData[sizeof(long)] = "bad";
            char Dvpfsd[sizeof(struct vpfsd)] = VPFSD_MSG;

20   /*===============================================
            ===========================*/
            /*** PopupMsg - send message to user through FSH_CRITERROR
             *
             * ENTRY  Msg - message string
       25    * EXIT   -none-
             * RETURN -none-
             */
            void PopupMsg(Msg)
            char far *Msg;
       30   {
            int rc,MsgLen = 0;
            char far *subs = "\0\0\0";

while(*(Msg+(MsgLen++)) != '\0');         /* get string length */
       35
               rc = FSH_CRITERROR(MsgLen,Msg,0,subs,CE_ALLABORT);
            }

/*===============================================
       40   ===========================*/
            /*** FS_INIT - initialization entry
             *
             * ENTRY  szParm - command line string from IFS= in config.sys
             *        DevHelp- address of the devhelp callgate
       45    *        pMiniFSD - null except when booting from a volume managed by
             *                an FSD and the exported name of the FSD matches the exported
             *                name of the mini-FSD. In this case, pMiniFSD will point to
             *                data established by the mini-FSD (see mFS_INIT)
             *
       50    * EXIT   -none-
             * RETURN Error code= NO_ERROR
             *
             *
             * WARNING:
       55    *
             * EFFECTS: prints sign on message to stdout at system initialization
```

```
 *      initializes data selector/semaphore array
 */ int far pascal FS_INIT(szParm, DevHelp, pMiniFSD)
char far *szParm;
unsigned long DevHelp;
unsigned long far *pMiniFSD;
{
    unsigned short byteswritten;
    int i;
    char ch;

if (szParm != NULL)
        while (*szParm != '\0') {
            switch (*szParm) {
                case 'D':
                    int3();
                    break;
                case 'd':
                    int3();
                    break;
            }
            szParm++;
        }
    DOSWRITE((unsigned short) 1,
             (char far *)SignOnMsg,
             (unsigned short)(sizeof(SignOnMsg)-1),
             (unsigned far *)&byteswritten );

DOSWRITE((unsigned short) 1,
             (char far *)Version,
             (unsigned short)(sizeof(Version)-1),
             (unsigned far *)&byteswritten );

Init_EnableFS_Tab(); /* initialize RAM semaphores for each FS_entry pt */ return NO_ERROR;
}

/*===================================================================
  =========================*/
/*** FS_FSCTL - exported routine for DOSFSCTL processing
 *
 * ENTRY  pArgdat    - points to file system info structs psffsi,psffsd
 *        iArgType   - tells how to interpret pArgdat
 *        func       - function code
 *        pParm      - parameters if needed
 *        lenParm    - size of pParm data
 *        lenData    - size of pData area
 *        plenParmOut - size of pParm buffer sent back
 *        plenDataOut - size of pData buffer sent back
 * EXIT   pData      - return results in this block
 * RETURN Error code
 *
```

5

```
 *    This routine performs many different functions to provide an interface
 *    of communication between a ring 3 application and this test FSD.
 *
 *    WARNING:
 *              This routine validates the pData buffer, it will be assumed
 *              that that address remains valid throughout this FSD call.
 *
 *    EFFECTS:
 *        If func so specifies, the whole selector table will be invalidated.
 *        This should only be used if a thread/process dies before using this
 *        routine to invalidate its table entry. A reboot may be used instead.
 *
 */ int far pascal FS_FSCTL(pArgDat, IArgType, func, pParm, lenParm,
            plenParmOut, pData, lenData ,plenDataOut)
    union argdat far *pArgDat;
    unsigned short    iArgType;
    unsigned short    func;
    char far *        pParm;
    unsigned short    lenParm;
    unsigned short far * plenParmOut;
    char far *        pData;
    unsigned short    lenData;
    unsigned short far * plenDataOut;
    {
            int rc, index, LName = 0;
            unsigned short sel, off, LSeg;
            FsctlRec far * pBuf;

rc = FSH_PROBEBUF(WRITEPROBE,(char far *)plenDataOut,sizeof(short));
            if (rc) {
                    PopupMsg("FS_FSCTL: bad plenDataOut pointer");
                    return rc;
            }
            rc = FSH_PROBEBUF(WRITEPROBE,(char far
    *)plenParmOut,sizeof(short));
            if (rc) {
                    PopupMsg("FS_FSCTL: bad plenParmOut pointer");
                    return rc;
            }
            *plenDataOut = *plenParmOut = 0;

/* we are TESTING this entry point */
            if ( IsEnabled(ENT_FSCTL,(int far *)&index) ) { rc = Disable(ENT_FSCTL,index);
                    if (rc) return rc;

/* allocate a GDT selector for returned data */
                    LSeg = sizeof(FsctlRec);
                    rc = InitTCBInstanceData((unsigned short far *)&sel,
                                    (unsigned short far *)&off,
                                            (int far *)&index,LSeg);
                    if (rc || (index == -1)) goto abort;
```

6

```
                /* make a far pointer to the buffer just allocated */
                pBuf = (FsctlRec far *)MAKEFP(sel,0);

/* copy this entrypoint's ID into buffer */
                pBuf->owner = ENT_FSCTL;

/* copy the pArgDat data */
                switch (iArgType) {
                        case 1:  /* FileHandle directed case */
                                pBuf->thesffsi = *(pArgDat->sf.psffsi);
                                pBuf->thesffsd = *(pArgDat->sf.psffsd);
                                break;
                        case 2:         /* PathName directed case */
                                pBuf->thecdfsi = *(pArgDat->cd.pcdfsi);
                                pBuf->thecdfsd = *(pArgDat->cd.pcdfsd);

/* get pName string length + null */
                                while(*(pArgDat->cd.pPath+(LName++)) != '\0');
                                off = FIELDOFFSET(FsctlRec,pName);
                                rc = CopyParam(sel,(unsigned short far *)&off,
                                               LName,pArgDat->cd.pPath);
                                if (rc) goto abort;

pBuf->iCurDirEnd = pArgDat->cd.iCurDirEnd;
                                break;
                        default: break;
                } pBuf->iArgType   = iArgType;
                pBuf->func       = func;
                pBuf->pParm      = pParm;
                pBuf->lenParm    = lenParm;
                pBuf->plenParmOut = plenParmOut;
                pBuf->pData      = pData;
                pBuf->lenData    = lenData;
                pBuf->plenDataOut = plenDataOut;
        }
        else {          /* we are USING this entry point for communication */ switch (func) { /* note no break;'s */
                        case FUNC_GET_BUF:
                                return RetrieveBuf(pData,lenData);
                        case FUNC_DEL_BUF:
                                return DeleteTabEntry();
                        case FUNC_ENABLE:
                           rc = FSH_PROBEBUF(READPROBE,pParm,sizeof(int));
                           if (rc) {
                                   PopupMsg((char far *)"FS_FSCTL: bad pParm");
                                return rc;
                           }
                           /*pParm buffer contains the ENT_x ID to enable*/
                           return Enable( ((int far *)pParm)[0] );
                        case FUNC_DISABLE:
                           rc = FSH_PROBEBUF(READPROBE,pParm,sizeof(int));
                           if (rc) {
                                   PopupMsg((char far *)"FS_FSCTL: bad pParm");
```

7

```
                return rc;
        }
        /* pParm buffer contains ENT_x ID to disable */
        if (IsEnabled(((int far *)pParm)[0],
                        (int far *)&index)) {
                return Disable(((int far *)pParm)[0],index);
        }
        /* no error if not disabled to begin with */
        return NO_ERROR;
    case FUNC_INIT_FEA_SEG:
    /*delete if can figure out how to alloc seg at init */
                return Init_FEA_Tab();
    case FUNC_DEL_FEALIST:
        rc =
FSH_PROBEBUF(READPROBE,pParm,sizeof(char));
        if (rc) {
                PopupMsg((char far *)"FS_FSCTL: bad pParm");
                return rc;
        }
        return DelFEAList(pParm[0]);
    case FUNC_SET_EATYPE:
        rc = FSH_PROBEBUF(READPROBE,pData,
                        sizeof(EAtype));
        if (rc) {
                PopupMsg((char far *)"FS_FSCTL: bad pData");
                return rc;
        }
        EAtype = *(unsigned far *)pData;
        return NO_ERROR;
    case FUNC_SET_OPENACTION:
        rc = FSH_PROBEBUF(READPROBE,pData,
                        sizeof(OpenAction));
        if (rc) {
                PopupMsg((char far *)"FS_FSCTL: bad pData");
                return rc;
        }
        OpenAction = *(unsigned far *)pData;
        return NO_ERROR;
    case FUNC_SET_SHUTDOWN_DATA:
                return Init_SHUTDOWN_Data(pData,pParm);
    case GET_ERR_INFO:   /* return error code info */
                return NO_ERROR;
    case GET_MIN_MAX_EA:     /* return max/min EA sizes */
                return NO_ERROR;
    case FUNC_CLEAR_TABLE:    /* clear selector table */
                ClearTable();
                return NO_ERROR;
    case FUNC_SEL_TAB_DUMP:
                return SelTabDump(pData,lenData);
    case FUNC_TCB_BUF_COUNT:
                return GetBufCount(pData,lenData);
    default:
                return FSCTL_UNKNOWN_FUNCTION;
    } /* end switch */
}
```

```
                    return NO_ERROR;
 5    abort:
                    DeleteTabEntry();
                    return rc;
      } /* FS_FSCTL() */

10    /*=================================================================
      =====================================*/
      /*** FS_ATTACH - attach a remote drive or pseudo character device
       *
       * ENTRY  flag       - 0=attach;1=detach;2=query
15     *        pDev       - pointer to text of drive: or \dev\device
       *        pvpfsd     - pointer to vpfsd structure
       *        pcdfsd     - pointer to current directory info
       *        pParm      - address of application parameter area
       *        pLen       - pointer to length of application parameter area
20     *
       * EXIT   -none-
       * RETURN NO_ERROR if successful attach/detach; error code if attach 'fails'
       *
       * If enabled:
25     * This routine obtains an entry in the thread/GDT selector table, and
       * records whether the 3rd parameter is null or not. When attaching a
       * remote pseudo-character device, this parameter should be null. It should
       * be valid for all other instances.
       *
30     * If a device is attached, the cdfsd (treated as a DWORD devfsd for devices)
       * is filled in. This same data should arrive intact to FS_OPENCREATE when
       * the device is opened. If a drive is attached, the vpfsd is filled in.
       * This same data should arrive intact to any FS_ entry recieving an hVPB
       * referring to this drive. The cdfsd is also filled in, but with some 'bad'
35     * data, just in case the cdfsd data is passed to OPENCREATE instead of the
       * devfsd data, when a device is opened.
       *
       * WARNING:
       *
40     * EFFECTS:
       * If we are not testing this entrypoint explicitly, and if detaching a
       * drive, any EA's set for this drive are deleted.
       */
      int far pascal
45    FS_ATTACH(flag, pDev, pvpfsd, pcdfsd, pParm, pLen)
            unsigned short         flag;
            char far *             pDev;
            char far *             pvpfsd;
            char far *             pcdfsd;
50          char far *             pParm;
            unsigned short far *   pLen;

{
            int rc,index;
55          unsigned short sel, off, Valid, LSeg=0;
```

9

```
        if ( IsEnabled(ENT_ATTACH,(int far *)&index) ) {
            rc = Disable(ENT_ATTACH,index);
5           if (rc) return rc;

if (flag == 0) {              /* attach */
                LSeg = sizeof(short) * 2;    /* save length & valid flag */
                rc = InitTCBInstanceData((unsigned short far *)&sel,
10                                        (unsigned short far *)&off,
                                          (int far *)&index,LSeg);
                if (rc || (index == -1)) goto abort;

if (pvpfsd == LNULL) {    /* attaching device */
15                  Valid = INVALID;
                    /* fill in cdfsd (treated as devfsd for a device) */
                    memcop((char far *)Ddevfsd,(char far *)pcdfsd,
                            sizeof(long));
                }
20              else {                    /* attaching drive */
                    Valid = VALID;
                    /* fill in the vpfsd for drive */
                    memcop((char far *)Dvpfsd,(char far *)pvpfsd,
                            sizeof(struct vpfsd));
25                  /*
                     * fill in cdfsd with "bad" in case it gets sent to
                     * opencreate when opening a device instead of being
                     * sent 'devfsd'
                     */
30                  memcop((char far *)BadData,(char far *)pcdfsd,
                            sizeof(long));
                }

/* record whether the 3rd parameter is valid or not */
35              rc = CopyParam(sel,(unsigned short far *)&off,
                                sizeof(short),(char far *)&Valid);
                if (rc) goto abort;

}
40          return NO_ERROR;        /* no error for detach or query */
        }

/* if detaching a DRIVE, delete (if) any EA's corresponding to drive*/
        if ((flag == FSA_DETACH) && (pvpfsd != LNULL)) {
45          DelFEAList(pDev[0]);    /* don't worry if error */
        } return NO_ERROR;
abort:
        DeleteTabEntry();
50      return rc;
}
/*=============================================================
  ============================================*/
/*** FS_OPENCREATE -- open/create file entry point
55 *
 * FS_OPENCREATE(pcdfsi, pcdfsd, pName, iCurDirEnd, psffsi, psffsd,
```

```
*         fhandflag, openflag, pAction, attr, pEABuf)
*
* ENTRY   - pcdfsi -> file system independent working directory struct
*           pcdfsd -> file system dependent working directory struct
*           pName -> asciiz name of file
*           iCurDirEnd = index of hte end of the current directory in pName
*           psffsi -> file system independent portion of file instance
*           psffsd -> file system dependent portion of file instance
*           fhandflag = desired sharing mode and access mode
*           openflag = action taken when the file is present or absent
*           pAction -> action taken variable
*           attr = OS/2 file attributes
*           pEABuf -> extended attribute buffer
* EXIT    - returns NO_ERROR because this is a FAKE OpenCreate.
*
* Named pipe considerations:
* THIS CALL DOES NOT DO AN OPEN. It is merely a means of
* opening a named pipe without making or connecting it first
*
* If enabled:
* This routine copies its first 2 parameters to a TCB instance data area
* for verification
*
* In general:
* EAs may be set on a per-drive basis -- i.e. all files pertaining
* to a particular drive will have the last EA list set for any file on
* the same drive (if any). So, care must be taken if setting different
* EA lists for files on the same drive -- be sure the EA's you set are
* not cancelled out by a subsequent DOSOPEN2's.
* sffsi and sffsd are filled in with some bogus values. The action
* returned is always file-created.
*/
int far pascal
FS_OPENCREATE(pcdfsi, pcdfsd, pName, iCurDirEnd, psffsi, psffsd, fhandflag,
              openflag, pAction, attr, pEABuf , pfgenflag)
    struct cdfsi far *         pcdfsi;
    char far *                 pcdfsd;
    char far *                 pName;
    unsigned short             iCurDirEnd;
    struct sffsi far *         psffsi;
    struct sffsd far *         psffsd;
    unsigned short             fhandflag;
    unsigned short             openflag;
    unsigned short far *   pAction;
    unsigned short             attr;
    char far *                 pEABuf;
    unsigned short far *   pfgenflag;
{
        int rc, index, fsdrc = NO_ERROR;
        unsigned short FEAoff, sel, off, Valid, LSeg=0;
        struct FEAList far *temp;

if ( IsEnabled(ENT_OPENCREATE,(int far *)&index) ) { rc = Disable(ENT_OPENCREATE,index);
                if (rc) return rc;
```

11

```
                    /* get the length of the GDT segment needed */
                    LSeg = sizeof(GenericRec);
                    rc = InitTCBInstanceData((unsigned short far *)&sel,
                                        (unsigned short far *)&off,
                                        (int far *)&index,LSeg);
                    if (rc || (index == -1)) goto abort;

/* record whether the 1st parameter is valid or not */
                    Valid = (pcdfsi == LNULL) ? INVALID : VALID;
                    rc = CopyParam(sel,(unsigned short far *)&off,
                            sizeof(short),(char far *)&Valid);
                    if (rc) goto abort;

/* copy the contents of the devfsd field (cdfsd parameter) */
                    rc = CopyParam(sel,(unsigned short far *)&off,
                            sizeof(long),(char far *)pcdfsd);
                    if (rc) goto abort;
            }

*pAction = OpenAction;         /* action set via FSCTL */
            /* if we set action to undefined, then we want to explicitly fail */
            if (OpenAction == UNDEFINED_ACTION) fsdrc = ERROR_OPEN_FAILED;

*pfgenflag = EAtype;           /* this can be set via FSCTL */

/* Is this a file name? */
            if (pName[1] == ':') {
                    psffsi->sfi_type = STYPE_FILE;
                    /*
                    * fill in the first byte of sffsd with current drive letter
                    * if this is a file -- cheap way to let FS_FILEINFO know what
                    * drive a file refers to.  Assuming the next file queried is
                    * the one opened here...
                    */
                    psffsd->sfd_work[0] = pcdfsi->cdi_curdir[0];
                    psffsd->sfd_work[1] = '\0';

/*
                    * Set extended attributes --
                    * if DOSOPEN2 sends in 0L for pEAbuf, the kernel sets the
                    * RPL bits in the SELECTOR to reflect ring3 protection level;
                    * so mask off bits 0&1 of the selector before checking for
                    * NULL.
                    */
                    if ((unsigned long)pEABuf & (~0x00030000)){/*pEABuf not null*/
                            rc = FSH_PROBEBUF(READPROBE,pEABuf,sizeof(struct
    EAOP));
                            if (rc) {
                                    PopupMsg((char far *)"FS_OPEN:bad pEABuf");
                                    return rc;
                            }
                            /* calculate offset into the FSD's per/drive FEA table*/
                            FEAoff = CalcFEAoff(pName[0]);
                            temp = ((struct EAOP far *)pEABuf)->fpFEAList;
```

12

```
                    if ((unsigned short)(temp->feal_cbList) > MAXFEACBLIST) {
                            fsdrc = FSD_FEALIST_TOO_LONG;
                    }
                    else {
                            CopyParam(FEAsel,(unsigned short far *)&FEAoff,
                                    (unsigned short)(temp->feal_cbList),
                                    (char far *)temp);
                    }
            }
    }
    /* is it a device? */
    else if ( ((pName[1] == 'D')&&(pName[2] == 'E')&&(pName[3] == 'V')) ) {
            psffsi->sfi_type = STYPE_DEVICE;
    }
    /* must be a named pipe */
    else {
            psffsi->sfi_type = STYPE_NMPIPE;
            /* fill in first byte of sffsd */
            psffsd->sfd_work[0] = BOGUS_WORK_CHAR;
            psffsd->sfd_work[1] = '\0';
    }

/* fill in some fields of the sffsi with a bogus value */
    psffsi->sfi_ctime = BOGUS_CTIME;
    psffsi->sfi_cdate = BOGUS_CDATE;
    psffsi->sfi_atime = BOGUS_ATIME;
    psffsi->sfi_adate = BOGUS_ADATE;
    psffsi->sfi_mtime = BOGUS_MTIME;
    psffsi->sfi_mdate = BOGUS_MDATE;
    psffsi->sfi_size = (long)BOGUS_SIZE;
    psffsi->sfi_position = (long)BOGUS_POS;

if (Is_Shutdown_Test) Log_SD_Stats(&(pSDdata->Open_stats));

return fsdrc;

abort:
    DeleteTabEntry();
    return rc;

}
/*=========================================================
========================*/
/*** FS_FILEINFO -- returns information for a specific file
 *
 * ENTRY    flag    - indicates retrieval vs. setting of information
 *          psffsi  - pointer to file system independent data
 *                    psffsd - pointer to file system dependent data
 *                    level   - information level to be returned
 *          pData   - address of application data area
 *                    cbData  - length of the application data area
 *                    IOflag  - per handle flag
 * EXIT  -none-
 * RETURN  NO_ERROR if successful
 * If enabled:
```

```
           *
           * WARNING:
           * EFFECTS: EA's will always be returned for query of level 4
           */
 5         int far pascal
           FS_FILEINFO(flag, psffsi, psffsd, level, pData, cbData, IOflag)
                  unsigned short          flag;
                  struct sffsi far *      psffsi;
                  struct sffsd far *      psffsd;
10                unsigned short          level;
                  char far *              pData;
                  unsigned short          cbData;
                  unsigned short          IOflag;
           {
15                         int rc, index;
                           unsigned short sel, off, LSeg;
                           FileInfoRec far * pBuf;

if ( IsEnabled(ENT_FILEINFO,(int far *)&index) ) {
20                                 rc = Disable(ENT_FILEINFO,index);
                                   if (rc) return rc;

/* allocate a GDT selector for returned data */
                                   LSeg = sizeof(FileInfoRec);
25                                 rc = InitTCBInstanceData((unsigned short far *)&sel,
                                                   (unsigned short far *)&off,
                                                           (int far *)&index,LSeg);
                                   if (rc || (index == -1)) goto abort;

30                                 pBuf = (FileInfoRec far *)MAKEFP(sel,0);

pBuf->owner    = ENT_FILEINFO;
                                   pBuf->flag     = flag;
                                   pBuf->thesffsi = *psffsi;
35                                 pBuf->thesffsd = *psffsd;
                                   pBuf->level    = level;
                                   pBuf->pData    = pData;
                                   /* cbData should be cbList (of FEA list) + sizeof EAOP */
                                   pBuf->cbData   = cbData;
40                                 pBuf->IOflag   = IOflag;
                           }
                           /* always copy the FEA list for retrieval of level 4 info */
                           if ((flag == 0) && (level == 4)) {
                                   /*if sfd_work is trashed--use FSH_NAMEFROMSFN with LDT buf*/
45                                 return CopyFEAList(psffsd->sfd_work[0],
                                                   (struct EAOP far *)pData);
                           }
                           else return NO_ERROR;

50         abort:
                           DeleteTabEntry();
                           return rc;

}
55         /*===============================================
           =====================*/
```

14

```
/*** FS_PATHINFO - get/set a file's informations
 *
 *   ENTRY     flag           - retrieve=0; set=1; all other values reserved
 *             pcdfsi         - ptr to file system independent curdir data
 *             pcdfsd         - ptr to file system dependend curdir data
 *             pName          - ptr to name of file or directory
 *             iCurDirEnd     - index of the end of the curdir in pName
 *             level          - level of info to return in pData
 *             pData          - ptr to application data area
 *             cbData         - length of application data area
 *   EXIT      pData          - filled with requested info (if flag = 0)
 *   RETURN
 *   WARNING
 *   EFFECTS:
 *     EA's will always be returned for query of level 4
 *
 *
 *
 */
int far pascal
FS_PATHINFO(flag, pcdfsi, pcdfsd, pName, iCurDirEnd, level, pData, cbData)
        unsigned short          flag;
        struct cdfsi far *      pcdfsi;
        struct cdfsd far *      pcdfsd;
        char far *              pName;
        unsigned short          iCurDirEnd;
        unsigned short          level;
        char far *              pData;
        unsigned short          cbData;
{
        int rc, index;
        unsigned short sel, off, LSeg, LName = 0;
        PathInfoRec far * pBuf;

if ( IsEnabled(ENT_PATHINFO,(int far *)&index) ) {
                rc = Disable(ENT_PATHINFO,index);
                if (rc) return rc;

/* allocate a GDT selector for returned data */
                LSeg = sizeof(PathInfoRec);
                rc = InitTCBInstanceData((unsigned short far *)&sel,
                                (unsigned short far *)&off,
                                        (int far *)&index,LSeg);
                if (rc || (index == -1)) goto abort;

pBuf = (PathInfoRec far *)MAKEFP(sel,0);

pBuf->owner    = ENT_PATHINFO;
                pBuf->flag     = flag;
                pBuf->thecdfsi = *pcdfsi;
                pBuf->thecdfsd = *pcdfsd;

/* copy the pName parameter */
                off = FIELDOFFSET(PathInfoRec,pName);
```

15

```
                        while(*(pName+(LName++)) != '\0'); /* get the name length */
                        rc = CopyParam(sel,(unsigned short far *)&off,
                                    LName,pName);
                        if (rc) goto abort;
 5
                        pBuf->iCurDirEnd = iCurDirEnd;
                        pBuf->level      = level;
                        pBuf->pData      = pData;
                        pBuf->cbData     = cbData;
10
                }

/* always copy the FEA list for retrieval of level 4 info */
                if ((flag == 0) && (level == 4)) {
15                        return CopyFEAList(pName[0],(struct EAOP far *)pData);
                }
                else return NO_ERROR;

abort:
20              DeleteTabEntry();
                return rc;

}
        /*========================================================
25      =========================*/
        int far pascal
        FS_SHUTDOWN(type,reserved)
        unsigned short  type;
        unsigned long   reserved;
30      { if defined(generic)

/*
35               * If reserved is not 0, it will be recorded in the pSDdata segment.
                 * If it is bad on > 1 call, the last bad value received will be
                 * reflected when the data is retrieved by the ring3 test.
                 */
                if (reserved != 0L) {
40                      pSDdata->General_stats.FS_SD_bad_reserved = reserved;
                } switch (type) {
                case SHUTDOWN_START:{
45                        SD_Status = DURING_SD;
                        /* signal the ring3 test's worker threads to begin */
                        if (pSDdata != LNULL) {
                FSH_SEMCLEAR((char far *)pSDdata-
        >General_stats.Signal_SD_RAM_sem);
50                        }
                        break;
                }
                case SHUTDOWN_END: {
                        SD_Status = AFTER_SD;
55                        break;
                }
```

16

```
                    default: {
                            /* the last bad type param received will be recorded */
                            pSDdata->General_stats.FS_SD_bad_type = type;
                    }
5           }/* switch */

/* record the thread which called FS_SHUTDOWN */
            if (pSDdata != LNULL) {         /* only if the test is calling us.. */
                    Log_SD_Stats(&(pSDdata->Shutdown_stats));
10                  /* allow other threads to run */
                    FSH_YIELD();
            }
            /* even if a param is bad, return 0; error will be recorded in GDT */
15  #endif
            return NO_ERROR;
    }
    /*=========================================================
    =========================*/
20  /* return the uppercase of an alphabetic character, else return 0 */
    char ToUpper(letter)
    char letter;
    {
            if (ISBETWEEN('A','Z',letter)) return letter;
25          else if (ISBETWEEN('a','z',letter)) return (letter - 'a' + 'A');
            else return 0x00;
    }

/*=========================================================
30  =========================*/
    /*** Init_FEA_Tab() -- allocate a GDT for the FSD's per/drive FEA lists
     *
     * ENTRY    none
     * EXIT
35   * RETURN:  appropriate error code
     *
     * WARNING:
     * If multiple threads (processes) will be accessing the same FSD built
     * from this file, a semaphore must be added to the section of code as
40   * indicated. We only want the GDT selector to be allocated once.
     *
     * EFFECTS:
     * The FSD will allocate itself a GDT segment to use for storing FEA lists
     * on a per/drive (not per/file) basis. The GDT block is divided into
45   * NUMDRIVE sub-blocks. Each drive has MAXFEACBLIST bytes
     * in which to store its FEA list. Initially, each FEA list is empty. This
     * is indicated by storing the sizeof the cbList field of an FEA list in the
     * first bytes of each sub-block. This GDT segment is only allocated if
     * a test application explicitly instructs it (via FS_FSCTL).
50   */
    /* long size is hardcoded here for cblist */
    int Init_FEA_Tab()
    {
            char far * FEATab;
55          int i = 0, rc;
            unsigned FEAoff;
```

17

```
                  /*====HEY!!! GET A SEMAPHORE====*/
                  if (FEAsel != 0) return FEA_SEGMENT_EXISTS;
                  /* allocate a ring 0, GDT, nonswappable segment selector */
5                 rc = FSH_SEGALLOC(0x0000,(long)(MAXFEACBLIST*NUMDRIVES),
                              (unsigned short far *)&FEAsel);
                  /*====HEY!!! RELEASE THE SEMAPHORE====*/
                  if (rc) return rc;
                  for (i='A';i<='Z';i++) {
10                        FEAoff = CalcFEAoff(i);
                          FEAtab = (char far *)MAKEFP(FEAsel,FEAoff);
                          ((unsigned long far *)FEAtab)[0] = (long)NULLFEACBLIST;
                  }
                  return NO_ERROR;
15       }
         /*==================================================
         =======================*/
         /***DelFEAList -- mark the FEA list for a drive as empty
          *
20        * ENTRY    drive   - which drive to mark an empty FEA list for
          * EXIT
          * RETURN   appropriate error code
          * WARNING:
          * EFFECTS:
25        * The first bytes of the appropriate sub-block of the FSD's FEA segment
          * is marked with the sizeof the cbList field of an FEAlist. This indicates
          * that the list is empty, i.e. only is long enough to hold the length of
          * the field itself, which indicates the length of the list.
          *
30        */
         int DelFEAList(drive)
         char drive;
         {
                  char far * FEAtab, updrive;
35
                  if (!(updrive = ToUpper(drive))) return ERROR_INVALID_DRIVE;
                  if (FEAsel != 0) {
                          FEAtab = (char far *)MAKEFP(FEAsel,CalcFEAoff(updrive));
                          ((unsigned long far *)FEAtab)[0] = (long)NULLFEACBLIST;
40                        return NO_ERROR;
                  }
                  else return NULL_FEA_SELECTOR;
         }
         /*==================================================
45       =======================*/
         /***CopyFEAList -- copy the FEA sub-block for this drive to an FEA buffer
          *
          * ENTRY    drive   - which drive should we get the FEA list for?
          *                   pEAOP - pointer to an EAOP list which holds the pointer
50        *                   to the FEA buffer we will copy our FEA list to
          * EXIT
          * RETURN
          * WARNING: FEA lists are limited to 64k in OS/2 version 1.2
          * EFFECTS:
55        *
          * An EAOP structure contains a pointer to an FEA list buffer. It is
```

18

```
     *  this pointer that will be used as the destination of the FEA list copy.
     *  The appropriate source FEA list will be calculated from 'drive' and
     *  the FSD's FEA segment.
     *
 5   */
     int CopyFEAList(drive,pEAOP)
     char drive;
     struct EAOP far * pEAOP;
     {
10              int rc;
                struct FEAList far * dest;
                char far * source;
                unsigned count;

15              rc = FSH_PROBEBUF(READPROBE,(char far *)pEAOP,sizeof(struct
     EAOP));
                if (rc) {
                        PopupMsg((char far *)"CopyFEAList: bad pEAOP");
                        return rc;
20              } dest = pEAOP->fpFEAList;
                /* note conversions from long to short for version 1.2 */
                rc = FSH_PROBEBUF(WRITEPROBE,(char far *)dest,
25                              (unsigned short)(dest->feal_cbList));
                if (rc) {
                        PopupMsg((char far *)"CopyFEAList: bad fpFEAList");
                        return rc;
                }
30
                source = (char far *)MAKEFP(FEAsel,CalcFEAoff(drive));
                count = (unsigned short)(((unsigned long far *)source)[0]);

/* EA lists are restricted to 64k in 1.2 */
35              if ((unsigned short)(dest->feal_cbList) < count) {
                        return ERROR_BUFFER_OVERFLOW;
                } memcop(source,(char far *)dest,count);
40              return NO_ERROR;
     } unsigned Init_SHUTDOWN_Data(pGDT_sel,pCBsel)
     char far * pGDT_sel;
45   char far * pCBsel;
     {
                unsigned rc;

rc = FSH_PROBEBUF(WRITEPROBE,pGDT_sel,sizeof(short));
50              if (rc) {
                        PopupMsg((char far *)"Init_SHUTDOWN_Data:bad pGDT_sel");
                        return rc;
                }
                rc = FSH_PROBEBUF(READPROBE,pCBsel,sizeof(short));
55              if (rc) {
                        PopupMsg((char far *)"Init_SHUTDOWN_Data:bad pCBsel");
```

```
                                        return rc;
                                }

/* allocate a ring 3, GDT, non-swappable segment selector */
5                               rc = FSH_SEGALLOC(0x6000,(unsigned long)*(unsigned far *)pCBsel,
                                                (unsigned short far *)pGDT_sel);
                                if (rc!= NO_ERROR) return rc;

pSDdata = (struct SD_stats far *)MAKEFP((unsigned)*(unsigned far
10      *)pGDT_sel,0);
                                Is_Shutdown_Test = VALID;
                                SD_Status = BEFORE_SD;
                                return DetermineTID(&(pSDdata->General_stats.SD_tid));
                        }
15
        /* FS_FSCTL must have been called with FUNC_SET_SHUTDOWN_DATA prior ...*/
        void Log_SD_Stats(who)
        struct SD_FS_stats far * who;
        {
20                              unsigned short tid;

DetermineTID(&tid);

/* log whether or not this is the shutdown thread, or another thread*/
25                              if (tid == pSDdata->General_stats.SD_tid) who->SD_tid_cnt++;
                                else who->Other_tid_cnt++;

/* log the point in the shutdown process that this call came in */
                                switch (SD_Status) {
30                                      case BEFORE_SD: {who->Before_cnt++;break;}
                                        case DURING_SD: {who->During_cnt++;break;}
                                        case AFTER_SD : {who->After_cnt++; break;}
                                }
        }
35
        int far pascal
        FS_COMMIT(type, IOflag, psffsi, psffsd)
                unsigned short          type;
                unsigned short          IOflag;
40              struct sffsi far *      psffsi;
                struct sffsd far *      psffsd;
        {
                        int rc, index;
                        unsigned short sel, off, LSeg;
45                      CommitnCloseRec far * pBuf;

if ( IsEnabled(ENT_COMMIT,(int far *)&index) ) {
                                rc = Disable(ENT_COMMIT,index);
                                if (rc) return rc;
50
                                LSeg = sizeof(CommitnCloseRec);
                                rc = InitTCBInstanceData((unsigned short far *)&sel,
                                                (unsigned short far *)&off,
                                                (int far *)&index,LSeg);
55                              if (rc || (index == -1)) goto abort;
```

```
                            pBuf = (CommitnCloseRec far *)MAKEFP(sel,0);

pBuf->owner    = ENT_COMMIT;
                            pBuf->type     = type;
5                           pBuf->lOflag   = lOflag;
                    } if (Is_Shutdown_Test) Log_SD_Stats(&(pSDdata->Commit_stats));
                    return NO_ERROR;
10      abort:
                    DeleteTabEntry();
                    return rc;
        }

15      int far pascal
        FS_READ(psffsi, psffsd, pData, pLen, lOflag)
             struct sffsi far *          psffsi;
             struct sffsd far *          psffsd;
             char far *                  pData;
20           unsigned short far *   pLen;
             unsigned short             lOflag;
        {
                    int rc, index;

25                  if ( IsEnabled(ENT_READ,(int far *)&index) ) {
                            rc = Disable(ENT_READ,index);
                            if (rc) return rc;
                            return SaveFlags(lOflag);
                    }
30
                    if (Is_Shutdown_Test) Log_SD_Stats(&(pSDdata->Read_stats));
                    return NO_ERROR;
        }

35      int far pascal
        FS_WRITE(psffsi, psffsd, pData, pLen, lOflag)
             struct sffsi far *          psffsi;
             struct sffsd far *          psffsd;
             char far *                  pData;
40           unsigned short far *   pLen;
             unsigned short             lOflag;
        {
                    int rc, index;

45                  if ( IsEnabled(ENT_WRITE,(int far *)&index) ) {
                            rc = Disable(ENT_WRITE,index);
                            if (rc) return rc;
                            return SaveFlags(lOflag);
                    }
50
                    if (Is_Shutdown_Test) Log_SD_Stats(&(pSDdata->Write_stats));
                    return NO_ERROR;
        }

55      int far pascal
        FS_DELETE(pcdfsi, pcdfsd, pFile, iCurDirEnd)
```

21

```
                struct cdfsi far *              pcdfsi;
                struct cdfsd far *              pcdfsd;
                char far *                      pFile;
                unsigned short                  iCurDirEnd;
5       {
                        if (Is_Shutdown_Test) Log_SD_Stats(&(pSDdata->Delete_stats));
                        return NO_ERROR;
        }

10      int far pascal
        FS_FLUSHBUF(hVPB, flag)
                unsigned short                  hVPB;
                unsigned short                  flag;
        {
15              int rc, index;

if ( IsEnabled(ENT_FLUSHBUF,(int far *)&index) ) {
                        rc = Disable(ENT_FLUSHBUF,index);
                        if (rc) return rc;
20                      return Getvpfsd(hVPB);
                } if (Is_Shutdown_Test) Log_SD_Stats(&(pSDdata->Flushbuf_stats));
                return NO_ERROR;
25      } int far pascal
        FS_CHDIR(flag, pcdfsi, pcdfsd, pDir, iCurDirEnd)
                unsigned short                  flag;
30              struct cdfsi far *              pcdfsi;
                struct cdfsd far *              pcdfsd;
                char far *                      pDir;
                unsigned short                  iCurDirEnd;
        {
35                      if (Is_Shutdown_Test) Log_SD_Stats(&(pSDdata->Other_stats));
                        return NO_ERROR;
        } int far pascal
40      FS_CHGFILEPTR(psffsi, psffsd, offset, type, IOflag)
                struct sffsi far *              psffsi;
                struct sffsd far *              psffsd;
                long                            offset;
                unsigned short                  type;
45              unsigned short                  IOflag;
        {
                        int rc, index;

if ( IsEnabled(ENT_CHGFILEPTR,(int far *)&index) ) {
50                              rc = Disable(ENT_CHGFILEPTR,index);
                                if (rc) return rc;
                                return SaveFlags(IOflag);
                        }

55                      if (Is_Shutdown_Test) Log_SD_Stats(&(pSDdata->Other_stats));
                        return NO_ERROR;
```

22

```
        } int far pascal
    FS_CLOSE(type, IOflag, psffsi, psffsd)
5       unsigned short          type;
        unsigned short          IOflag;
        struct sffsi far *      psffsi;
        struct sffsd far *      psffsd;
    {
10          int rc, index;
            unsigned short sel, off, LSeg;
            CommitnCloseRec far * pBuf;

if ( IsEnabled(ENT_CLOSE,(int far *)&index) ) {
15              rc = Disable(ENT_CLOSE,index);
                if (rc) return rc;

LSeg = sizeof(CommitnCloseRec);
                rc = InitTCBInstanceData((unsigned short far *)&sel,
20                                       (unsigned short far *)&off,
                                         (int far *)&index,LSeg);
                if (rc || (index == -1)) goto abort;

pBuf = (CommitnCloseRec far *)MAKEFP(sel,0);
25
                pBuf->owner   = ENT_CLOSE;
                pBuf->type    = type;
                pBuf->IOflag  = IOflag;
            }
30
            if (Is_Shutdown_Test) Log_SD_Stats(&(pSDdata->Other_stats));
            return NO_ERROR;
        abort:
            DeleteTabEntry();
35          return rc;
    } int far pascal
    FS_COPY(mode, pcdfsd, pcdfsi, pSrc, iSrcCurDirEnd, pDst, iDstCurDirEnd, flags)
40      unsigned short      mode;
        struct cdfsi far * pcdfsd;
        struct cdfsd far * pcdfsi;
        char far * pSrc;
        unsigned short iSrcCurDirEnd;
45      char far * pDst;
        unsigned short iDstCurDirEnd;
        unsigned short flags;
    {
            if (Is_Shutdown_Test) Log_SD_Stats(&(pSDdata->Other_stats));
50          return(ERROR_CANNOT_COPY);
    } void far pascal
    FS_EXIT(uid, pid, pdb)
55      unsigned short          uid;
        unsigned short          pid;
```

23

```
                unsigned short          pdb;
        {
                        if (Is_Shutdown_Test) Log_SD_Stats(&(pSDdata->Other_stats));
5       } int far pascal
        FS_FILEATTRIBUTE(flag, pcdfsi, pcdfsd, pName, iCurDirEnd, pAttr)
                unsigned short          flag;
10              struct cdfsi far *      pcdfsi;
                struct cdfsd far *      pcdfsd;
                char far *              pName;
                unsigned short          iCurDirEnd;
                unsigned short far *    pAttr;
15      {
                        if (Is_Shutdown_Test) Log_SD_Stats(&(pSDdata->Other_stats));
                        return ERROR_NOT_SUPPORTED;
        }

20      int far pascal
        FS_FILEIO(psffsi, psffsd, pCmdList, pCmdLen, poError, IOflag)
                struct sffsi far *      psffsi;
                struct sffsd far *      psffsd;
                char far *              pCmdList;
25              unsigned short          pCmdLen;
                unsigned short far *    poError;
                unsigned short          IOflag;
        {
                        int rc, index;
30
                        if ( IsEnabled(ENT_FILEIO,(int far *)&index) ) {
                                rc = Disable(ENT_FILEIO,index);
                                if (rc) return rc;
                                return SaveFlags(IOflag);
35                      } if (Is_Shutdown_Test) Log_SD_Stats(&(pSDdata->Other_stats));
                        return ERROR_NOT_SUPPORTED;
        }
40
        int far pascal
        FS_FINDCLOSE(pfsfsi,pfsfsd)
                struct fsfsi far *      pfsfsi;
                struct fsfsd far *      pfsfsd;
45      {
                        if (Is_Shutdown_Test) Log_SD_Stats(&(pSDdata->Other_stats));
                        return ERROR_NOT_SUPPORTED;
        }

50
        int far pascal
        FS_FINDFROMNAME(pfsfsi, pfsfsd, pData, cbData, pcMatch, level, position,
                            pName,flags)
                struct fsfsi far *      pfsfsi;
55              struct fsfsd far *      pfsfsd;
                char far *              pData;
```

```
                unsigned short              cbData;
                unsigned short far *  pcMatch;
                unsigned short              level;
                unsigned long               position;
    5           char far *                  pName;
                unsigned short              flags;
        {
                        if (Is_Shutdown_Test) Log_SD_Stats(&(pSDdata->Other_stats));
                        return ERROR_NOT_SUPPORTED;
    10  } int far pascal
        FS_FINDFIRST(pcdfsi, pcdfsd, pName, iCurDirEnd, attr, pfsfsi, pfsfsd, pData, cbData,
                        pcMatch, level, flags)
    15          struct cdfsi far *          pcdfsi;
                struct cdfsd far *          pcdfsd;
                char far *                  pName;
                unsigned short              iCurDirEnd;
                unsigned short              attr;
    20          struct fsfsi far *          pfsfsi;
                struct fsfsd far *          pfsfsd;
                char far *                  pData;
                unsigned short              cbData;
                unsigned short far *  pcMatch;
    25          unsigned short              level;
                unsigned short              flags;
        {
                        if (Is_Shutdown_Test) Log_SD_Stats(&(pSDdata->Other_stats));
                        return ERROR_NOT_SUPPORTED;
    30  } int far pascal
        FS_FINDNEXT(pfsfsi, pfsfsd, pData, cbData, pcMatch, level, flag)
                struct fsfsi far *          pfsfsi;
    35          struct fsfsd far *          pfsfsd;
                char far *                  pData;
                unsigned short              cbData;
                unsigned short far *  pcMatch;
                unsigned short              level;
    40          unsigned short              flag;
        {
                        if (Is_Shutdown_Test) Log_SD_Stats(&(pSDdata->Other_stats));
                        return ERROR_NOT_SUPPORTED;
        }
    45
        int far pascal
        FS_FSINFO(flag, hVPB, pData, cbData, level)
                unsigned short              flag;
                unsigned short              hVPB;
    50          char far *                  pData;
                unsigned short              cbData;
                unsigned short              level;
        {
                        int rc, index;
    55
                        if ( IsEnabled(ENT_FSINFO,(int far *)&index) ) {
```

25

```
                    rc = Disable(ENT_FSINFO,index);
                    if (rc) return rc;
                    return Getvpfsd(hVPB);
            }
5
            if (Is_Shutdown_Test) Log_SD_Stats(&(pSDdata->Other_stats));
            return ERROR_NOT_SUPPORTED;
    }

10  int far pascal
        FS_IOCTL(psffsi, psffsd, cat, func, pParm, lenParm, pData, lenData)
            struct sffsi far *      psffsi;
            struct sffsd far *      psffsd;
            unsigned short          cat;
15          unsigned short          func;
            char far *              pParm;
            unsigned short          lenParm;
            char far *              pData;
            unsigned short          lenData;
20  {
                    return ERROR_NOT_SUPPORTED;
    } int far pascal
25  MFS_CHGFILEPTR(
        unsigned long  offset,
        unsigned short type
    )
    {
30                  return ERROR_NOT_SUPPORTED;
    } int far pascal
    MFS_CLOSE()
35  {
                    return ERROR_NOT_SUPPORTED;
    } int far pascal
40  MFS_INIT(
        void far * bootdata,
        char far * number_io,
        long far * vectorripl,
        char far * bpb,
45      unsigned long far *   pMiniFSD,
        unsigned long far * dumpaddr
    )
    {
                    return ERROR_NOT_SUPPORTED;
50  } int far pascal
    MFS_OPEN(
        char far * name,
55      unsigned long far *   size
    )
```

```
        {
            return ERROR_NOT_SUPPORTED;
        }

5      int far pascal
        MFS_READ(
            char far * data,
            unsigned short far * length
        )
10      {
            return ERROR_NOT_SUPPORTED;
        } int far pascal
15      MFS_TERM()
        {
            return ERROR_NOT_SUPPORTED;
        }

20      int far pascal
        FS_MKDIR(pcdfsi, pcdfsd, pName, iCurDirEnd, pEABuf , flags)
            struct cdfsi far *          pcdfsi;
            struct cdfsd far *          pcdfsd;
            char far *                  pName;
25          unsigned short              iCurDirEnd;
            char far *                  pEABuf;
            unsigned short              flags;
        {
                    if (Is_Shutdown_Test) Log_SD_Stats(&(pSDdata->Other_stats));
30                  return NO_ERROR;
        }

/* FS_MOUNT flags */
35
        #define     MOUNT_NEW       0
        #define     MOUNT_REMOVED   1
        #define     MOUNT_DISMOUNT  2
        #define     MOUNT_FORMAT    3
40
        /***    FS_MOUNT - handle volume mounting
         *
         *
         * ENTRY    flag  - operation type
45       *                 pvpfsi - VPB info (file system independent)
         *         pvpfsd - VPB info (file system dependent)
         *                 hVPB   - handle to VPB
         *                 pBoot  - boot sector contents
         * EXIT    -none-
50       * RETURN  NO_ERROR if match; !NO_ERROR if fails to match
         *
         * This routine will accept the volume if:
         *          1. The Boot_Sig field is 41d or greater
         *          2. The Boot_System_ID matches FS_NAME for all FS_NAME_LEN chars
55       *
         * WARNING:
```

26

27

```
       *
       * EFFECTS:
       *            uses FS_NAME[] for ID matching
       *
 5     */ int far pascal FS_MOUNT(flag, pvpfsi, pvpfsd, hVPB, pBoot)
       unsigned short    flag;
       struct vpfsi far *  pvpfsi;
10     struct vpfsd far *  pvpfsd;
       unsigned short    hVPB;
       char far *        pBoot;
       {
             struct Extended_Boot far *ExtBoot = (struct Extended_Boot far *)pBoot;
15           int i,err = NO_ERROR;

switch (flag) {
                   case MOUNT_NEW:
                         /* New volume mounted, check for acceptance */
20
                   /* Check signature */ if (ExtBoot->Boot_Sig < 41)
                         err = !NO_ERROR;
25
                   /* Check FSD name */ i=0;
                         do {
30                         if (ExtBoot->Boot_System_ID[i] != FS_NAME[i]) {
                                err = !NO_ERROR;
                                break;
                           }
                         } while (FS_NAME[++i] != '\0');
35
                   /* Copy boot record information (if volume is accepted) */ if (err == NO_ERROR) {
                         pvpfsi->vpi_vid   = ExtBoot->Boot_Serial;
40                       pvpfsi->vpi_bsize = ExtBoot->Boot_BPB.BytesPerSector;
                         pvpfsi->vpi_totsec = ExtBoot->Boot_BPB.TotalSectors ?
                                            (long)ExtBoot->Boot_BPB.TotalSectors :
                                            ExtBoot->Boot_BPB.Ext_TotalSectors;
                         pvpfsi->vpi_trksec = ExtBoot->Boot_BPB.SectorsPerTrack;
45                       pvpfsi->vpi_nhead = ExtBoot->Boot_BPB.Heads;
                         for (i=0; i<VOLLABELLEN; i++)
                           pvpfsi->vpi_text[i] = ExtBoot->Boot_Vol_Label[i];
                         pvpfsi->vpi_text[VOLLABELLEN] = '\0';

50                 } break;

case MOUNT_REMOVED:
55                       /* Volume was removed, but references to it still exits */
```

28

```
                    /* No action needed in this FSD */
                    break;

case MOUNT_DISMOUNT:
 5                  /* Volume was removed and all references have been closed */

/* No action needed in this FSD */
                    break;

10              case MOUNT_FORMAT:
                    /* Accept volume blindly, format to fit this file system */

/* Format not allowed in this FSD */
                    err = !NO_ERROR;
15              break;
            } if (Is_Shutdown_Test) Log_SD_Stats(&(pSDdata->Other_stats));
            return(err);
20      } int far pascal
        FS_MOVE(pcdfsi, pcdfsd, pSrc, iSrcCurDirEnd, pDst, iDstCurDirEnd, flags)
            struct cdfsi far *          pcdfsi;
25          struct cdfsd far *          pcdfsd;
            char far *                  pSrc;
            unsigned short              iSrcCurDirEnd;
            char far *                  pDst;
            unsigned short              iDstCurDirEnd;
30          unsigned short              flags;
        {
            if (Is_Shutdown_Test) Log_SD_Stats(&(pSDdata->Other_stats));
            return ERROR_NOT_SUPPORTED;
        }
35
        int far pascal
        FS_NEWSIZE(psffsi, psffsd, len, IOflag)
            struct sffsi far *          psffsi;
            struct sffsd far *          psffsd;
40          unsigned long               len;
            unsigned short              IOflag;
        {
            int rc, index;

45          if ( IsEnabled(ENT_NEWSIZE,(int far *)&index) ) {
                rc = Disable(ENT_NEWSIZE,index);
                if (rc) return rc;
                psffsi->sfi_size = len;
                return SaveFlags(IOflag);
50          } if (Is_Shutdown_Test) Log_SD_Stats(&(pSDdata->Other_stats));
            return ERROR_NOT_SUPPORTED;
        }
55
        int far pascal
```

29

```
        FS_NMPIPE(psffsi, psffsd, OpType, pOpRec, pData, pName)
        struct sffsi far * psffsi;
        struct sffsd far * psffsd;
        unsigned short OpType;
    5   union npoper far * pOpRec;
        char far * pData;
        char far * pName;
        {
                    int rc, index;
   10               unsigned short sel, off, Valid, LSeg=0, LRec = 0, LDat=0, LNam=0;

if ( IsEnabled(ENT_NMPIPE,(int far *)&index) ) {
                            rc = Disable(ENT_NMPIPE,index);
   15                       if (rc) return rc;

switch (OpType) {
                              case NMP_GetPHandState:
                              case NMP_SetPHandState:
                                LRec = sizeof(struct phs_param);
   20                           LDat = ((struct phs_param far *)pOpRec)->phs_dlen;
                                break;
                              case NMP_PipeQInfo:
                                LRec = sizeof(struct npi_param);
   25                           LDat = ((struct npi_param far *)pOpRec)->npi_dlen;
                                break;
                              case NMP_PeekPipe:
                                LRec = sizeof(struct npp_param);
                                LDat = ((struct npp_param far *)pOpRec)->npp_dlen;
   30                           break;
                              case NMP_ConnectPipe:
                                LRec = sizeof(struct npc_param);
                                LDat = ((struct npc_param far *)pOpRec)->npc_dlen;
                                break;
                              case NMP_DisconnectPipe:
   35                           LRec = sizeof(struct npd_param);
                                LDat = ((struct npd_param far *)pOpRec)->npd_dlen;
                                break;
                              case NMP_TransactPipe:
                                LRec = sizeof(struct npt_param);
   40                           LDat = ((struct npt_param far *)pOpRec)->npt_ilen;
                                break;
                              case NMP_READRAW:
                                LRec = sizeof(struct npr_param);
                                LDat = ((struct npr_param far *)pOpRec)->npr_dlen;
   45                           break;
                              case NMP_WRITERAW:
                                LRec = sizeof(struct npw_param);
                                LDat = ((struct npw_param far *)pOpRec)->npw_dlen;
                                break;
   50                         case NMP_WAITPIPE:
                                LRec = sizeof(struct npq_param);
                                LDat = ((struct npq_param far *)pOpRec)->npq_dlen;
                                if (pName != LNULL) {
                                        /* get the length of the pipe name */
   55                                   while(*(pName+(LNam++)) != '\0');
                                }
```

APPENDIX V
```
          LIBRARY
          DESCRIPTION 'BASEFSD - R3ENTRYNEW testing'

5        ;              NOTE: The FSD loader only supports the following rules:
          ;                    CODE PRELOAD
          ;                    DATA PRELOAD [SINGLE | NONE] SHARED MOVABLE
          NONDISCARDABLE
          ;
10        ;

CODE PRELOAD
          DATA PRELOAD SINGLE SHARED MOVABLE
          PROTMODE
15

;IMPORTS
          ;              FSHELPER.

20        EXPORTS
                         FS_ATTRIBUTE=_FS_ATTRIBUTE   ; DWORD attribute vector
                         FS_NAME=_FS_NAME             ; ASCIIZ name string FS_ATTACH                    ; From FS_ATTACH on are procedures
25                       FS_CHDIR
                         FS_CHGFILEPTR
                         FS_CLOSE
                         FS_COMMIT
                         FS_COPY
30                       FS_DELETE
                         FS_EXIT
                         FS_FILEATTRIBUTE
                         FS_FILEINFO
                         FS_FILEIO
35                       FS_FINDCLOSE
                         FS_FINDFIRST
                         FS_FINDFROMNAME
                         FS_FINDNEXT
                         FS_FINDNOTIFYCLOSE
40                       FS_FINDNOTIFYFIRST
                         FS_FINDNOTIFYNEXT
                         FS_FLUSHBUF
                         FS_FSCTL
                         FS_FSINFO
45                       FS_INIT
                         FS_IOCTL
                         FS_MKDIR
                         FS_MOUNT
                         FS_MOVE
50                       FS_NEWSIZE
                         FS_NMPIPE
                         FS_OPENCREATE
                         FS_PATHINFO
                         FS_PROCESSNAME
55                       FS_READ
                         FS_RMDIR
```

```
         FS_SETSWAP
         FS_SHUTDOWN
         FS_WRITE

5      MFS_CHGFILEPTR
         MFS_CLOSE
         MFS_INIT
         MFS_OPEN
         MFS_READ
 10      MFS_TERM
```

APPENDIX VI

```
/* BASEFSD.H
 * Sue Adams
 * Copyright 1988, Microsoft Corp.
 *
 * MODIFICATION HISTORY:
 * 89.04.07 -- integrate various .h files
 * 88.10.   -- initial version
 */

/*
 * names for the different FSD's
 */ if defined(generic)

define FSDNAME  "GENREM"
#define VERSION  "Ver 2.0 (89.04.06)\r\n";
#define SIGNONMSG "Multi-Threaded REMOTE/FILIO FSD\r\n";
unsigned long FS_ATTRIBUTE = FSA_REMOTE|FSA_LOCK;

#elif defined(fsnmpipe)

#define FSDNAME "UNC1"
#define VERSION "Ver 2.0 (89.04.05)\r\n";
#define SIGNONMSG "UNC remote pipe test FSD\r\n";
unsigned long FS_ATTRIBUTE = FSA_REMOTE|FSA_UNC;

#elif defined(onetid)

#define FSDNAME "REM1"
#define VERSION "Ver 2.0 (89.04.06)\r\n"
#define SIGNONMSG "Single Threaded REMOTE FSD\r\n"
unsigned long FS_ATTRIBUTE = FSA_REMOTE;

#endif

/*
 * FSH_PROBEBUF operation codes
 */ define READPROBE   0
define WRITEPROBE  1

/*
 * defines for FS_CLOSE
 */ define NOT_FINAL_CLOSE      0x0000
define FINAL_CLOSE_THIS_PROC 0x0001
#define FINAL_CLOSE_ALL_PROC     0x0002

/*
 * defines for sfi_type
 */
```

2

```
    /*
    #define STYPE_FILE    0x0000
    #define STYPE_DEVICE 0x0001
    #define STYPE_NMPIPE  0x0002
 5  #define STYPE_FCB     0x0004
    */

/*
    * defines for FSH_QSYSINFO
10  */ define GET_MAX_SECTOR_SIZE   1
    #define GET_PID               2
    #define GET_TID               3
15
    /*
    * Definitions for OPEN action codes
    */

20  #define FILE_EXISTS    0x0001
    #define FILE_CREATED       0x0002
    #define FILE_REPLACED      0x0003
    /* FSD will know to return ERROR_OPEN_FAILED if OpenAction is the following */
    #define UNDEFINED_ACTION 0xffff
25  /*
    * Defines for fGenNeedEA parameter in FS_OPENCREATE
    */
    #define NEED_EAS    0x0001  /* fGenNeedEA */
    #define NICE_EAS    0x0000
30
    /*
    *           Global Definitions
    */

35  #undef NULL
    #define NULL  0
    #define LNULL 0L define INVALID 0
40  #define VALID   1 define SEM_TIMEOUT        5000L define BOGUS_CTIME 0x1111
45  #define BOGUS_CDATE       0x2222
    #define BOGUS_ATIME 0x3333
    #define BOGUS_ADATE       0x4444
    #define BOGUS_MTIME 0x5555
    #define BOGUS_MDATE       0x6666
50  #define BOGUS_SIZE  0x0001
    #define BOGUS_POS   0x0000
    #define BOGUS_WORK_CHAR 'Q' define DEVFSD_MSG  "abc"
55  #define VPFSD_MSG   "here is some vpfsd data"
```

3

```
/*
 *    Useful Macros
 */ define MAKEFP(s,o)  ((void far *)((unsigned long)((o) | ((unsigned long)(s))<<16)))

define FIELDOFFSET(type,field)  ((unsigned int)&(((type *)0)->field))

#define ISBETWEEN(l,h,x)    ((l<=x)&&(x<=h))

/*
 * kernel defines for FS_FSCTL
 */ define GET_ERR_INFO    1    /* func value */
define GET_MIN_MAX_EA  2    /* func value */ define ROUTE_BY_NAME   3    /* iArgType value */
define BAD_HANDLE     -1

/*
 * enumerate the entrypoints which will save data
 */
enum entrypoints {
                        ENT_FILEINFO,
                        ENT_PATHINFO,
                        ENT_FSCTL,
                        ENT_NMPIPE,
                        ENT_OPENCREATE,
                        ENT_FSINFO,
                        ENT_ATTACH,
                        ENT_FLUSHBUF,
                        ENT_WRITE,
                        ENT_READ,
                        ENT_NEWSIZE,
                        ENT_FILEIO,
                        ENT_COMMIT,
                        ENT_CLOSE,
                        ENT_CHGFILEPTR,
                        ENTCOUNT    /* this must be last in the list! */
                };

/*
 * FSD Specific Error Codes (0xef00 - 0xfeff) (always treat as unsigned)
 * ==========================================================
 */
/* when adding a new err message, update the table of strings in fsdtools.c */
define START_FSD_ERROR_CODES         0xef00 define FAILURE                        START_FSD_ERROR_CODES + 0
define FSCTL_UNKNOWN_FUNCTION                START_FSD_ERROR_CODES + 1
#define FSCTL_NO_SELECTOR              START_FSD_ERROR_CODES + 2
#define FSCTL_NO_TAB_ENTRY             START_FSD_ERROR_CODES + 3
#define FSCTL_BUF_OVERFLOW              START_FSD_ERROR_CODES + 4
#define FSNMP_UNKNOWN_OPTYPE            START_FSD_ERROR_CODES + 5
#define TCB_DATA_EXISTS                 START_FSD_ERROR_CODES + 6
```

4

```
        #define TCB_TABLE_FULL              START_FSD_ERROR_CODES + 7
        #define FS_ENTRY_ENABLED            START_FSD_ERROR_CODES + 8
        #define FS_ENTRY_TAB_FULL           START_FSD_ERROR_CODES + 9
        #define FSD_BUFFER_OVERFLOW         START_FSD_ERROR_CODES + 0xa
 5      #define FSD_FEALIST_TOO_LONG        START_FSD_ERROR_CODES + 0xb
        #define FEA_SEGMENT_EXISTS          START_FSD_ERROR_CODES + 0xc
        #define NULL_FEA_SELECTOR           START_FSD_ERROR_CODES + 0xd
        /* this value must ALWAYS be defined as the last error code above */
        #define END_FSD_ERROR_CODES         NULL_FEA_SELECTOR
10
        /*
         * FSD Specific Function Codes for FS_FSCTL (0x8000 - ?) (cast as unsigned)
         * Function codes 0x0000-0x7fff are reserved
         *
15       =================================================================
         ===
         */
        /* when adding a new function, update the table of strings in fsdtools.c */
        #define START_FSD_FUNC_CODES        0x8000
20
        #define FUNC_CLEAR_TABLE            START_FSD_FUNC_CODES + 0
        #define FUNC_GET_BUF                START_FSD_FUNC_CODES + 1
        #define FUNC_DEL_BUF                START_FSD_FUNC_CODES + 2
        #define FUNC_SEL_TAB_DUMP           START_FSD_FUNC_CODES + 3
25      #define FUNC_TCB_BUF_COUNT          START_FSD_FUNC_CODES + 4
        #define FUNC_ENABLE                 START_FSD_FUNC_CODES + 5
        #define FUNC_INIT_FEA_SEG           START_FSD_FUNC_CODES + 6
        #define FUNC_DEL_FEALIST            START_FSD_FUNC_CODES + 7
        #define FUNC_SET_SHUTDOWN_DATA      START_FSD_FUNC_CODES + 8
30      #define FUNC_SIGNAL_SHUTDOWN        START_FSD_FUNC_CODES + 9
        #define FUNC_DISABLE                START_FSD_FUNC_CODES + 0xa
        #define FUNC_SET_EATYPE             START_FSD_FUNC_CODES + 0xb
        #define FUNC_SET_OPENACTION         START_FSD_FUNC_CODES + 0xc
        /* this value must ALWAYS be equal to the last defined function above */
35      #define END_FSD_FUNC_CODES          FUNC_SET_OPENACTION /*
         * The following 2 structures are used by fsd231.c
         * data buffer is cast as these types
40       *
         * xxvalid verifies that a certain parameter is not null
         * FS_ATTACH:    verifies 3rd parameter
         * FS_OPENCREATE: verifies 1st parameter
         */
45      typedef struct {                /* attaching a device or drive */
                unsigned    length;
                unsigned    xxvalid;
                char ddevfsd[sizeof(long)];/* used by opencreate */
        } GenericRec;
50
        typedef struct {                /* checking hVPB */
                unsigned    length;
                struct vpfsd  dvpfsd;
        } vpfsdRec;
55
        /*
```

5

```
     * The following structure is used by fsd232.c
     */
    typedef struct {            /* recovery buffer is cast to this type*/
        unsigned length;
 5      unsigned IOflag;
    } BitRec;

typedef struct {
            unsigned short  length;
10          unsigned short  owner;
            unsigned short  flag;
            struct sffsi    thesffsi;
            struct sffsd    thesffsd;
            unsigned short  level;
15          char far *      pData;          /* only verify the pointer */
            unsigned short  cbData;
            unsigned short  IOflag;
    } FileInfoRec;

20  typedef struct {
            unsigned short  length;
            unsigned short  owner;
            unsigned short  flag;
            struct cdfsi    thecdfsi;
25          struct cdfsd    thecdfsd;
            char            pName[MAXPATHLEN];
            unsigned short  iCurDirEnd;
            unsigned short  level;
            char far *      pData;          /* only verify the pointer */
30          unsigned        cbData;
    } PathInfoRec;

typedef struct {
            unsigned short  length;
35          unsigned short  owner;
            struct sffsi    thesffsi;
            struct sffsd    thesffsd;
            struct cdfsi    thecdfsi;
            struct cdfsd    thecdfsd;
40          char            pName[MAXPATHLEN];
            unsigned short  iCurDirEnd;
            unsigned short  iArgType;
            unsigned short  func;
            char far *      pParm;          /* only verify the pointer */
45          unsigned short  lenParm;
            unsigned short far * plenParmOut;
            char far *      pData;          /* only verify the pointer */
            unsigned short  lenData;
            unsigned short far * plenDataOut;
50  }FsctlRec;

typedef struct {
            unsigned short  length;
            unsigned short  owner;
55          unsigned short  type;
            unsigned short  IOflag;
```

6

```
        }CommitnCloseRec;
        /* FS_SHUTDOWN test */

5      #define BEFORE_SD    1
        #define DURING_SD    2
        #define AFTER_SD     3
        /* type param values to FS_SHUTDOWN */
        #define SHUTDOWN_START  0
10      #define SHUTDOWN_END    1 struct SD_Gen_stats {   /* these are first in the GDT block */
                unsigned short SD_tid;
                unsigned short FS_SD_bad_type;
15              unsigned long  FS_SD_bad_reserved;
                unsigned long  Signal_SD_RAM_sem;
        };

struct SD_FS_stats {
20              unsigned    SD_tid_cnt;
                unsigned    Other_tid_cnt;
                unsigned    Attempt_cnt;
                unsigned    Before_cnt;
                unsigned    During_cnt;
25              unsigned    After_cnt;
        };

struct SD_stats {
                struct SD_Gen_stats General_stats;
30              struct SD_FS_stats  Shutdown_stats;
                struct SD_FS_stats  Flushbuf_stats;
                struct SD_FS_stats  Commit_stats;
                struct SD_FS_stats  Open_stats;
                struct SD_FS_stats  Read_stats;
35              struct SD_FS_stats  Write_stats;
                struct SD_FS_stats  Delete_stats;
                struct SD_FS_stats  Other_stats;
        };
```

APPENDIX VII

This document describes the disk resident structures of the Microsoft High Performance File System. These include:
1. Boot Record
2. SuperBlock
3. Directories
4. File Nodes (FNODES) and Disk Allocation
5. Extended Attributes (EAs)
6. Access Control Lists (ACLs)

and all associated structures. "Pointers" to disk structures are always Logical Sector Numbers (LSNs), which are unsigned 32 bit sector numbers, 0- relative to the beginning of the partition.

All structures associated with ACLs and security are supported only by the LAN Manager 386 version of the file system. These structures are subject to change without notice, prior to the initial release of OS/2 1.2. Subsequent releases of HPFS for OS/2 and LAN Manager may change the either the minor or major version number of the file system. Minor version changes may add meaning to reserved fields and/or "free space" contained in various structures. Major version changes may involve disk format changes, addition of critical fields, and changes in semantics of existing fields.

2. Boot Block

The Boot Record is in LSN 0, the first sector of the partition and the Boot Block, and is always followed by bootstrap code placed by HPFS FORMAT. The Boot Block is 8K, occupying the first 16 sectors (0-15)

of the partition. The extended Boot Record structure used for HPFS volumes is:

```
Extended_Boot   struc
Boot_jmp        db      3 dup (?)
Boot_OEM        db      8 dup (?)
Boot_BPB        db      (size Extended_BPB) dup (?)
Boot_DriveNumber db     ?
Boot_CurrentHead db     ?
Boot_Sig        db      41 ;Indicates Extended Boot;structure
Boot_Serial     db      ? ;Binary VSN for the media
Boot_Vol_Label  db      11 dup 0 ; HPFS Volume Label
Boot_System_ID  db      'HPFS' ;File System Name
Extended_Boot   ends
```

3. SuperBlock

The SuperBlock is one of two filesystem objects which have an absolutely fixed position, sector 16 (zero relative) of the partition. It is used to locate the "top level" of the file system structures. Since it is an extremely important file system structure, it is treated as a write-only structure; all elements that might belong in the SuperBlock but which must be updated are stored in an auxiliary structure, the SpareBlock.

3.1 Duplicated Structures

Some versions of HPFS may maintain duplicates of both the disk space allocation bitmap and the bad block list in special releases. The first release does not duplicate disk structures. The following structure is used to store both pointers.

```
struct RSP {
    long    P;
    long    P2;
};
```

Fields

P:  LSN pointer to primary structure

P2: LSN pointer to duplicate structure, not used in first release.

3.2 The SuperBlock Structure

The SuperBlock takes up one sector (logical sector 16).

```
        struct          SuperB {
        unsigned long   SB_SIG1;
        unsigned long   SB_SIG2;
        unsigned char   SB_VER;
        unsigned char   SB_FVER;
        short           SB_DUMY;
        unsigned long   SB_ROOT
        unsigned long   SB_SEC;
        unsigned long   SB_BSEC;
        struct          RSP SB_BII;
        struct          RSP SB_BBL;
        unsigned long   SB_CDDAT;
        unsigned long   SB_DODAT;
        unsigned long   SB_DBSIZE;
        unsigned long   SB_DBLOW;
        unsigned long   DB_DBHIGH;
        unsigned long   SB_DBMAP;
        unsigned char   SB_VOLNAME[32];
        unsigned long   SB_SIDSEC;
        char            SB_FILL[512-100];
        };
```

Fields

SB_SIG1: First signature value on the SuperBlock, equal to 0xF995E849.

SB_SIG2: Second signature value, equal to 0xFA53E9C5.

SB_VER: Major file system structure version number. Older versions will not work with file system structures.

SB_FVER: Minor file system structure version number. This indicates the oldest minor version of the

4 file system that can function with current disk structures.

SB_DUMY: Pad to align the following fields on doubleword boundaries for easier access.

SB_ROOT: The logical sector number (LSN) of the root directory FNODE (described later).

SB_SEC: Number of sectors in the partition.

SB_BSEC: Number of bad sectors in the partition.

SB_BII: LSN of the bitmap indirect list. The file system tracks free space through bitmaps located at the start or end of 8MB "bands" on disk. The bitmap for each band is 2KB, containing sufficient bits to map 16,384 sectors of disk space. SB_BBI points to a 2KB array (4 sectors) containing at most 512 pointers to these bands, for a maximum of 8,388,608 allocation units, or 4GB of disk space. The size of the SB_BII will be grown for larger disks in later releases.

SB_BBL: LSN of the bad block list. Each 2K block in the list contains the 32-bit sector number of the next block in the chain, followed by 511 LSN's of bad sectors on the disk. The last 2K block in the chain has a forward pointer of zero. In other words, SB_BBL points to a structure which has a forward link and an array of bad sector numbers.

SB_CDDAT: Date and time that CHKDSK was last run on this disk.

SB_DODAT: Date and time that the disk optimizer was last run on the disk.

SB_DBSIZE: Number of contiguous sectors reserved for allocation only to DIRBLKs (called the "DIRBLK band"). DIRBLKs may also be allocated from other sectors.

SB_DBLOW: First sector in the DIRBLK band.

SB_DBHIGH: Last sector in the DIRBLK band.

SB_DBMAP: First sector of DIRBLK band bitmap; starts on a 2K boundary, 2K bytes maximum.

5

SB_VOLNAME: Volume name, NULL terminated.

SB_SIDESEC: LSN of the start of the Short ID Table (SIDTAB). The SIDTAB occupies 8 contiguous sectors (4K), and maps short (8-bit) UIDs to long (128-bit) UIDs. This enables the file system to compress storage of ACLs, while still allowing the guaranteed uniqueness of long UIDs. The short ID serves as index into the SIDTAB where the long ID entry may be found. The structure of the table is as follows:

```
        struct          SIDTAB {
        unsigned long   SID_CNT;
        unsigned long   SID_1ST[SIDTABSIZ];
        unsigned char   SID_REM[SIDTABSIZ*12];
        };
``` where:

SID_CNT: Number of valid (in-use) entries.

SID_1ST: First 4 bytes of the long ID.

SID_REM: Remaining 12 bytes the long ID. The long IDs are split into two parts to allow a very fast search (using REP SCASD) of the table to convert long IDs to short IDs.

SB_FILL: Padding to fill out a 512 byte sector.

3.3 The SpareBlock Structure

The SpareBlock immediately follows the SuperBlock on disk, residing in logical sector 17. It contains all global file system information which must be updated, separating these fields from the critical, static fields in the SuperBlock.

```
        struct SpareB {
        unsigned long   SPB_SIG1;
        unsigned long   SPB_SIG2;
        unsigned char   SPB_FLAG;
        unsigned char   SPB_ALIGN[3];
        unsigned long   SPB_HFSEC;
        unsigned long   SPB_HFUSE;
        unsigned long   SPB_HFMAX;
```

```
            unsigned long  SPB_SDBCNT;
            unsigned long  SPB_SDBMAX;
            unsigned long  SPB_DUMY[20];
            unsigned long  SPB_SPARDB[101];}};
```
5  Fields SPB_SIG1: First signature value on the SpareBlock, equal to 0xF9911849.

SPB_SIG2: Second signature value, equal to 0xFA5229C5.

10  SPB_FLAG: Bit field describing file system state. The following are currently defined:

SBF_DIRT (0x0001) - File system may contain inconsistencies as a result of unexpected shutdown. If set, CHKDSK will be run at boot time.

15  SBF_SPARE (0x0002) - Spare DIRBLKs have been used from the SPB_SPARDB list.

SBF_HFUSED (0x0004) - Hotfix sectors are in use.

SBF_BADSEC (0x0008) - A bad sector in a
20  critical disk structure has made this disk unusable. A bad sector in the SuperBlock, SpareBlock, or hotfix list (SPB_HFSEC) will cause this value to be set.

SBF_BADBM (0x0010) - Bad Bitmap block. CHKDSK must reconstruct and relocate the bitmaps.

25  SBF_VER (0x0080) - Disk has been written by an older version of the file system (with an SB_VER less than the one indicated in the SuperBlock), indicating that some fields in updated structures may not have been filled in correctly by the older version.

30  SPB_ALIGN: Aligns following longs on DWORD.

SPB_HFSEC: LSN of the hotfix replacement table. This table contains three arrays of 32-bit dwords; the size of each array is SPB_HFMAX. The first array contains LSN's of bad sectors on the disk that
35  were replaced. The second array contains the LSN of a hotfix replacement sector that was used to replace the bad sector. The third array contains the LSN of the

7

FNODE for the file containing the bad block, or zero if the fnode is not associated with a file or the fnode was not known at the time of the hotfix.

SPB_HFUSE: Number of replacement blocks that are currently in use by the hotfix mechanism.

SPB_HFMAX: Number of replacement blocks that are allocated, set by FORMAT when the disk is initialized, and never changed later. The number of replacement blocks is 100 blocks (200K) or 1% of the total disk space, whichever is less. So, disks bigger than 20 MB will have 100 replacements; smaller disks will have less.

SPB_SDBCNT: Number of spare DIRBLKS reserved to ensure directory Btree node splitting operations succeed.

SPB_SDBMAX: Maximum number of spare DIRBLKS allowed.

SPB_DUMY: Reserved for future use.

SPB_SPARDB: Sector numbers of reserved DIRBLKS.

4. Directories

Directory entries are maintained in Btrees, sorted "in-order" by name, one Btree per directory. This allows for extremely fast FIND operations, but does introduce complexities for creation and deletion, as a result of algorithms which keep the tree balanced.

"In-order" refers to the way the sorted order is extracted from the Btree structures. Traversing the list of nodes a block from beginning to end in the order downpointer, node, next node in the block yields the desired sorted order. In addition, to prevent the tree from becoming lopsided, with one side of the tree taller from root to leaves, all nodes at the same level in the tree have downpointers or none of them do, and there are at least two nodes in every block. This is called keeping the tree "balanced." Insertions and deletions are done in such a way so as to maintain sorted order
and keep the tree balanced.

Physical storage of the Btree structure is via
directory blocks which contain one entry per file in the
directory. The blocks represent the nodes of the Btree.
There may be many directory blocks per directory, with
the entries spread among the blocks. The last entry in
every block is a special end marker, with a one-
character name, 0xFF. At least two entries plus the end
marker will always fit in a block, even if both have
names with the maximum length of 254; a maximum of 55
will fit in a single block given the 2K directory block
size if all entries have one character names. A simple
directory Btree might look conceptually like the
following (the tree is small for illustrative purposes):

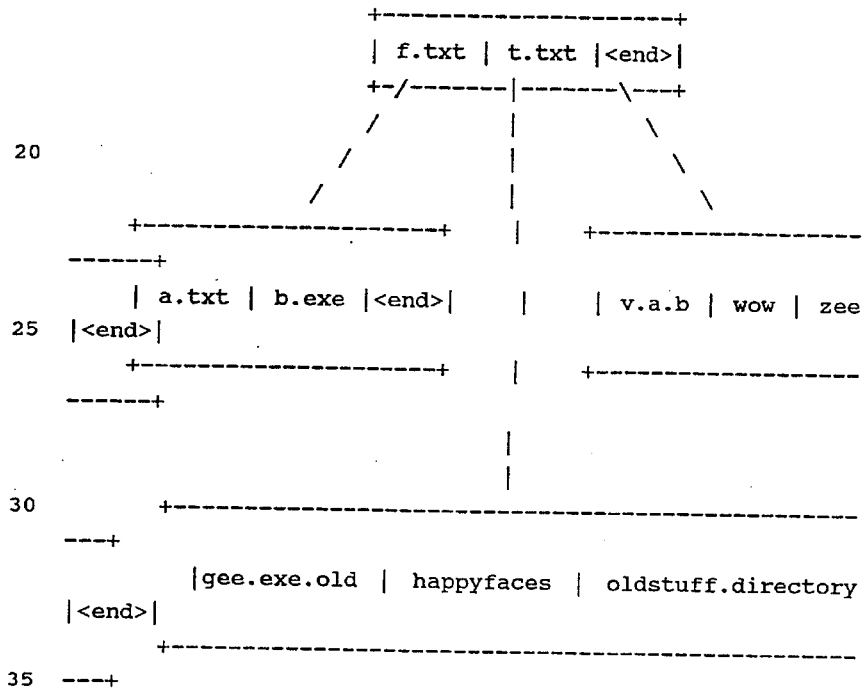

9

Figure A.1
Directory Btree Structure
Note that this tree is only two levels deep and does not reflect the number of directory entries per
5 directory block possible. The lower levels of the tree could also have down pointers making the tree exponentially larger with each level added.
4.1 Directory Entries
    The following defines the structure of a
10 single directory entry. DIR_BTP may or may not be present, and DIR_NAMA is variable length. All time/date fields are in seconds since January 1, 1970.

```
        struct              DIRENT {
        unsigned short      DIR_ELEN;
15      unsigned short      DIR_FLAG;
        unsigned long       DIR_FN;
        unsigned long       DIR_MTIM;
        unsigned long       DIR_SIZE;
        unsigned long       DIR_ATIM;
20      unsigned long       DIR_CTIM;
        unsigned long       DIR_EALEN;
        unsigned short      DIR_USECNT;
        unsigned char       DIR_NAML;
        unsigned char       DIR_NAMA[DIR_NAML];
25      [unsigned long      DIR_BTP; ]
        };
```

Fields
    DIR_ELEN: Length in bytes of this entry. This includes the entire name, the BTREE pointer (if
30 any), and also extra space at the end of the DIRENT where a small portion of the ACL (Access Control List) may be stored.
    DIR_FLAG: The high byte of this 16-bit word contains the DOS file attribute for this file -- hidden,
35 system, read-only, directory, volume, archive, etc. The low byte contains the following bits:

10

DF_SPEC (0x0001) - "Special" entry referring to other than a normal file or subdirectory. For future use.

DF_ACL (0x0002) - ACL present. Non-secure
5 filesystems will refuse access. If this bit is clear, then DF_XACL is clear.

DF_BTP (0x0004) - Entry has a BTREE pointer on the end. Currently the pointer is stored immediately after the name, and the alignment padding comes after
10 it. This may change so that the padding comes before the pointer making it easier to get at the pointer and ensuring that the pointer is DWORD aligned.

DF_END (0x0008) - Entry is the last in this directory block, and does not refer to a file. The entry
15 has a one-byte name, with the one character in the name equal to 0xff (the last possible name). The end record may have a BTREE down pointer, which points to entries lexically greater than all others in this block.

DF_XACL (0x0040) - Entry has an explicit ACL,
20 as opposed to an inherited or implied ACL. A file system object may have an implicit ACL as the result of automatic inheritance when the object is created, or as a result of setting permissions on the object's parent directory after the object has been created. If this is
25 the case, this bit and DF_ACL are set. Updates to the parent directories ACL cause this object's ACL to be updated automatically. However, if a user has set permissions on this particular object, then the ACL is considered explicit, and will not be updated when the
30 parent directory's ACL is changed.

DIR_FN: LSN of the FNODE for this file or directory.

DIR_MTIM: Last time the file was modified. This is the timestamp used in directory listings.

35 DIR_SIZE: The size of the file in bytes.

DIR_ATIM: Last time the file was accessed, in standard time-stamp format. This is not the same as the time displayed in a directory; reading a file does not change that time, but does change this one.

DIR_CTIM: Time the file was created.

DIR_EALEN: Number of bytes of extended attributes, including FNODE and external storage.

DIR_USECNT: Reserved for future use.

DIR_NAML: The length, in bytes, of the file's name.

DIR_NAMA: The file name, which starts here and continues for DIR_NAML bytes. The name is stored exactly as it would be typed; if the file name contains component separators ('.'), then they are included literally in the file name. A single character file name of 0xFF signifies the last directory entry in the block, a sentinel which is not a real entry. The file name is not terminated by a NULL.

DIR_BTP: The LSN of a directory block containing entries which are lexically less than this entry. Note that this field is at a variable location depending on the length of the filename. END records always have name length of 1, so DIR_BTP is at a fixed location for END records.

No directory block may contain only an END record; there must be at least one real entry in the block. Also, the entries in the blocks at any particular level in the tree (top, one block deep, two deep, etc.) must either ALL have downpointers or ALL lack them. Thus, if the top-level directory block contains two entries, they both have to have downpointers or both lack them. If they have downpointers, then the left subtree has to have the same depth as the right subtree.

4.2 Directory Blocks

This structure defines a directory block's header. Every directory block on the disk contains this header followed by two or more DIRENTs.

```
struct DIRBLK {
```

12

```
            long    DB_SIG;
            long    DB_FREP;
            long    DB_CCNT;
            long    DB_PAR;
5           long    DB_SEC
            char    DB_START;
            char    DB_DUMY[2027]; };
```
Fields DB_SIG: This contains the signature for the
10 DIRBLK, equal to 0x77E40AAE.

DB_FREP: Offset to the free space at the end
of the directory block. For example, if a directory
block contains 100 bytes worth of DIRENTs, and the
header is 20 bytes long, DB_FREP will be 120.
15      DB_CCNT: Bit 0 of this field is set if this
DIRBLK is the top-level one (the one pointed to by the
FNODE), and is clear otherwise. Bits 31-1 are a change
counter which is incremented whenever an entry is
deleted or moved. This is used to validate "remembered"
20 associations between offsets into the directory block
and entries.

DB_PAR: This contains the LSN of the
structure which points to this DIRBLK. If this is the
top- level block, DB_PAR points to the directory's
25 FNODE. Otherwise, it points to the DIRBLK immediately
above. This is used by CHKDSK for recovery, and also by
the FindFirst algorithm.

DB_SEC: Contains the LSN of this DIRBLK.

DB_START: The address within the DIRBLK where
30 directory entries start.

DB_DUMY: This is included to make pad the
structure to the actual size of a DIRBLK on disk, 2048
bytes. This is the area where directory entries
(DIRENTs) are stored.
35 5. File Nodes and Disk Allocation This section describes the "file node", or
FNODE, allocated for each file, and the structures used in tracking file allocation. The FNODE may be thought
of as an extension of the directory entry, used to keep
track of disk space allocated to a file, as well as
structures associated with files, such as Access Control
Lists (ACLs), Audit Control Masks (ACMs), and Extended
Attributes (EAs).

Disk allocation for files and directories is
accomplished through B+Trees and <sector, run-length>,
or "extent" encoding. In most cases, the extents
allocated to a file can be described with structures
called "allocation leaves" (ALLEAFs), of which eight are
actually stored in the FNODE. The allocation records in
a "full" FNODE look like this:

```
              Level 1
       FNODE                      DATA
       ==============
       | ALLEAF1    | --------> | extent 1 |
       |------------|
       | ALLEAF2    | --------> | extent 2 |
       |------------|
       | ALLEAF3    | --------> | extent 3 |
       .............            .............
       | ALLEAF8    | --------> | extent 8 |
       ==============
```

Figure A.2
1 Level Allocation Tree

The allocation extents are listed in the leaf
nodes in the order in which they compose the file; that
is, sequential reads would access the ALLEAFs in order.

When a file of unknown size is created, one
extent 8K in size is allocated to the file, and the
first ALLEAF is used to describe the run. (When the
file is closed, extra space pre-allocated is given
back.) As the file grows, the file system attempts to
lengthen the extent run. When this is no longer
possible, a new extent is added, and the next ALLEAF is

14 used to describe the run. This process is repeated as the file grows, using more ALLEAFs as necessary.

Should the file become sufficiently large, or the disk space sufficiently fragmented, additional
5 extents will need to be used. When this is necessary, the allocation tree is "split", converting the structures used for leaves to nodes (making them parents), and pushing the allocation leaves down one level (making them children of one new parent). A new
10 disk structure called an "allocation sector" (ALSEC) is created to store the pushed-down child leaves and the new leaves needed to describe the new extents required for the file. In the FNODE, "allocation nodes" (ALNODEs) are created in place of the ALLEAFs to
15 describe the contents of each ALSEC.

In order to keep track of which allocation blocks contain leaves and which contain nodes, the FNODE and each ALSEC has a control block called an ALBLK. The ALBLK has information on which allocation structures are
20 in use, leaves or nodes, along with information as to where this block sits in the tree. ABF_NODE is a flag in the ALBLK which is set if the allocation structures in this block are nodes, and clear if they are leaves.

15
An FNODE that has just had its allocation tree split would look like this:
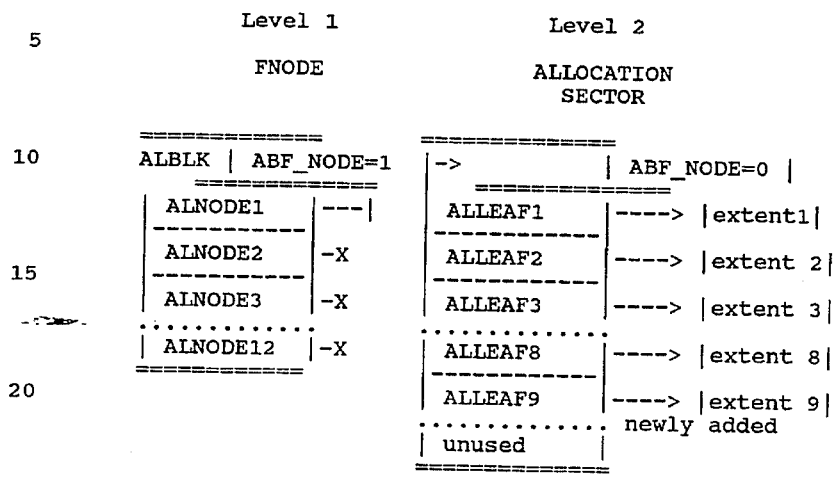
Figure A.3
2 Level Allocation Tree
Should the new ALSEC fill up, another is allocated, with ALLEAFs in the new ALSEC as children of ALNODE2, and so on. The B+tree may be split further and further by creating ALSECs of ALNODEs, forming more levels in the tree. A 3- level tree might look like this:
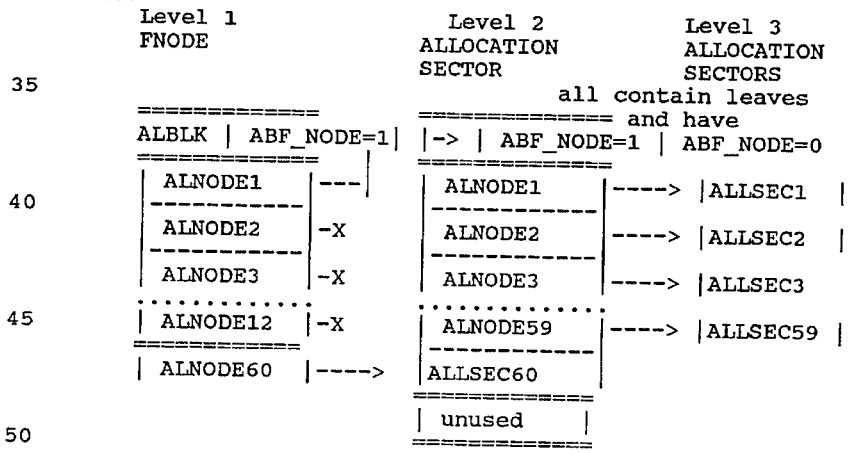

16

Figure A.4
3 Level Allocation Tree

Each level 3 ALLSEC looks like the ALLSEC in figure A.3 above.

A file using only ALLEAFs in FNODEs can describe 8 extents of storage. A two level tree can describe 480 (12 ALNODEs in the FNODE x 40 ALLEAFs in each ALSEC); a three level tree 28,800 (12 ALNODEs in the FNODE x 60 ALNODEs in each level 2 ALSEC x 40 ALLEAFs in each level 3 ALSEC) extents and so on. Note that a contiguous file of any size could be described as one extent.

To summarize:

FNODES contain ALLEAFs for small files; or ALNODEs for larger files

ALNODEs point to ALSECs

ALSECs contain ALLEAFs for larger files; or ALNODEs for extremely large files

The allocation leaves are in-order sorted, with a field noting the number of sectors described in "prior" structures (meaning nodes and leaves reached before this one in an in-order traversal of the tree). Thus the advantage of B+tree storage over a straight-forward indirect block storage scheme: In searching for the sector corresponding to a given offset into or record of a file, the allocation structures themselves may be searched in Btree fashion, accelerating seek-then-read operations.

In addition, the B+tree allocation scheme will allow future versions of the file system to support "sparse files", i.e. files with allocation holes, and will files to grow from the middle out without ripple copying the remainder of the file.

5.1 Allocation Block (ALBLK)

The ALBLK is a structure in FNODEs and ALSECs that describes the allocation structures located in

17 these structures, including whether they are leaves or nodes.

```
        struct      ALBLK {
        unsigned char  AB_FLAG;
5       unsigned char  AB_FLAG2[3];
        unsigned char  AB_FCNT;
        unsigned char  AB_OCNT;
        unsigned short AB_FREP;
        };
10  Fields
```

AB_FLAG: This bitfield contains several flags which describe the general structure of allocation information. The following bits are used:

ABF_NODE (0x80) - If set, the allocation records point to further allocation blocks, not to data runs.

ABF_BIN (0x40) - If set, there are a lot of records, so it would be faster to find a record using a binary search than just looking through them in order.

ABF_FNP (0x20) - If set, this allocation block has an FNODE as it's parent in the tree.

AB_FLAG2: Reserved, currently unused.

AB_FCNT: Number of allocation records unused in this block.

AB_OCNT: Number of allocation records that are currently used in this block.

AB_FREP: Offset in the block (or FNODE) where new records can be added.

5.2 Allocation Node

This defines the structure of indirect allocation records. These records do not point to extents; they point to other allocation blocks, which may in turn point to data runs or further allocation blocks.

```
        struct ALNODE {
        unsigned long AN_LOF;
```

18

```
            unsigned long  AN_SEC;
    };
    Fields
            AN_LOF:  Number of sectors enumerated by
5   previous allocation records, including this one.
            AN_SEC:  LSN of an allocation sector, which
    describes sectors allocated to the file occuring before
    AN_LOF.  For example, if the first ALNODE for a file has
    an AN_LOF of 100, AN_SEC points to an allocation block
10  which enumerates sectors 0-99 of the file.
    5.3 Allocation Leaf
            This structure defines allocation records at
    the deepest level of the tree.  Each ALLEAF structure
    describes a single run of sectors allocated to the file.
15          struct      ALLEAF {
            unsigned long  AL_LOF;
            unsigned long  AL_LEN;
            unsigned long  AL_POF;
    };
20  Fields
            AL_LOF:  Number of sectors enumerated by
    previous allocation records, NOT including this record.
            AL_LEN:  Number of sectors in this data run.
            AL_POF:  LSN of where the data run starts.
25  5.4 Allocation Sector
            This structure defines an allocation block on
    disk.  The allocation information for most files will
    fit in the FNODE; if that is not enough, the FNODE will
    contain ALNODE records, each of which points to a single
30  sector containing an ALSEC structure followed by ALNODE
    or ALLEAF records.  Note that 40 ALLEAFs or 60 ALNODEs
    fit in a 512 byte sector with an ALSEC.
            struct ALSEC {
            unsigned long  AS_SIG;
35          unsigned long  AS_SEC;
            unsigned long  AS_RENT;
            struct ALBLK   AS_ALBLK;
```

```
};
Fields
        AS_SIG:  Signature of an allocation sector,
equal to 0x37E40AAE.
        AS_SEC:  LSN of this allocation sector.
        AS_RENT: LSN of the structure which points to
this allocation sector; either a previous allocation
sector or the FNODE of the file containing this
allocation sector.
        AS_ALBLK: Controls the format of the following
ALNODE or ALLEAF structures.  It is itself an ALBLK
structure, described above.
```

5.5 Auxiliary Information Structure

The FNODE contains two auxiliary structures (AUXINFOs) to record storage of Access Control Lists (ACLs) and Extended Attributes (EAs). Instances of this structures may reference either space available in the FNODE itself, of external disk storage as the space required for these items grows, but never both. This strategy allows efficient access to small lists, while providing essentially limitless growth. For details on how disk space is managed for EAs and ACLs see section 5.7 and 5.8.

The format of an AUXINFO structure is as follows:

```
        struct          AUXINFO {
        unsigned long   AI_DAL;
        unsigned long   AI_SEC;
        unsigned short  AI_FNL;
        unsigned char   AI_DAT;
        unsigned char   AI_DMY;
}
Fields
        AI_DAL:  The length in bytes of this list
stored in sectors external to the FNODE.  If this is
non-zero, AI_FNL is zero.
```

AI_SEC: LSN of the first sector of the run allocated to this list, or the root of the allocation B+tree (ALSEC) for this list.

AI_FNL: Number of bytes allocated to this list in the FNODE. If this is non-zero, AI_DAL is zero.

AI_DAT: Non-zero if AI_SEC refers to an ALSEC, i.e. storage for this list is described by an allocation B+tree.

AI_DMY: Reserved.

5.6 File Node

An FNODE is allocated for every file and subdirectory on the disk, and contains structures for tracking all data associated with a file, including:
- File data
- Extended Attributes
- Access Control List Extended Attributes and the Access Control List are stored in the FNODE itself as long as there is room; when these structures grow beyond a certain threshold, disk space is allocated in a manner similar to that used for file data allocation: a B+tree of sector extents as described earlier.

The FNODE contains space for 8 records describing contiguous allocation extents. This is more than sufficient to describe the extents occupied by most files. In the rare case that more allocation extents are needed to describe the disk space occupied by the file's data, this space is used as the root block of the allocation B+tree. Essentially the same scheme is used for EAs and ACLs, except that the FNODE contains only one allocation extent record for each list. If more space is required for either of these, the corresponding record serves as the root of an allocation B+tree. (See sections 5.7 and 5.8 for Extended Attribute and Access Control List storage.)

In addition, recent behavior logs for sequential and fast read operations are maintained in the FNODE. These logs are used by the file system to record the type of access usually associated with this file for use in anticipating read requests once the file is opened.

```
        struct FNODE {
        unsigned long      FN_SIG;
        unsigned long      FN_SRH;
        unsigned long      FN_FRH;
        unsigned long      FN_XXX;
        unsigned char      FN_NAME[16];
        unsigned long      FN_CONTFN;
        struct AUXINFO     FN_ACL;
        unsigned char      FN_HCNT;
        struct AUXINFO     FN_EA;
        unsigned char      FN_FLAG;
        struct ALBLK       FN_AB;
        struct ALLEAF      FN_ALREC[8];
        unsigned long      FN_VLEN;
        unsigned char      FN_UID[16];
        unsigned long      FN_EEP;
        unsigned long      FN_EEL;
        unsigned char      FN_SPARE[7];
        unsigned char      FN_FREE[316];
        };
```

Fields

FN_SIG: Signature of an FNODE, equal to 0xB7E40AAE.

The following fields are recent behavior logs or histories, which keep a running record of the last 32 accesses to the file. Every time the file is accessed, the bitfields are shifted right, the high bit of the appropriate field is set, and FN_HCNT is incremented. The maximum meaningful value of FN_HCNT is 32, but it also serves as a useage count for the file. It is expected that utilities that use this information (such as disk optimizers) might decide to clear FN_HCNT to ensure that objects not used "recently" have small or zero FN_HCNTs.

FN_SRH: Number of times in the last 32 accesses the file has been read sequentially, stored as the number of bits set.

FN_FRH: Number of times in the last 32 accesses the file has been read "fast", stored as the number of bits set. This is typical of .EXE files.

FN_XXX: Reserved for future logging.

FN_NAME: The first byte of this field is the length of the actual name of this object as stored in the DIRENT, followed by up to the first 15 characters of the name. If the length is less than 15, the extra bytes are undefined. This field is maintained to aid in locating deleted files for undeleting, and to associate correct names with recovered files whose DIRENTs have been corrupted.

FN_CONTFN: LSN of the FNODE for the directory containing the file or subdirectory associated with this FNODE. The root directory's FN_CONTFN points to the root FNODE.

FN_ACL: Access Control List auxiliary structure.

FN_HCNT: Count of valid history bits in FN_SRH, FN_FRH, and FN_XXX.

FN_EA: Extended Attribute auxiliary structure.

FN_FLAG: Flags for the FNODE object. The following values are defined:

FNF_DIR (0x01) - This FNODE is for a directory.

FN_AB: Controls the format of the top-level file allocation info for this file -- whether the records are nodes or leaves, etc. It is an ALBLK structure, as described earlier.

FN_ALREC: Array of allocation records. They are defined as 8 ALLEAF records, but if the file becomes too big, they will be replaced by 12 ALNODE records.

FN_VLEN: Length of valid data in the file. If DIR_SIZE is larger than FN_VLEN, then data in the file is invalid, and contains data from a previous allocation to another file system object. Data read from a seek location larger than FN_VLEN will be zeroed before return to the user.

FN_UID: Reserved for future use.

FN_EEP: LSN of an extra extent of data associated with this FNODE. Reserved for future use.

FN_EEL: Length of data stored in FN_EEP. Reserved for future use.

FN_SPARE: Reserved for future use.

FN_FREE: This space is used for small ACL and EA storage. When it is used up, the external allocation scheme using allocation extents is used.

5.7 Extended Attribute Storage 5.7.1 The EA Stream

Extended Attributes are treated much like a secondary data stream associated with a file or directory. As such, space is allocated in a way very similar to that used for file data. The exception to this rule is that I/O associated with setting and getting extended attributes is strictly record-oriented: the EA stream is accessed by EA name/value pairs or as a whole. In addition, individual EAs associated with a file may very greatly in size, and the total size of EAs associated with different files may vary greatly.

To deal effectively with these variances, incurring minimal overhead on small EAs and EA lists while not limiting size, HPFS stores EAs as a single contiguous data stream; however, if an individual EA becomes very large, it is stored externally to the rest of the EA stream.

EAs are stored in one of two places: in the FNODE itself, or in external sector storage, described by an allocation extent B+tree identical to that used in file allocation. EA storage is never split between
5 FNODE and external sectors. If AI_FNL is non-zero then storage is in the FNODE; otherwise if AI_DAL is non-zero then storage is in external sectors; otherwise there are no EAs. The threshold determining when an EA list is moved to external storage depends on the amount of free
10 space available in the FNODE. Note that EAs and ACLs compete for FNODE free space, with EAs coming after ACLs in the FNODE.

If storage is in external sectors there are two possibilites: either the EAs occupy a single
15 extent, or they are discontiguous. In the first case, AI_DAT is zero, and the extent is described by (AI_SEC, AI_DAL). Otherwise, AI_DAT is non-zero, and AI_SEC points to an AL_SEC describing an allocation B+tree in the same manner as that used for file allocation.

20 5.7.2 Individual EAs

Smaller EAs are stored as they are referenced by the OS/2 API, as a list of FEAs (the API prepend an EAl_cbList; this is not included in disk storage). If the data field of the FEA is larger than a certain
25 threshold (approximately 128 bytes), then it is stored in it's own extent or B+tree, and a reference to that storage (an EAAT record) is put in it's place in the FEA.

The format of an FEA is: struct FEA {
30     unsigned char    FEA_rsvd;
    unsigned char    FEA_cbName;
    unsigned short    FEA_cbValue;
    unsigned char[]    FEA_szName;
    unsigned char[]    FEA_aValue;
35 }
Fields FEA_rsvd: Bitfield of FEA Flags indicating indirect storage:

FF_BIGD (01h) - FEA has a large data field. The cbVAlue and aValue fields describe the EAAT record, not the actual EA data.

FF_DAT (02h) - If FF_BIGD is set, EAAT_SEC points to an allocation tree root (ALSEC). If clear, EAAT_SEC points to a simple allocation extent EAAT_LEN long.

FEA_cbName: Length of EA name, not including terminating null.

FEA_dbValue: Length of value in bytes if FF_BIGD is clear; size of(struct EAAT) otherwise.

FEA_szName: Null terminated name, variable length.

FEA_aValue: If FF_BIGD is clear, this is the actual EA value, FEA_dbValue bytes long. Otherwise, this is an EAAT structure.

The structure describing external storage of individual EAs has the following format:

```
struct EAAT {
    long    EAAT_LEN;
    long    EAAT_SEC;
}
```

Fields

EAAT_LEN: Number of bytes in the data field of the EA.

EAAT_SEC: First sector of the allocation extent or B+tree.

5.8 Access Control List Storage

ACLs are stored much the same as EAs, except that there is no provision for external storage of an individual, oversized ACE (Access Control Entry), as all ACEs have a known, small size. The first "few" ACEs are stored in the DIRENT free space for the object, to optimize access of the object in the most frequent case.

26

The rest of the ACL is stored either in the FNODE or in external extents, as described for EAs in section 5.7.

Each ACE consists of a 4 byte permission structure, the first byte of which is either a short ID
5 or a zero; in the latter case, a long ID follows the permission structure. (See the File System ACL Design Specification for details on file system ACE formats and semantics.)

I claim:

1. A method in a computer system of reading information from a storage device, the storage device having a plurality of sectors, the method comprising the steps of:

allocating a first run of logically contiguous sectors to a file, wherein one of the logically contiguous sectors is mapped to an alternate sector;

designating a sector within the first run from which to read information;

determining whether the designated sector is mapped to an alternate sector;

when the designated sector is not mapped to the alternate sector, retrieving information from the designated sector;

when the designated sector is mapped to the alternate sector, retrieving information from the alternate sector;

receiving a request to improve the contiguity of the sectors in the file;

in response to the request, allocating a second run of logically contiguous sectors for the file; and for each sector of the first run, when the sector of the first run is not mapped to an alternate sector, copying the data from the sector of the first run to a sector of the second run; and when a sector of the first run is mapped to an alternate sector, copying the data from the alternate sector to a sector of the second run and adding the sector of the first run to a list of sectors with errors so that the sectors of the file are stored in the logically contiguous sectors of the second run; and reallocating a sector of the first run of logically contiguous sectors to another file.

2. A method in a computer system for improving the contiguity of the sectors of a file, the method comprising:

allocating a first run of logically contiguous sectors to a file, wherein one of the logically contiguous sectors is mapped to an alternate sector when an error is detected in the one or more sectors;

designating a sector within the first run from which to read information determining whether the designated sector is mapped to the alternate sector;

when the designated sector is not mapped to the alternate sector, retrieving information from the designated sector, when the designated sector is mapped to the alternate sector, retrieving information from the alternate sector, receiving a request to improve the contiguity of the sectors in the file, allocating a second run of logically contiguous sectors; and for each sector of the first run, when the sector is not mapped to an alternate sector, copying the sector to a sector of the second run; and when the sector is mapped to an alternate sector, copying the alternate sector to a sector of the second run so that the file is stored in logically contiguous sectors of the second run; and reallocating the first run of logically contiguous sectors to another file.

3. A computer readable medium containing instructions for causing a computer-system to improve the contiguity of the sectors of a file by:

allocating a first run of logically contiguous sectors to a file, wherein one of the logically contiguous sectors is mapped to an alternate sector when an error is detected in the one or more sectors;

designating a sector within the first run from which to read information determining whether the designated sector is mapped to the alternate sector;

when the designated sector is not mapped to the alternate sector, retrieving information from the designated sector, when the designated sector is mapped to the alternate sector, retrieving information from the alternate sector, receiving a request to improve the contiguity of the sectors in the file, allocating a second run of contiguous sectors; and for each sector of the first run, when the sector is not mapped to an alternate sector, copying the sector to a sector of the second run; and when the sector is mapped to an alternate sector, copying the alternate sector to a sector of the second run so that the file is stored in contiguous sectors of the second run; and reallocating a sector of the first run of contiguous sectors to another file.

* * * * *